(12) United States Patent
Pivac

(10) Patent No.: US 10,876,308 B2
(45) Date of Patent: Dec. 29, 2020

(54) BOOM FOR MATERIAL TRANSPORT

(71) Applicant: FASTBRICK IP PTY LTD, Perth (AU)

(72) Inventor: Mark Pivac, Perth (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 0 days.

(21) Appl. No.: 16/685,712

(22) Filed: Nov. 15, 2019

(65) Prior Publication Data

US 2020/0148511 A1 May 14, 2020

Related U.S. Application Data

(63) Continuation of application No. 16/317,779, filed as application No. PCT/AU2017/050730 on Jul. 14, 2017.

(30) Foreign Application Priority Data

Jul. 15, 2016 (AU) .................................. 2016902789

(51) Int. Cl.
*E04G 21/16* (2006.01)
*B66C 23/42* (2006.01)
(Continued)

(52) U.S. Cl.
CPC .............. *E04G 21/16* (2013.01); *B66C 23/42* (2013.01); *B66C 23/68* (2013.01); *B66C 23/705* (2013.01);
(Continued)

(58) Field of Classification Search
None
See application file for complete search history.

(56) References Cited

U.S. PATENT DOCUMENTS 1,633,192 A 6/1927 Reagan
1,829,435 A 10/1931 Barnhart
(Continued)

FOREIGN PATENT DOCUMENTS

AU 645640 B2 1/1994
CH 673498 A 3/1990
(Continued)

OTHER PUBLICATIONS

Notice of Acceptance of Patent Applicaiton (and allowed specification copy) received for co-pending Australian Patent Application No. 2019205019, dated Sep. 5, 2019 (119 pages).
(Continued)

*Primary Examiner* — Ronald P Jarrett
(74) *Attorney, Agent, or Firm* — Perkins Coie LLP

(57) ABSTRACT

A foldable boom for conveying an item, said foldable boom being foldable about at least one folding axis, said foldable boom being locatable in a folded stowed position, and moveable to unfolded extended positions; said foldable boom having a near end arranged for pivotal movement about a first horizontal axis located on a turret, said turret being rotatable about a vertical axis; said foldable boom having first conveying apparatus to convey an item therealong, internally within said foldable boom, to a remote end of the foldable boom; wherein said foldable boom is foldable about a folding axis, and a pivoting shuttle equipped with a clamp to releasably hold an item is provided at said folding axis to transfer said item between said first conveying apparatus in boom elements connected about said folding axis.

15 Claims, 71 Drawing Sheets

(51) Int. Cl.
*B66C 23/68* (2006.01)
*B66C 23/70* (2006.01)
*E04G 21/22* (2006.01)
*B25J 5/00* (2006.01)
*B25J 9/04* (2006.01)
*B25J 15/02* (2006.01)
*B25J 18/02* (2006.01)

(52) U.S. Cl.
CPC ............... *E04G 21/22* (2013.01); *B25J 5/007* (2013.01); *B25J 9/046* (2013.01); *B25J 15/026* (2013.01); *B25J 18/025* (2013.01)

(56) References Cited

U.S. PATENT DOCUMENTS

| | | |
|---|---|---|
| 3,438,171 A | 4/1969 | Demarest |
| 3,757,484 A | 9/1973 | Williamson et al. |
| 3,790,428 A | 2/1974 | Lingl |
| RE28,305 E | 1/1975 | Williamson et al. |
| 3,930,929 A | 1/1976 | Lingl |
| 3,950,914 A | 4/1976 | Lowen |
| 4,033,463 A | 7/1977 | Cervin |
| 4,106,259 A | 8/1978 | Taylor-smith |
| 4,245,451 A | 1/1981 | Taylor-smith |
| 4,303,363 A | 12/1981 | Cervin |
| 4,523,100 A | 6/1985 | Payne |
| 4,708,562 A | 11/1987 | Melan et al. |
| 4,714,339 A | 12/1987 | Lau |
| 4,758,036 A | 7/1988 | Legille et al. |
| 4,765,789 A | 8/1988 | Lonardi et al. |
| 4,790,651 A | 12/1988 | Brown et al. |
| 4,827,689 A | 5/1989 | Lonardi et al. |
| 4,852,237 A | 8/1989 | Tradt et al. |
| 4,911,595 A | 3/1990 | Kirchen et al. |
| 4,952,772 A | 8/1990 | Zana |
| 5,004,844 A | 4/1991 | Van Leeuwen et al. |
| 5,013,986 A | 5/1991 | Gauggel |
| 5,018,923 A | 5/1991 | Melan et al. |
| 5,049,797 A | 9/1991 | Phillips |
| 5,080,415 A | 1/1992 | Bjornson |
| 5,196,900 A | 3/1993 | Pettersen |
| 5,284,000 A | 2/1994 | Milne et al. |
| 5,321,353 A | 6/1994 | Furness |
| 5,403,140 A | 4/1995 | Carmichael et al. |
| 5,413,454 A | 5/1995 | Movsesian |
| 5,419,669 A | 5/1995 | Kremer et al. |
| 5,420,489 A | 5/1995 | Hansen et al. |
| 5,469,531 A | 11/1995 | Faure et al. |
| 5,497,061 A | 3/1996 | Nonaka et al. |
| 5,523,663 A | 6/1996 | Tsuge et al. |
| 5,527,145 A | 6/1996 | Duncan |
| 5,557,397 A | 9/1996 | Hyde et al. |
| 5,737,500 A | 4/1998 | Seraji et al. |
| 5,838,882 A | 11/1998 | Gan et al. |
| 6,018,923 A | 2/2000 | Wendt |
| 6,049,377 A | 4/2000 | Lau et al. |
| 6,101,455 A | 8/2000 | Davis |
| 6,134,507 A | 10/2000 | Markey, Jr. et al. |
| 6,166,809 A | 12/2000 | Pettersen et al. |
| 6,166,811 A | 12/2000 | Long et al. |
| 6,172,754 B1 | 1/2001 | Niebuhr |
| 6,213,309 B1 | 4/2001 | Dadisho |
| 6,285,959 B1 | 9/2001 | Greer |
| 6,310,644 B1 | 10/2001 | Keightley |
| 6,330,503 B1 | 12/2001 | Sharp et al. |
| 6,370,837 B1 | 4/2002 | Mcmahon et al. |
| 6,427,122 B1 | 7/2002 | Lin |
| 6,429,016 B1 | 8/2002 | Mcneil |
| 6,512,993 B2 | 1/2003 | Kacyra et al. |
| 6,516,272 B2 | 2/2003 | Lin |
| 6,584,378 B1 | 6/2003 | Anfindsen |
| 6,611,141 B1 | 8/2003 | Schulz |
| 6,618,496 B1 | 9/2003 | Tassakos et al. |
| 6,628,322 B1 | 9/2003 | Cerruti |
| 6,643,002 B2 | 11/2003 | Drake, Jr. |
| 6,664,529 B2 | 12/2003 | Pack et al. |
| 6,681,145 B1 | 1/2004 | Greenwood et al. |
| 6,683,694 B2 | 1/2004 | Cornil |
| 6,704,619 B1 | 3/2004 | Coleman et al. |
| 6,741,364 B2 | 5/2004 | Lange et al. |
| 6,825,937 B1 | 11/2004 | Gebauer et al. |
| 6,850,946 B1 | 2/2005 | Rappaport et al. |
| 6,859,729 B2 | 2/2005 | Breakfield et al. |
| 6,864,966 B2 | 3/2005 | Giger |
| 6,868,847 B2 | 3/2005 | Ainedter et al. |
| 6,873,880 B2 | 3/2005 | Hooke et al. |
| 6,917,893 B2 | 7/2005 | Dietsch et al. |
| 6,935,036 B2 | 8/2005 | Barber et al. |
| 6,957,496 B2 | 10/2005 | Raab et al. |
| 6,965,843 B2 | 11/2005 | Hobden et al. |
| 6,970,802 B2 | 11/2005 | Ban et al. |
| 6,996,912 B2 | 2/2006 | Raab et al. |
| 7,050,930 B2 | 5/2006 | Hobden et al. |
| 7,051,450 B2 | 5/2006 | Barber et al. |
| 7,069,664 B2 | 7/2006 | Barber et al. |
| 7,107,144 B2 | 9/2006 | Capozzi et al. |
| 7,111,437 B2 | 9/2006 | Ainedter |
| 7,130,034 B2 | 10/2006 | Barvosa-carter et al. |
| 7,142,981 B2 | 11/2006 | Hablani |
| 7,145,647 B2 | 12/2006 | Suphellen et al. |
| 7,153,454 B2 | 12/2006 | Khoshnevis |
| 7,174,651 B2 | 2/2007 | Barber et al. |
| 7,230,689 B2 | 6/2007 | Lau |
| 7,246,030 B2 | 7/2007 | Raab et al. |
| 7,269,910 B2 | 9/2007 | Raab et al. |
| 7,347,311 B2 | 3/2008 | Rudge |
| 7,519,493 B2 | 4/2009 | Atwell et al. |
| 7,551,121 B1 | 6/2009 | Oconnell et al. |
| 7,564,538 B2 | 7/2009 | Sakimura et al. |
| 7,570,371 B1 | 8/2009 | Storm |
| 7,576,836 B2 | 8/2009 | Bridges |
| 7,576,847 B2 | 8/2009 | Bridges |
| 7,591,078 B2 | 9/2009 | Crampton |
| 7,639,347 B2 | 12/2009 | Eaton |
| 7,693,325 B2 | 4/2010 | Pulla et al. |
| 7,701,587 B2 | 4/2010 | Shioda et al. |
| 7,774,159 B2 | 8/2010 | Cheng et al. |
| 7,800,758 B1 | 9/2010 | Bridges et al. |
| 7,804,602 B2 | 9/2010 | Raab |
| RE42,055 E | 1/2011 | Raab et al. |
| RE42,082 E | 2/2011 | Raab et al. |
| 7,881,896 B2 | 2/2011 | Atwell et al. |
| 7,967,549 B2 | 6/2011 | Geist et al. |
| 7,993,289 B2 | 8/2011 | Quistgaard et al. |
| 8,036,452 B2 | 10/2011 | Pettersson et al. |
| 8,054,451 B2 | 11/2011 | Karazi et al. |
| 8,060,344 B2 | 11/2011 | Stathis |
| 8,145,446 B2 | 3/2012 | Atwell et al. |
| 8,166,727 B2 | 5/2012 | Pivac et al. |
| 8,169,604 B2 | 5/2012 | Braghiroli et al. |
| 8,185,240 B2 | 5/2012 | Williams et al. |
| 8,229,208 B2 | 7/2012 | Pulla et al. |
| 8,233,153 B2 | 7/2012 | Knuettel |
| 8,244,030 B2 | 8/2012 | Pettersson et al. |
| 8,248,620 B2 | 8/2012 | Wicks et al. |
| 8,269,984 B2 | 9/2012 | Hinderling et al. |
| 8,327,555 B2 | 12/2012 | Champ |
| 8,337,407 B2 | 12/2012 | Quistgaard et al. |
| 8,345,926 B2 | 1/2013 | Clark et al. |
| 8,346,392 B2 | 1/2013 | Walser et al. |
| 8,405,716 B2 | 3/2013 | Yu et al. |
| 8,467,072 B2 | 6/2013 | Cramer et al. |
| 8,537,372 B2 | 9/2013 | Siercks et al. |
| 8,537,376 B2 | 9/2013 | Day et al. |
| 8,558,992 B2 | 10/2013 | Steffey |
| 8,593,648 B2 | 11/2013 | Cramer et al. |
| 8,595,948 B2 | 12/2013 | Raab et al. |
| 8,606,399 B2 | 12/2013 | Williams et al. |
| 8,634,950 B2 | 1/2014 | Simonetti et al. |
| 8,644,964 B2 | 2/2014 | Hendron et al. |
| 8,670,114 B2 | 3/2014 | Bridges et al. |
| 8,677,643 B2 | 3/2014 | Bridges et al. |
| 8,792,709 B2 | 7/2014 | Pulla et al. |

(56) References Cited

U.S. PATENT DOCUMENTS

| | | |
|---|---|---|
| 8,803,055 B2 | 8/2014 | Lau et al. |
| 8,812,155 B2 | 8/2014 | Brethe |
| 8,825,208 B1 | 9/2014 | Benson |
| 8,832,954 B2 | 9/2014 | Atwell et al. |
| 8,848,203 B2 | 9/2014 | Bridges et al. |
| 8,875,409 B2 | 11/2014 | Kretschmer et al. |
| 8,898,919 B2 | 12/2014 | Bridges et al. |
| 8,902,408 B2 | 12/2014 | Bridges |
| 8,913,814 B2 | 12/2014 | Gandyra |
| 8,931,182 B2 | 1/2015 | Raab et al. |
| 8,942,940 B2 | 1/2015 | York |
| 8,965,571 B2 | 2/2015 | Peters et al. |
| 8,996,244 B2 | 3/2015 | Summer et al. |
| 8,997,362 B2 | 4/2015 | Briggs et al. |
| 9,020,240 B2 | 4/2015 | Pettersson et al. |
| 9,033,998 B1 | 5/2015 | Schaible et al. |
| RE45,565 E | 6/2015 | Bridges et al. |
| 9,046,360 B2 | 6/2015 | Atwell et al. |
| 9,074,381 B1 | 7/2015 | Drew |
| 9,109,877 B2 | 8/2015 | Thierman |
| 9,146,315 B2 | 9/2015 | Bosse et al. |
| 9,151,830 B2 | 10/2015 | Bridges |
| 9,163,922 B2 | 10/2015 | Bridges et al. |
| 9,170,096 B2 | 10/2015 | Fowler et al. |
| 9,188,430 B2 | 11/2015 | Atwell et al. |
| 9,207,309 B2 | 12/2015 | Bridges |
| 9,223,025 B2 | 12/2015 | Debrunner et al. |
| 9,229,108 B2 | 1/2016 | Debrunner et al. |
| 9,267,784 B2 | 2/2016 | Atwell et al. |
| 9,278,448 B2 | 3/2016 | Freeman |
| 9,279,661 B2 | 3/2016 | Tateno et al. |
| 9,303,988 B2 | 4/2016 | Tani |
| 9,353,519 B2 | 5/2016 | Williams |
| 9,354,051 B2 | 5/2016 | Dunne et al. |
| 9,358,688 B2 | 6/2016 | Drew |
| 9,367,741 B2 | 6/2016 | Le Marec |
| 9,377,301 B2 | 6/2016 | Neier et al. |
| 9,383,200 B2 | 7/2016 | Hulm et al. |
| 9,395,174 B2 | 7/2016 | Bridges |
| 9,423,282 B2 | 8/2016 | Moy |
| 9,437,005 B2 | 9/2016 | Tateno et al. |
| 9,443,308 B2 | 9/2016 | Pettersson et al. |
| 9,452,533 B2 | 9/2016 | Calkins et al. |
| 9,454,818 B2 | 9/2016 | Cramer |
| 9,476,695 B2 | 10/2016 | Becker et al. |
| 9,482,524 B2 | 11/2016 | Metzler et al. |
| 9,482,525 B2 | 11/2016 | Bridges |
| 9,482,746 B2 | 11/2016 | Bridges |
| 9,494,686 B2 | 11/2016 | Maryfield et al. |
| 9,513,100 B2 | 12/2016 | Raab et al. |
| 9,536,163 B2 | 1/2017 | Veeser et al. |
| 9,541,371 B2 | 1/2017 | Pettersson et al. |
| 9,561,019 B2 | 2/2017 | Mihailescu et al. |
| 9,607,239 B2 | 3/2017 | Bridges et al. |
| 9,618,620 B2 | 4/2017 | Zweigle et al. |
| 9,658,061 B2 | 5/2017 | Wilson et al. |
| 9,671,221 B2 | 6/2017 | Ruhland et al. |
| 9,679,385 B2 | 6/2017 | Suzuki et al. |
| 9,686,532 B2 | 6/2017 | Tohme |
| 9,708,079 B2 | 7/2017 | Desjardien et al. |
| 9,715,730 B2 | 7/2017 | Suzuki |
| 9,720,087 B2 | 8/2017 | Christen et al. |
| 9,734,609 B2 | 8/2017 | Pulla et al. |
| 9,739,595 B2 | 8/2017 | Lau |
| 9,746,308 B2 | 8/2017 | Gong |
| 9,768,837 B2 | 9/2017 | Charvat et al. |
| 9,772,173 B2 | 9/2017 | Atwell et al. |
| 9,803,969 B2 | 10/2017 | Gong |
| 9,816,813 B2 | 11/2017 | Lettau et al. |
| 9,829,305 B2 | 11/2017 | Gong |
| 9,835,717 B2 | 12/2017 | Bosse et al. |
| 9,844,792 B2 | 12/2017 | Pettersson et al. |
| 9,879,976 B2 | 1/2018 | Bridges et al. |
| 9,897,442 B2 | 2/2018 | Pettersson et al. |
| 9,903,939 B2 | 2/2018 | Charvat et al. |
| 9,909,855 B2 | 3/2018 | Becker et al. |
| 9,915,733 B2 | 3/2018 | Fried et al. |
| 9,921,046 B2 | 3/2018 | Gong |
| 9,958,268 B2 | 5/2018 | Ohtomo et al. |
| 9,958,545 B2 | 5/2018 | Eichenholz et al. |
| 9,964,398 B2 | 5/2018 | Becker et al. |
| 9,964,402 B2 | 5/2018 | Tohme et al. |
| 9,967,545 B2 | 5/2018 | Tohme |
| 9,989,353 B2 | 6/2018 | Bartmann et al. |
| 10,012,732 B2 | 7/2018 | Eichenholz et al. |
| 10,030,972 B2 | 7/2018 | Iseli et al. |
| 10,041,793 B2 | 8/2018 | Metzler et al. |
| 10,054,422 B2 | 8/2018 | Böckem et al. |
| 10,058,394 B2 | 8/2018 | Johnson et al. |
| 10,073,162 B2 | 9/2018 | Charvat et al. |
| 10,074,889 B2 | 9/2018 | Charvat et al. |
| 10,082,521 B2 | 9/2018 | Atlas et al. |
| 10,090,944 B1 | 10/2018 | Charvat et al. |
| 10,094,909 B2 | 10/2018 | Charvat et al. |
| 10,126,415 B2 | 11/2018 | Becker et al. |
| 10,189,176 B2 | 1/2019 | Williams |
| 10,220,511 B2 | 3/2019 | Linnell et al. |
| 10,240,949 B2 | 3/2019 | Peters et al. |
| 2002/0176603 A1 | 11/2002 | Bauer et al. |
| 2003/0048459 A1 | 3/2003 | Gooch |
| 2003/0090682 A1 | 5/2003 | Gooch et al. |
| 2003/0120377 A1 | 6/2003 | Hooke et al. |
| 2003/0206285 A1 | 11/2003 | Lau |
| 2004/0078137 A1 | 4/2004 | Breakfield et al. |
| 2004/0200947 A1 | 10/2004 | Lau |
| 2005/0007450 A1 | 1/2005 | Hill et al. |
| 2005/0057745 A1 | 3/2005 | Bontje |
| 2005/0060092 A1 | 3/2005 | Hablani |
| 2005/0086901 A1 | 4/2005 | Chisholm |
| 2005/0131619 A1 | 6/2005 | Rappaport et al. |
| 2005/0196484 A1 | 9/2005 | Khoshnevis |
| 2006/0167587 A1 | 7/2006 | Read |
| 2006/0215179 A1 | 9/2006 | Mcmurtry et al. |
| 2007/0024870 A1 | 2/2007 | Girard et al. |
| 2007/0229802 A1 | 10/2007 | Lau |
| 2007/0284215 A1 | 12/2007 | Rudge |
| 2008/0030855 A1 | 2/2008 | Lau |
| 2008/0189046 A1 | 8/2008 | Eliasson et al. |
| 2009/0038258 A1 | 2/2009 | Pivac et al. |
| 2010/0025349 A1 | 2/2010 | Khoshnevis |
| 2010/0138185 A1 | 6/2010 | Kang |
| 2010/0281822 A1 | 11/2010 | Murray |
| 2011/0066393 A1 | 3/2011 | Groll et al. |
| 2011/0208347 A1 | 8/2011 | Otake et al. |
| 2012/0038074 A1 | 2/2012 | Khoshnevis |
| 2012/0099096 A1 | 4/2012 | Bridges et al. |
| 2012/0277898 A1 | 11/2012 | Kawai et al. |
| 2013/0028174 A1 | 1/2013 | St-pierre et al. |
| 2013/0068061 A1 | 3/2013 | Yoon |
| 2013/0104407 A1 | 5/2013 | Lee |
| 2013/0222816 A1 | 8/2013 | Briggs et al. |
| 2013/0250285 A1 | 9/2013 | Bridges et al. |
| 2013/0286196 A1 | 10/2013 | Atwell |
| 2014/0002608 A1 | 1/2014 | Atwell et al. |
| 2014/0176677 A1 | 6/2014 | Valkenburg et al. |
| 2014/0192187 A1 | 7/2014 | Atwell et al. |
| 2014/0309960 A1 | 10/2014 | Vennegeerts et al. |
| 2014/0343727 A1 | 11/2014 | Calkins et al. |
| 2014/0366481 A1 | 12/2014 | Benson |
| 2015/0082740 A1 | 3/2015 | Peters et al. |
| 2015/0100066 A1 | 4/2015 | Kostrzewski et al. |
| 2015/0134303 A1 | 5/2015 | Chang et al. |
| 2015/0153720 A1 | 6/2015 | Pettersson et al. |
| 2015/0241203 A1 | 8/2015 | Jordil et al. |
| 2015/0258694 A1 | 9/2015 | Hand et al. |
| 2015/0276402 A1 | 10/2015 | Grsser Christian et al. |
| 2015/0293596 A1 | 10/2015 | Krausen et al. |
| 2015/0309175 A1 | 10/2015 | Hinderling et al. |
| 2015/0314890 A1 | 11/2015 | Desjardien et al. |
| 2015/0352721 A1 | 12/2015 | Wicks et al. |
| 2015/0355310 A1 | 12/2015 | Gong et al. |
| 2015/0367509 A1 | 12/2015 | Georgeson |
| 2015/0371082 A1 | 12/2015 | Csaszar et al. |
| 2015/0377606 A1 | 12/2015 | Thielemans |

(56) References Cited

U.S. PATENT DOCUMENTS

| | | |
|---|---|---|
| 2016/0005185 A1 | 1/2016 | Geissler |
| 2016/0153786 A1 | 6/2016 | Liu et al. |
| 2016/0187130 A1 | 6/2016 | Metzler et al. |
| 2016/0187470 A1 | 6/2016 | Becker et al. |
| 2016/0223364 A1 | 8/2016 | Peters et al. |
| 2016/0242744 A1 | 8/2016 | Mihailescu et al. |
| 2016/0263767 A1 | 9/2016 | Williams |
| 2016/0274237 A1 | 9/2016 | Stutz |
| 2016/0282107 A1 | 9/2016 | Roland et al. |
| 2016/0282110 A1 | 9/2016 | Vagman et al. |
| 2016/0282179 A1 | 9/2016 | Nazemi et al. |
| 2016/0288331 A1 | 10/2016 | Sivich et al. |
| 2016/0313114 A1 | 10/2016 | Tohme et al. |
| 2016/0327383 A1 | 11/2016 | Becker et al. |
| 2016/0340873 A1 | 11/2016 | Eidenberger et al. |
| 2016/0341041 A1 | 11/2016 | Puura et al. |
| 2016/0349746 A1 | 12/2016 | Grau |
| 2016/0363436 A1 | 12/2016 | Clark et al. |
| 2016/0363659 A1 | 12/2016 | Mindell et al. |
| 2016/0363663 A1 | 12/2016 | Mindell et al. |
| 2016/0363664 A1 | 12/2016 | Mindell et al. |
| 2016/0364869 A1 | 12/2016 | Siercks et al. |
| 2016/0364874 A1 | 12/2016 | Tohme et al. |
| 2017/0066157 A1 | 3/2017 | Peters et al. |
| 2017/0067739 A1 | 3/2017 | Siercks et al. |
| 2017/0082436 A1 | 3/2017 | Siercks et al. |
| 2017/0091922 A1 | 3/2017 | Siercks et al. |
| 2017/0091923 A1 | 3/2017 | Siercks et al. |
| 2017/0108528 A1 | 4/2017 | Atlas et al. |
| 2017/0122736 A1 | 5/2017 | Dold et al. |
| 2017/0176572 A1 | 6/2017 | Charvat et al. |
| 2017/0179570 A1 | 6/2017 | Charvat |
| 2017/0179603 A1 | 6/2017 | Charvat et al. |
| 2017/0227355 A1 | 8/2017 | Pettersson et al. |
| 2017/0236299 A1 | 8/2017 | Valkenburg et al. |
| 2017/0254102 A1 | 9/2017 | Peters et al. |
| 2017/0269203 A1 | 9/2017 | Trishaun |
| 2017/0307757 A1 | 10/2017 | Hinderling et al. |
| 2017/0314909 A1 | 11/2017 | Dang |
| 2017/0343336 A1 | 11/2017 | Lettau |
| 2018/0003493 A1 | 1/2018 | Bernhard et al. |
| 2018/0017384 A1 | 1/2018 | Siercks et al. |
| 2018/0023935 A1 | 1/2018 | Atwell et al. |
| 2018/0038684 A1 | 2/2018 | Fröhlich et al. |
| 2018/0046096 A1 | 2/2018 | Shibazaki |
| 2018/0052233 A1 | 2/2018 | Frank et al. |
| 2018/0108178 A1 | 4/2018 | Murugappan et al. |
| 2018/0149469 A1 | 5/2018 | Becker et al. |
| 2018/0156601 A1 | 6/2018 | Pontai |
| 2018/0170719 A1 | 6/2018 | Tasch et al. |
| 2018/0180416 A1 | 6/2018 | Edelman et al. |
| 2018/0202796 A1 | 7/2018 | Ziegenbein |
| 2018/0209156 A1 | 7/2018 | Pettersson |
| 2018/0239010 A1 | 8/2018 | Mindell et al. |
| 2019/0032348 A1 | 1/2019 | Parkes |
| 2019/0184555 A1 | 6/2019 | Linnell et al. |
| 2019/0224846 A1 | 7/2019 | Pivac et al. |
| 2019/0251210 A1 | 8/2019 | Pivac et al. |
| 2019/0316369 A1 | 10/2019 | Pivac et al. |
| 2019/0352146 A1 | 11/2019 | Pivac et al. |

FOREIGN PATENT DOCUMENTS

| | | |
|---|---|---|
| CN | 2730976 Y | 10/2005 |
| CN | 2902981 Y | 5/2007 |
| CN | 2923903 Y | 7/2007 |
| CN | 101100903 A | 1/2008 |
| CN | 201184054 Y | 1/2009 |
| CN | 101360873 B | 2/2009 |
| CN | 100557169 C | 11/2009 |
| CN | 101694130 A | 4/2010 |
| CN | 201972413 U | 9/2011 |
| CN | 102359282 A | 2/2012 |
| CN | 202248944 U | 5/2012 |
| CN | 202292752 U | 7/2012 |
| CN | 102995911 A | 3/2013 |
| CN | 202925913 U | 5/2013 |
| CN | 203701626 U | 7/2014 |
| CN | 104141391 B | 11/2014 |
| CN | 104153591 A | 11/2014 |
| CN | 104493810 A | 4/2015 |
| CN | 204295678 U | 4/2015 |
| CN | 104612411 A | 5/2015 |
| CN | 204311767 U | 5/2015 |
| CN | 103774859 B | 11/2015 |
| CN | 103753586 B | 12/2015 |
| CN | 105113373 A | 12/2015 |
| CN | 105178616 A | 12/2015 |
| CN | 105257008 B | 1/2016 |
| CN | 105544998 A | 5/2016 |
| CN | 104806028 B | 11/2016 |
| CN | 205668271 U | 11/2016 |
| CN | 205840368 U | 12/2016 |
| CN | 205990775 U | 3/2017 |
| CN | 206185879 U | 5/2017 |
| CN | 206189878 U | 5/2017 |
| CN | 105089274 B | 6/2017 |
| CN | 105064699 B | 7/2017 |
| CN | 107217859 A | 9/2017 |
| CN | 107237483 A | 10/2017 |
| CN | 107357294 A | 11/2017 |
| CN | 107605167 A | 1/2018 |
| CN | 206844687 U | 1/2018 |
| CN | 107654077 A | 2/2018 |
| CN | 107675891 A | 2/2018 |
| CN | 107740591 A | 2/2018 |
| CN | 106088632 B | 3/2018 |
| CN | 107762165 A | 3/2018 |
| CN | 207063553 U | 3/2018 |
| CN | 106088631 B | 5/2018 |
| CN | 107975245 A | 5/2018 |
| CN | 108061551 A | 5/2018 |
| CN | 108222527 A | 6/2018 |
| CN | 108301628 A | 7/2018 |
| CN | 108331362 A | 7/2018 |
| CN | 106150109 B | 8/2018 |
| CN | 108457479 A | 8/2018 |
| CN | 108708560 A | 10/2018 |
| CN | 208023979 U | 10/2018 |
| CN | 106881711 A | 4/2019 |
| CN | 107083845 A | 6/2019 |
| CN | 108016585 B | 7/2019 |
| DE | 3430915 C2 | 3/1986 |
| DE | 4038260 C2 | 6/1991 |
| DE | 4207384 A1 | 9/1993 |
| DE | 19509809 A1 | 10/1995 |
| DE | 4417928 A1 | 11/1995 |
| DE | 29601535 U1 | 5/1997 |
| DE | 19600006 A1 | 7/1997 |
| DE | 19603234 C2 | 9/1997 |
| DE | 19743717 C2 | 4/1999 |
| DE | 19849720 A1 | 5/2000 |
| DE | 10230021 C1 | 7/2003 |
| DE | 102006030130 B3 | 9/2007 |
| DE | 102009018070 A1 | 10/2010 |
| DE | 202012100646 U1 | 6/2013 |
| DE | 102013019869 A1 | 5/2015 |
| EP | 190076 A1 | 8/1986 |
| EP | 370682 A2 | 5/1990 |
| EP | 456020 A1 | 1/1995 |
| EP | 493020 B1 | 4/1995 |
| EP | 495525 B1 | 4/1995 |
| EP | 836664 B1 | 1/1999 |
| EP | 674069 B1 | 12/1999 |
| EP | 1918478 A2 | 5/2008 |
| EP | 2112291 A1 | 10/2009 |
| EP | 2219528 A1 | 8/2010 |
| EP | 2249997 A1 | 11/2010 |
| EP | 2353801 A2 | 8/2011 |
| EP | 2199719 B1 | 10/2014 |
| ES | 2296556 A1 | 4/2008 |
| FR | 2230825 A1 | 12/1974 |
| FR | 2524522 A1 | 10/1983 |
| GB | 119331 A | 10/1918 |

(56) References Cited

FOREIGN PATENT DOCUMENTS

| | | |
|---|---|---|
| GB | 2198105 A | 5/1923 |
| GB | 673472 A | 6/1952 |
| GB | 682010 A | 11/1952 |
| GB | 839253 A | 6/1960 |
| GB | 1067604 A | 5/1967 |
| GB | 1465068 A | 2/1977 |
| GB | 125079 D | 12/2001 |
| GB | 2422400 A | 7/2006 |
| JP | H07101509 A | 11/1999 |
| JP | 4294990 B2 | 4/2009 |
| JP | 5508895 B2 | 3/2014 |
| LU | 87054 A1 | 6/1989 |
| LU | 87381 A1 | 6/1990 |
| LU | 88144 A1 | 4/1994 |
| RU | 85392 U1 | 8/2009 |
| WO | 9702397 A1 | 1/1997 |
| WO | 2001076830 A1 | 10/2001 |
| WO | 2004020760 A1 | 3/2004 |
| WO | 2004083540 A3 | 2/2005 |
| WO | 2005014240 A1 | 2/2005 |
| WO | 2005017550 A2 | 2/2005 |
| WO | 2005070657 A1 | 8/2005 |
| WO | 2006111827 A1 | 10/2006 |
| WO | 2007076581 A1 | 7/2007 |
| WO | 2008124713 A2 | 10/2008 |
| WO | 2009026641 A1 | 3/2009 |
| WO | 2009026642 A1 | 3/2009 |
| WO | 2010020457 A1 | 2/2010 |
| WO | 2011077006 A2 | 6/2011 |
| WO | 2013088154 A1 | 6/2013 |
| WO | 2013134559 A1 | 9/2013 |
| WO | 2018009978 A1 | 1/2018 |
| WO | 2018009980 A1 | 1/2018 |
| WO | 2018009981 A1 | 1/2018 |
| WO | 2018009985 A1 | 1/2018 |
| WO | 2018009986 A1 | 1/2018 |
| WO | 2018052469 A3 | 4/2018 |
| WO | 201899323 A1 | 6/2018 |
| WO | 2019006511 A1 | 1/2019 |
| WO | 2019014701 A1 | 1/2019 |
| WO | 2019014702 A1 | 1/2019 |
| WO | 2019014705 A1 | 1/2019 |
| WO | 2019014706 A1 | 1/2019 |
| WO | 2019014707 A1 | 1/2019 |
| WO | 2019033165 A1 | 2/2019 |
| WO | 2019033166 A1 | 2/2019 |
| WO | 2019033170 A1 | 2/2019 |
| WO | 2019068128 A1 | 4/2019 |
| WO | 2019071313 A1 | 4/2019 |

OTHER PUBLICATIONS

Fastbrick Robotics [Viewed on internet on Nov. 29, 2016] Viewed on internet. <URL:https://www.youtube.com/watch?v=7Zw7qHxMtrY > published on Nov. 16, 2015.
Tarek Zaki: "Parametric Modeling of Blockwall Assemblies for Automated Generation of Shopdrawings and Detailed Estimates using BIM", Master's Thesis, May 23, 2016, pp. 1-151, XP055668673. Retrieved from the Internet: http://dar.aucegypt.edu/handle/10526/4756 (152 pages).
Partial Supplementary European Search Report received for European Application 17826696.1, dated Apr. 14, 2020 (10 pages).
Delgado, R. et al.: "Development and Control of an Omnidirectional Mobile Robot on an EtherCAT Network", International Journal of Applied Engineering Research, vol. 11, No. 21, 2016, pp. 10586-10592, XP055574484 *.
Dorfler, K. et al.: "Mobile Robotic Brickwork ', Automation of a Discrete Robotic Fabrication Process Using an Autonomous Mobile Robot Robotic Fabrication in Architecture", Art and Design 2016, Feb. 4, 2016 (Feb. 4, 2016), pp. 204-217, XP055567451 *.
Egerstedt, M. et al.: "Control of Mobile Platforms using a Virtual Vehicle Approach", IEEE Transactions on Automatic Control, vol. 46, No. 11, Nov. 2001 (Nov. 1, 2011), XP055567515 *.
Fastbrick Robotics, Fastbrick Robotics: Hadrian 105 First Look Revealed, Nov. 16, 2015 (Nov. 16, 2015), XP054978174, Retrieved from the Internet <URL:https://www.youtube.com/watch?v=7Zw7qHxMtrY> [retrieved on Nov. 16, 2015] *.
Feng, C. et al.: "Vision Guided Autonomous Robotic Assembly and as-built Scanning on Unstructured Construction Sites", Automation in Construction, vol. 59, Nov. 2015 (Nov. 1, 2015), pp. 128-138, XP055567454 *.
Gao, X. et al.: "Complete Solution Classification for the Perspective-Three-Point Problem", IEEE Transactions on Pattern Analysis and Machine Intelligence, vol. 25, No. 8, Aug. 2003 (Aug. 1, 2003), pp. 930-943, XP011099374 *.
Giftthaler, M. et al., "Efficient Kinematic Planning for Mobile Manipulators with Non-holonomic Constraints Using Optimal Control", 2017 IEEE International Conference on Robotics and Automation (ICRA), Singapore, May 29-Jun. 3, 2017.
Heintze, H., "Design and Control of a Hydraulically Actuated Industrial Brick Laying Robot," 264 pages.
Heintze, J. et al., "Controlled hydraulics for a direct drive brick laying robot," Automation in Construction 5 (1996), pp. 23-29.
Helm, V. et al.: "Mobile Robotic Fabrication on Construction Sites: dimRob", IEEE /RSJ International Conference on Intelligent Robots and Systems, Oct. 7, 2012 (Oct. 7, 2012), Vilamoura, Portugal, pp. 4335-4341, XP032287463 *.
http://www.new-technologies.org/ECT/Other/brickrob.htm. "Emerging Construction Technologies." Dec. 1, 2006.
Huang, S. et al., "Applying High-Speed Vision Sensing to an Industrial Robot for High-Performance Position Regulation under Uncertainties," Sensors, 2016, 16, 1195, 15 pages.
International Preliminary Report on Patentability for International Application No. PCT/AU2017/050731; dated Jan. 15, 2019; 5 pages.
International Preliminary Report on Patentability for International Application No. PCT/AU2017/050738; dated Jan. 15, 2019; 13 pages.
International Preliminary Report on Patentability for International Application No. PCT/AU2017/050739; dated Jan. 15, 2019; 6 pages.
International Search Report and Written Opinion for International Application No. PCT/AU2017/050730; dated Aug. 23, 2017; 17 pages.
International Search Report and Written Opinion for International Application No. PCT/AU2017/050731; dated Aug. 31, 2017; 8 pages.
International Search Report and Written Opinion for International Application No. PCT/AU2017/050738; dated Oct. 17, 2017; 19 pages.
International Search Report and Written Opinion for International Application No. PCT/AU2017/050739; dated Sep. 28, 2017; 9 pages.
Kazemi, M. et al.: "Path Planning for Image-based Control of Wheeled Mobile Manipulators", 2012 IEEE /RSJ International Conference on Intelligent Robots and Systems, Oct. 7, 2012 (Oct. 7, 2012), Vilamoura, Portugal, XP055567470 *.
Kleinkes, M. et al.: "Laser Tracker and 6DoF measurement strategies in industrial robot applications", CMSC 2011: Coordinate Metrology System Conference, Jul. 25, 2011 (Jul. 25, 2011), XP055456272 *.
Koren et al.: "End-effector guidance of robot arms", CIRP Annals-Manufacturing Technology, vol. 36, No. 1, 1987, pp. 289-292, XP055456270 *.
Kwon, S. et al., "On the Coarse/Fine Dual-Stage Manipulators with Robust Perturbation Compensator," IEEE, May 21-26, 2001, pp. 121-126.
Kyle in CMSC: Charlotte-Concord, Jul. 21-25, 2008.
Latteur, et al., "Drone-Based Additive Manufacturing of Architectural Structures," IASS Symposium 2015, Amsterdam, The Netherlands; Aug. 17-20, 2015; 12 pages.
Lippiello, V. et al.: "Position-Based Visual Servoing in Industrial Multirobot Cells Using a Hybrid Camera Configuration", IEEE Transactions on Robotics, vol. 23, No. 1, Feb. 2007 (Feb. 1, 2007), XP011163518 *.

(56) References Cited

OTHER PUBLICATIONS

Liu, Z. et al.: "EtherCAT Based Robot Modular Joint Controller", Proceeding of the 2015 IEEE International Conference on Information and Automation, Aug. 2015 (Aug. 1, 2015), Lijiang, China, pp. 1708-1713, XP033222650 *.

Notice of Acceptance of Patent Application received for priority Australian Patent Application No. 2017294796, dated May 15, 2019 (158 pages).

Pless, R.: "Using Many Cameras as One", IEEE Computer Society Conference on Computer Vision and Pattern Recognition, Jun. 18, 2003 (Jun. 18, 2003), Madison, WI, USA, pp. 1-7, XP055564465 *.

Posada et al.: "High accurate robotic drilling with external sensor and compliance model-based compensation", Robotics and Automation (ICRA), 2016 IEEE International Conference, May 16, 2016 (May 16, 2016), pp. 3901-3907, XP032908649 *.

Pritschow, G. et al., "A Mobile Robot for On-Site Construction of Masonry," Inst. of Control Tech. for Machine Tools and Manuf. Units, pp. 1701-1707.

Pritschow, G. et al., "Application Specific Realisation of a Mobile Robot for On-Site Construction of Masonry," Automation and Robotics in Construction XI, 1994, pp. 95-102.

Pritschow, G. et al., "Configurable Control System of a Mobile Robot for On-Site Construction of Masonry," Inst. of Control Technology for Machine Tools and Manuf. Units, pp. 85-92.

Pritschow, G. et al., "Technological aspects in the development of a mobile bricklaying robot," Automation in Construction 5 (1996), pp. 3-13.

Riegl Laser Measurement Systems. "Long Range & High Accuracy 3D Terrestrial Laser Scanner System—LMS-Z420i." pp. 1-4.

Salcudean, S. et al., "On the Control of Redundant Coarse-Fine Manipulators," IEEE, pp. 1834-1840.

Sandy, T. et al.: "Autonomous Repositioning and Localization of an In Situ Fabricator", 2016 IEEE International Conference on Robotics and Automation (ICRA), May 16, 2016 (May 16, 2016), pp. 2852-2858, XP055567467 *.

Skibniewski, M.J., "Current Status of Construction Automation and Robotics in the United States of America," The 9th International Symposium on Automation and Robotics in Construction, Jun. 3-5, 1992, 8 pages.

Trimble ATS. "Advanced Tracking Sensor (ATS) with target recognition capability for stakeless machine control survey applications." pp. 1-4.

Vincze, M. et al., "A Laser Tracking System to Measure Position and Orientation of Robot End Effectors Under Motion," The International Journal of Robotics Research, vol. 13, No. 4, Aug. 1994, pp. 305-314.

Warszawski, A. et al., "Implementation of Robotics in Building: Current Status and Future Prospects," Journal of Construction Engineering and Management, Jan./Feb. 1998, 124(1), pp. 31-41.

Willmann, J. et al.: "Robotic Timber Construction—Expanding Additive Fabrication to New Dimensions", Automation in Construction, vol. 61, 2016, pp. 16-23, XP029310896 *.

Xu, H. et al.: "Uncalibrated Visual Servoing of Mobile Manipulators with an Eye-to-hand Camera", Proceedings of the 2016 IEEE International Conference on Robotics and Biomimetics, Dec. 3, 2016 (Dec. 3, 2016), Qingdao, China, pp. 2145-2150, XP033071767 *.

Yu, S.N. et al., "Feasibility verification of brick-laying robot using manipulation trajectory and the laying pattern optimization," Dept. of Mech. Eng., Automation in Construction (2009), pp. 644-655.

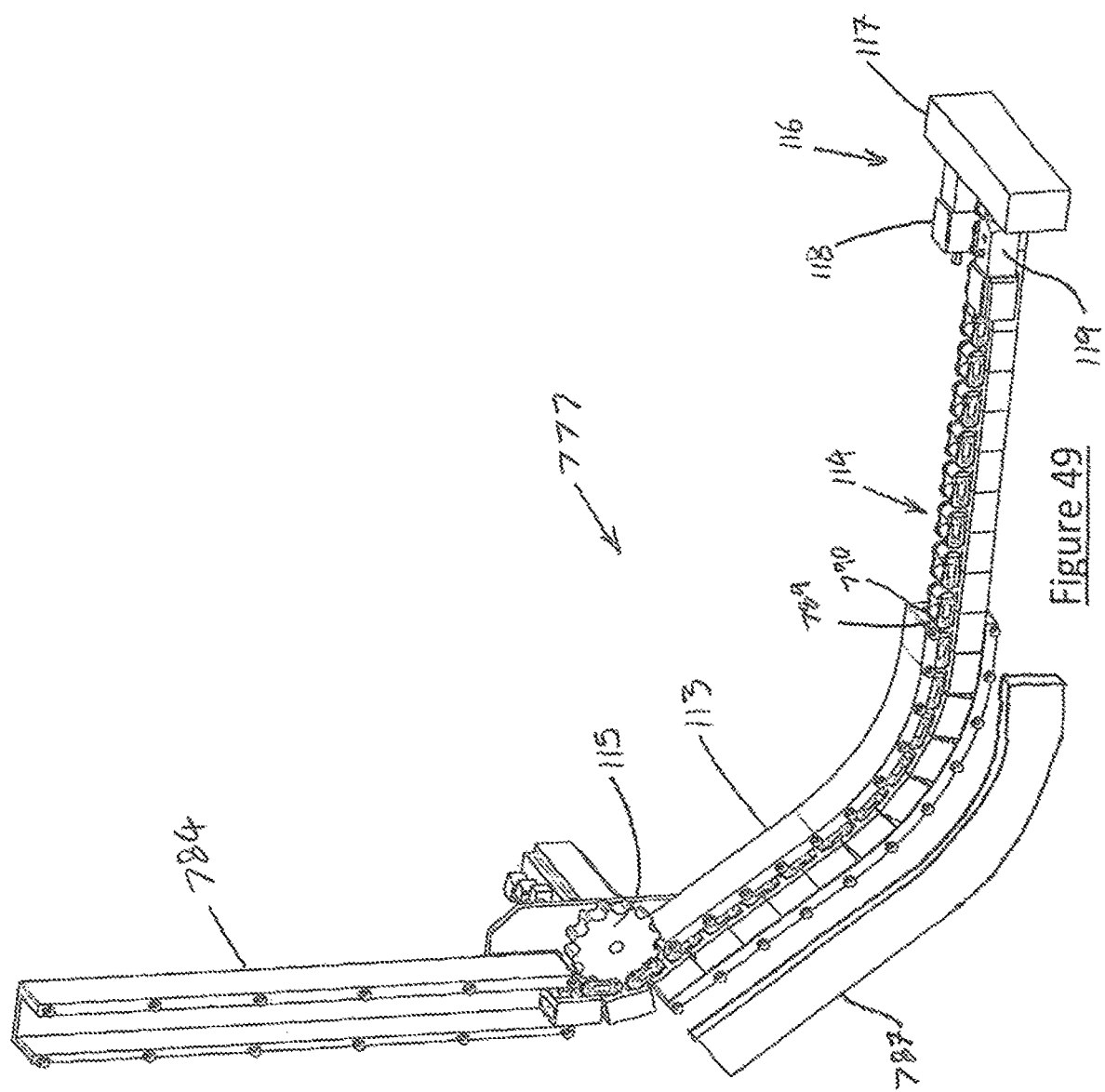

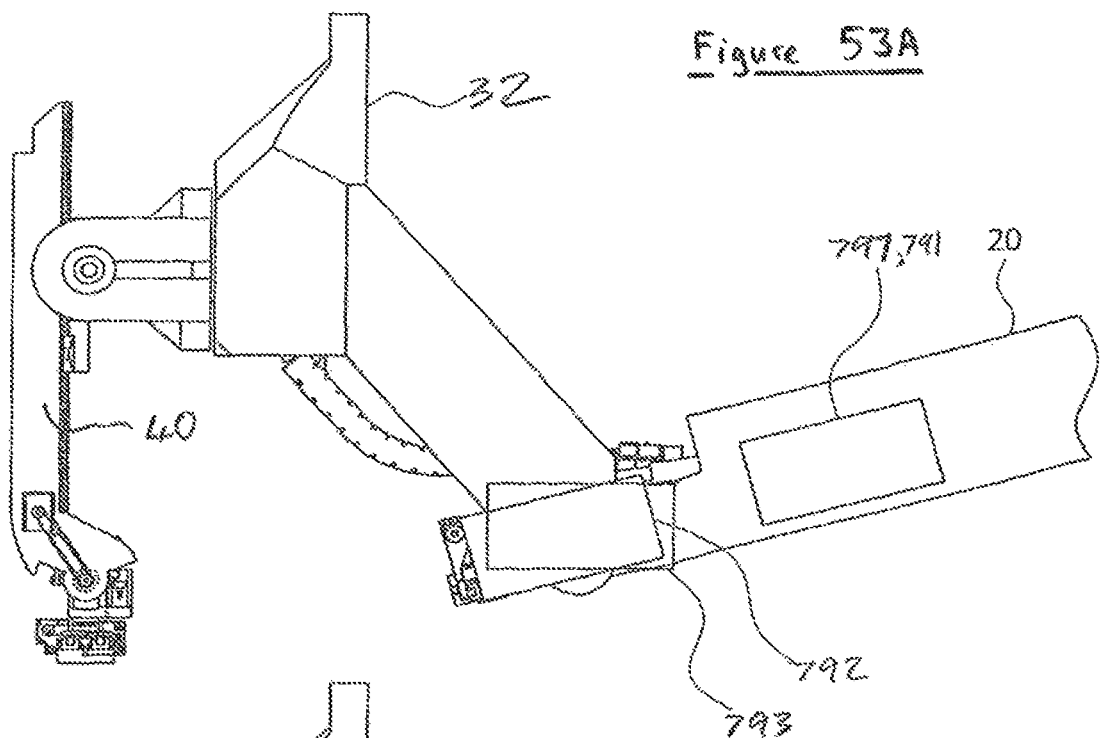
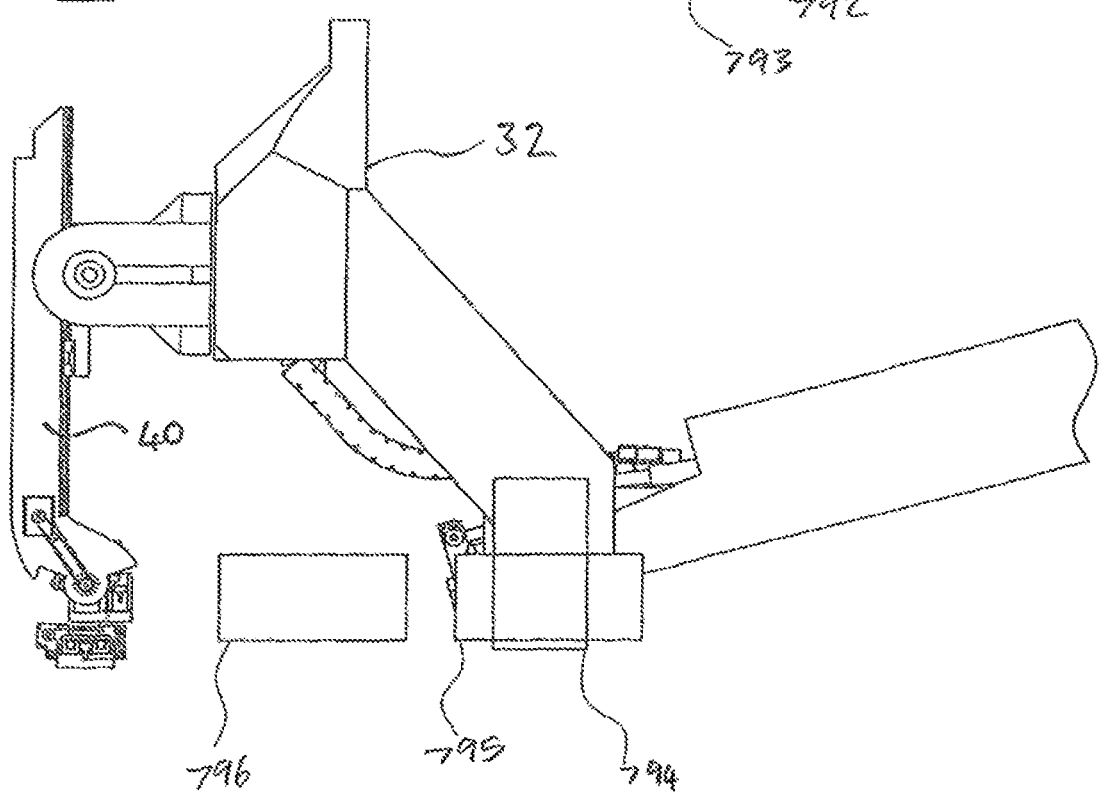
Figure 53

BOOM FOR MATERIAL TRANSPORT

CROSS-REFERENCE TO RELATED APPLICATIONS

This application is a continuation of U.S. patent application Ser. No. 16/317,779 filed on Jan. 14, 2019, which is a national stage entry under 35 C.F.R. 371 of International Application No. PCT/AU2017/050730 filed on Jul. 14, 2017, which claims priority to Australian Patent Application No. 2016902789 filed on Jul. 15, 2016, the disclosures of which are each incorporated by reference herein in their entireties.

TECHNICAL FIELD

This invention relates to the conveying of materials, and in particular to a boom for conveying items such as bricks of blocks for use in building.

BACKGROUND ART

The following discussion of the background art is intended to facilitate an understanding of the present invention only. It should be appreciated that the discussion is not an acknowledgement or admission that any of the material referred to was part of the common general knowledge as at the priority date of the application.

The inventor previously described a brick laying machine in U.S. Pat. No. 8,166,727. An early prototype brick laying machine, based on that described in U.S. Pat. No. 8,166,727, and built by the inventor, used a chain conveyor with brick holding clamps attached to the chain. This chain moved from the base of the machine, out along a boom, to the laying head system. There was a small chain take up mechanism to take up variations in chain length due to changes in boom geometry. The take up mechanism also allowed some independence between the brick preparation and the laying, however the relatively short length of the take up mechanism meant that the brick preparation and the laying head needed to be synchronised at least some of the time. This meant that the slowest process limited the progress of bricks through the chain. Depending on the process of the current bricks being laid, either the brick preparation or the laying head could be the slowest process.

The chain followed a relatively complex path around the boom and telescopic stick so that as the telescopic stick was extended, the total chain length remained the same. The chain had brick griping clamps attached to it, so as it wrapped back and forth, it took up considerable space. If the telescopic stick had many stages, the amount of space taken up by the chain and grippers would greatly increase, making the boom and stick assembly larger than is desirable for road transport.

A brick conveyor using flat belts was investigated by the inventor. This required a substantially level orientation of the boom and telescopic stick and would require other means of moving the bricks vertically to accommodate for the change in laying height as the structure is built course by course. It was also determined that some cut bricks could be quite short compared to their height and would be unstable if transported on a flat belt conveyor. In the case of a telescopic stick and boom, dealing with excess belt length would encounter the same problems as the chain conveyor.

It is therefore an object of this invention to provide a boom that can be incorporated into a brick laying machine that could be a road-going vehicle or in a larger arrangement assembled in situ, and which would overcome at least some of the aforementioned problems.

Throughout the specification unless the context requires otherwise, the word "comprise" or variations such as "comprises" or "comprising", will be understood to imply the inclusion of a stated integer or group of integers but not the exclusion of any other integer or group of integers.

In this specification the word "brick" is intended to encompass any building element such as a brick or block, to be placed during the construction of a building or wall or the like. Further, it is anticipated that the conveyance of items other than bricks is contemplated by the invention.

SUMMARY OF INVENTION

A telescoping boom is provided with internal shuttles. The shuttles are fitted with clamps. Each section of boom has a shuttle. The shuttles move an object along the boom and pass it from one shuttle to the next. In a preferred arrangement the telescoping boom may be foldable, in order to provide extended reach with compact stowage.

In accordance with the invention there is provided a telescoping extendable boom for transporting an item, said telescoping extendable boom having a plurality of tubular elements, each of said tubular elements being arranged with a longitudinally extending track inside said tubular element, each said longitudinally extending track supporting a single shuttle internally inside its tubular element for movement therealong, each said shuttle being equipped with a clamp to selectively clamp a said item, the longitudinally extending tracks of immediately connecting telescoping tubular elements being located opposite each other, the inner tubular elements inside said telescoping extendable boom being arranged at their near ends to allow their shuttles to access shuttles of outer tubular elements to enable clamps thereof to transfer a said item therebetween.

Preferably the internal interconnecting telescoping tubular elements have a void at their near ends opposite said track therein to allow their shuttles to access shuttles of outer tubular elements to enable the clamps thereof to transfer a said item therebetween.

Preferably said telescoping extendable boom includes at its remote end, a pivotable clamp to receive and clamp an item presented by said first conveying apparatus and particularly said shuttle in said remote end tubular element, said pivotable clamp being pivotally mounted about a horizontal axis and arranged to present said item for further handling.

Preferably said pivotable clamp is mounted on a linear sliding mount that has travel extending in a direction linearly through said horizontal axis and normal thereto. In this manner said pivotable clamp can reach into the remote end of the telescoping extendable boom to clamp the item, before withdrawing and pivoting about to present the item for further handling.

Also in accordance with the present invention, there is provided a foldable boom comprising a first boom element in the form of a telescoping extendable boom as hereinbefore described, connected at one end thereof to a second boom element about a folding axis, said second boom element also having a longitudinally extending track inside said second boom element supporting a shuttle internally for movement therealong, wherein said foldable boom is arranged to allow the shuttle of said second boom element and the shuttle in the tubular element at said one end of said first boom element, to transfer a said item therebetween.

Also in accordance with the present invention there is provided a foldable boom comprising a first boom element and a second boom element, both in the form of a telescoping extendable boom as hereinbefore described, connected at one end of each thereof about a folding axis, wherein said foldable boom is arranged to allow the shuttles in the tubular elements adjacent the folding axis to transfer a said item therebetween.

In accordance with a preferred feature of either foldable boom as described above, said track runs along one side of a said boom element, and runs along the same side of an adjacent said boom element connected about a said folding axis, and a pivoting shuttle equipped with a clamp to hold a said item is provided, pivoting about said folding axis, to transfer said item between shuttles in boom elements connected about said folding axis.

Preferably said tracks in the aforementioned arrangement run along the lengths of the boom elements on the side opposite to the side where the folding axis is located.

Preferably the distal telescoping element of one of said first boom element and said second boom element is smaller in cross sectional dimensions than the interconnected said tubular element of the other boom element connected about said folding axis, and said distal telescoping element is offset relative to said folding axis, to substantially centrally align the pathway through said elements at the folding axis, when the elements are interconnected about said folding axis substantially in a straight line.

Preferably, in the shuttle in the interconnected element of said boom element having the larger cross-sectional dimensions connected about said folding axis, the clamp thereof includes a deviation in its arms to provide clearance for the intruding part of the distal telescoping element of the boom element having the smaller cross-sectional dimensions, when the elements are interconnected about said folding axis substantially in a straight line.

In the telescoping elements, the track runs along one side of one tubular element, and runs along an opposite side of an immediate interconnecting telescoping tubular element, so that the shuttle located in the tracks of both tubular elements can locate opposite each other in order to effect transfer of a said item from the clamp of one shuttle to the clamp of the other shuttle.

Preferably the internal interconnecting telescoping tubular elements have a void at their near ends opposite said track therein to allow their shuttles to access shuttles of outer tubular elements to enable the clamps thereof to transfer a said item therebetween.

It will be understood that where there are three or more telescoping tubular elements, the track of the first third and fifth elements will be located on one side of these tubular elements, while the tracks of the second and fourth tubular elements will be located on the opposite side. The shuttles will run along the length of the elements, at least as far as they have been telescopingly extended, passing a brick from one said tubular element to the next, and so on, to effect transfer of said item along the extent of the telescoping part of the boom.

At the folding axis of two boom elements, in an arrangement where the folding axis extends horizontally on the underside of the boom elements, and a pivoting shuttle pivots about the same folding axis, the tracks run along the top of the boom elements that are connected about the folding axis, with the clamps of the shuttles extending down away from the tracks. The clamp on the pivoting shuttle extends upward away from the folding axis. The tracks of the boom elements that are connected about the folding axis overlap in the same manner, so that a shuttle arrives at the folding junction with a said item, the pivoting shuttle clamps the item before the shuttle moves away, the pivoting shuttle pivots as necessary to align with the next boom element and presents the item to the shuttle in the next boom element, to effect transfer of the item between the shuttles of the elements at the folding intersection.

It will be understood that with the use of pivoting shuttles at the folding axis, the orientation of the item relative to the tubular element will remain the same throughout the folding boom.

A foldable boom may be made with a third boom element and second folding axis, and further boom elements connected about further folding axes, in like manner to that described in relation to the first and second boom elements.

Preferably said foldable boom includes at its remote end, a pivotable clamp to receive and clamp an item presented by said first conveying apparatus and particularly by said shuttle in said remote end tubular element, said pivotable clamp being pivotally mounted about a second horizontal axis and arranged to present said item for further handling.

Preferably said pivotable clamp is mounted on a linear sliding mount that has travel extending in a direction linearly through said second horizontal axis and normal thereto.

Also in accordance with the invention, there is provided a foldable boom for conveying an item, said foldable boom being foldable about at least one folding axis, said foldable boom being locatable in a folded stowed position, and moveable to unfolded extended positions; said boom having a near end arranged for pivotal movement about a first horizontal axis located on a turret, said turret being rotatable about a vertical axis; said foldable boom having first conveying apparatus to convey an item therealong, internally within said foldable boom, to a remote end of the foldable boom; wherein said foldable boom is foldable about a folding axis, and a pivoting shuttle equipped with a clamp to releasably hold an item is provided at said folding axis to transfer said item between said first conveying apparatus in boom elements connected about said folding axis.

Preferably said turret has a carousel extending at least partially around said turret near the base thereof, said turret having second conveying apparatus to convey an item vertically from said carousel to said first conveying apparatus, said carousel being rotatable about a vertical axis to present an item for access by said second conveying apparatus.

Preferably said first conveying apparatus comprises at least one shuttle equipped with a clamp to releasably hold an item, said shuttle running along a track extending along said boom.

Preferably said foldable boom comprises a first boom element and a second boom element pivotable about a said folding axis spaced from said first horizontal axis, and parallel therewith.

Preferably each boom element has a said track and at least one said shuttle.

Preferably at least one of said first boom element and said second boom element, has further elements arranged in telescoping interconnection.

Preferably both said first boom element and said second boom element have further elements arranged in telescoping interconnection.

Preferably said elements are tubular, preferably rectangular or square in cross-section.

Preferably each element has a said track and one said shuttle arranged to run along said track, between opposed ends of each said element.

Preferably said tracks are arranged located internally inside said elements, and said shuttles run inside their respective elements.

Preferably said track runs along one side of a said boom element, and runs along an opposite side of an immediately interconnecting said boom element, so that the shuttle located in the tracks of both boom elements can locate opposite each other in order to effect transfer of an item from the clamp of one shuttle to the clamp of the other shuttle.

Preferably said track runs along one side of a said boom element, and runs along the same side of an adjacent said boom element connected about a said folding axis, and a pivoting shuttle equipped with a clamp to hold an item is provided, pivoting about said folding axis, to transfer an item between shuttles in boom elements connected about said folding axis.

Preferably said tracks in the aforementioned arrangement run along the lengths of the boom elements on the side opposite to the side where the folding axis is located.

Preferably the distal telescoping element of said first boom element is smaller in cross sectional dimensions than the interconnected element of said second boom element connected about said folding axis, and said distal telescoping element is offset relative to said folding axis, to substantially centrally align the pathway through said elements at the folding axis, when the elements are interconnected about said folding axis substantially in a straight line.

Preferably, in the shuttle in the interconnected element of said second boom element connected about said folding axis, the clamp there of includes a deviation in its arms to provide clearance for the intruding part of the distal telescoping element of said first boom element, when the elements are interconnected about said folding axis substantially in a straight line.

Alternatively, the distal telescoping element of said first boom element differs in cross sectional dimensions from the interconnected element of said second boom element connected about said folding axis, and the smaller of the elements is offset relative to said folding axis, to substantially centrally align the pathway through said elements at the folding axis, when the elements are interconnected about said folding axis substantially in a straight line. Preferably, in the shuttles in the boom elements connected about said folding axis, the clamp of the shuttle contained in the boom element having a greater cross-sectional size includes a deviation in its arms to provide clearance for the intruding part of the boom element with the lesser cross-sectional size, when the boom elements are interconnected about said folding axis substantially in a straight line.

Preferably said track runs along one side of one element, and runs along an opposite side of an immediate interconnecting telescoping element, so that the shuttle located in the tracks of both elements can locate opposite each other in order to effect transfer of an item from the clamp of one shuttle to the clamp of the other shuttle.

Preferably the internal interconnecting telescoping elements have a void at their near ends opposite said track therein to allow their shuttles to access shuttles of outer tubular elements to enable the clamps thereof to transfer an item therebetween.

It will be understood that where there are three or more telescoping elements, the track of the first third and fifth elements will be located on one side of these elements, while the tracks of the second and fourth elements will be located on the opposite side. The shuttles will run along the length of the elements, at least as far as they have been telescopingly extended, passing an item from one said element to the next, and so on, to effect transfer of the item along the extent of the telescoping part of the folding boom.

At the folding axis of the two boom elements, the folding axis extends horizontally on the underside of the boom elements, and a pivoting shuttle pivots about the same folding axis. The tracks run along the top of the boom elements that are connected about the folding axis, with the clamps of the shuttles extending away from the tracks. The clamp on the pivoting shuttle extends away from the location of the folding axis. The tracks of the boom elements that are connected about the folding axis overlap in the same manner, so that a shuttle arrives at the folding junction with an item, the pivoting shuttle clamps the item before the shuttle moves away, the pivoting shuttle pivots to the extent necessary to align with the next boom element and presents the item to the shuttle in the next boom element, to effect transfer of the item between the shuttles of the elements at the folding intersection.

Preferably the second conveying apparatus comprises a turret track extending vertically along said turret, said turret track having a shuttle with a turret shuttle clamp to clamp an item, the shuttle conveying the item from the carousel to the shuttle in the near end of the foldable boom.

Preferably the turret supports a rotating mechanism having a clamp to clamp an item presented by said turret shuttle clamp, said rotating mechanism being provided to rotate an item so that its longitudinal extent aligns with the longitudinal extent of said first boom element, for presentation to a said at least one shuttle.

Preferably the rotating mechanism has a clamp to clamp an item, and is mounted about said first horizontal axis.

Preferably the carousel has a carousel clamp to clamp an item, and in use, the carousel is rotated to align its clamp with the clamp of the shuttle on the track on the turret, so the item can be transferred from the carousel clamp to the turret shuttle clamp, before the turret shuttle transfers the item along the turret track to reach the first shuttle of the foldable boom. Preferably the carousel clamp can pivot from a first position in which the item is deposited on the carousel to a second position in which it presents the brick to the turret shuttle clamp.

Preferably said foldable boom includes at its remote end, a pivotable clamp to receive and clamp an item presented by said first conveying apparatus, said pivotable clamp being pivotally mounted about a second horizontal axis and arranged to present said item for further handling.

Preferably said pivotable clamp is mounted on a linear sliding mount that has travel extending in a direction linearly through said second horizontal axis and normal thereto.

Still further, in accordance with the invention there is provided a boom for conveying an item, said boom having a near end arranged for pivotal movement about a first horizontal axis located from a top of a turret, said turret being rotatable about a vertical axis and said boom rotating therewith; said boom having first conveying apparatus to convey an item therealong, to a remote end of the boom; said turret having a carousel on which said item may be placed, said carousel extending at least partially around said turret near the base thereof, said turret having second conveying apparatus to convey said item vertically from said carousel to said first conveying apparatus, said carousel being rotatable about a vertical axis to present said item for access by said second conveying apparatus.

Preferably the carousel has a carousel clamp to clamp said item. In use, the carousel is rotated to align its clamp with the clamp of the shuttle on the turret track, so the brick can be transferred from the carousel clamp to the turret shuttle clamp, before the turret shuttle transfers the brick along the turret track to reach the first shuttle of the foldable boom.

Preferably the carousel clamp can pivot from a first position in which it receives a brick from the programmable brick handling apparatus to a second position in which it presents the brick to the turret shuttle clamp.

Preferably said first conveying apparatus comprises at least one shuttle equipped with a clamp to releasably hold said item, said shuttle running along a track extending along said boom.

Preferably said boom comprises a foldable boom, said foldable boom being foldable about at least one folding axis, said foldable boom being locatable in a folded stowed position, and moveable to unfolded extended positions.

Preferably said foldable boom has a first boom element and a second boom element pivotable about a folding axis spaced from said first horizontal axis, and parallel therewith.

Preferably each boom element has a said track and at least one said shuttle, and each said shuttle is confined for movement along said track within its said boom element.

As an alternative, preferably at least one of said first boom element and said second boom element, comprises a plurality of elements arranged in telescoping interconnection. In this arrangement, preferably each element of said plurality of elements has a said track and at least one said shuttle, and each said shuttle is confined for movement along said track within its said element.

Preferably said first conveying apparatus is configured to convey said item internally within said boom.

BRIEF DESCRIPTION OF DRAWINGS

A preferred embodiment of the invention comprising articulated telescoping booms incorporated into an automated brick laying machine will now be explained in the following description made with reference to the drawings, in which:

FIG. 49 shows a view of the adhesive applicator 777.

FIGS. 53 and 53A each show a side view of the brick laying and adhesive applying head 32 and fifth stick 20.

DESCRIPTION OF EMBODIMENTS

Figure 1:
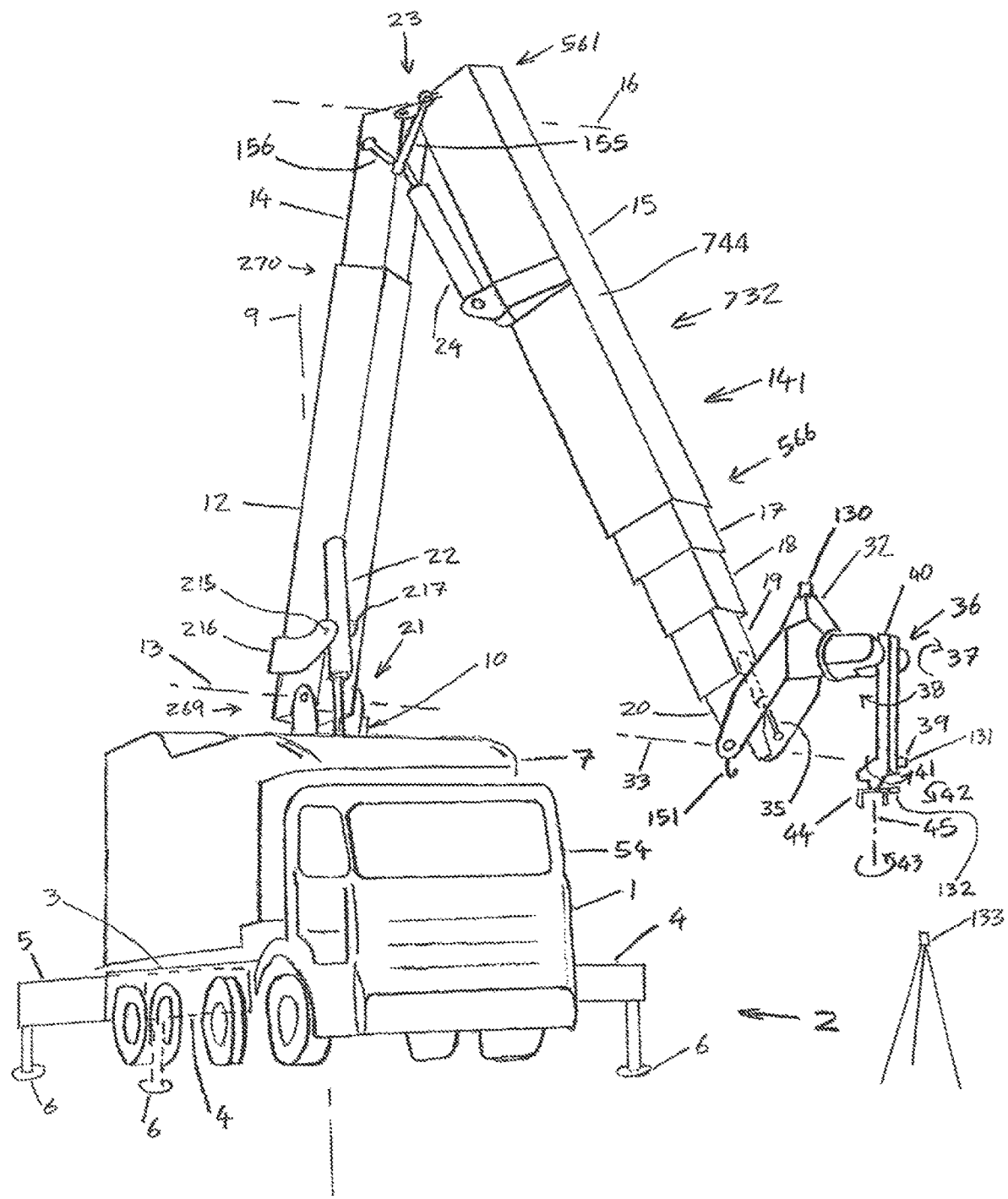
FIG. 1 shows a view of the automated brick laying machine 2 with its truck base 1 with the boom and stick assembly 141 unfolded.
Figure 4:
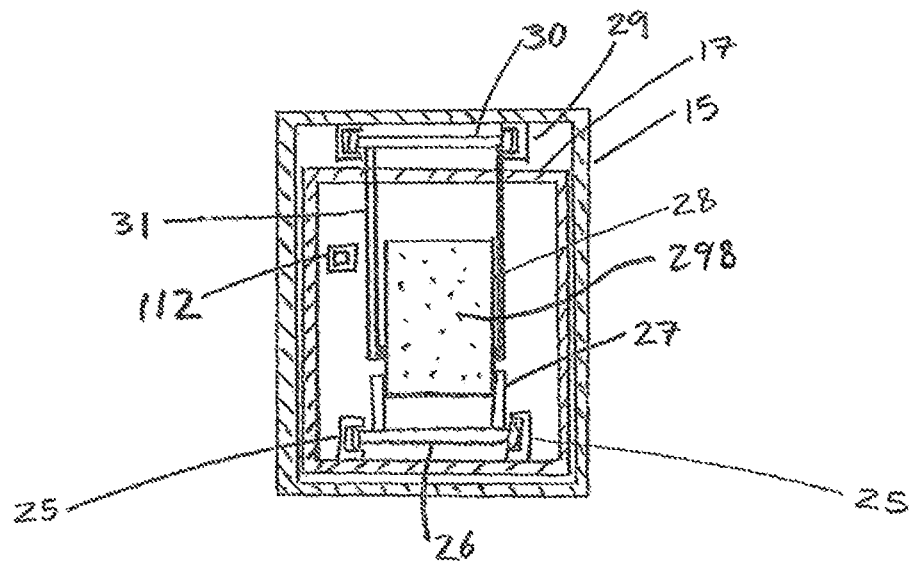
FIG. 4 shows a cross section through the first stick 15 and second stick 17.

The embodiment is directed toward an articulated telescopingly extendable boom which is mounted on a truck, forming an automated brick laying machine. Referring to FIG. 1, a truck 1 supports a brick laying machine 2 which is mounted on a frame 3 on the chassis (not shown) of the truck. The frame 3 provides additional support for the componentry of the brick laying machine 2 beyond the support that would be provided by a typical truck chassis. Individual bricks are placed are placed on a carousel 48, which is located coaxially with a tower 10, at the base of the tower 10. The carousel 48 has a gripper mounted thereon which receives a brick. The carousel 48 transfers the brick via the tower 10 to an articulated (folding about horizontal axis 16) telescoping boom comprising first boom element in the form of telescopic boom 12, 14 and second boom element in the form of telescopic stick 15, 17, 18, 19, 20. Each element 12, 14, 15, 17, 18, 19, 20 of the folding telescoping boom has a shuttle located inside on a longitudinally extending track in the element, to transport a brick along the longitudinal extent of the element. The bricks are moved through the inside of the folding telescoping boom by the linearly moving shuttles. The shuttles are equipped with grippers that pass the brick from shuttle to shuttle. Referring to FIG. 4, elements 15 and 17 are shown, showing tracks 25 supporting shuttle 26 running along the length of element 17, and showing tracks 29 supporting shuttle 30 running along the length of element 15. Shuttle 26 has jaws 27 and shuttle 30 has jaws 31, which alternately can grip a brick 298. When the shuttles 27 and 30 are coincident both sets of jaws 27 and 31 can grip the brick 298 as the brick is passed from one shuttle 26 to the other shuttle 30.

The end of the boom is fitted with a brick laying and adhesive applying head 32. The brick laying and adhesive applying head 32 mounts by pins (not shown) to element 20 of the stick, about an axis 33 which is disposed horizontally. The poise of the brick laying and adhesive applying head 32 about the axis 33 is adjusted by double acting hydraulic ram 35, and is set in use so that the base 811 of a clevis 813 of the robotic arm 36 mounts about a horizontal axis, and the tracker component 130 is disposed uppermost on the brick laying and adhesive applying head 32. The brick laying and adhesive applying head 32 applies adhesive to the brick and has a robot that lays the brick. Vision and laser scanning and tracking systems are provided to allow the measurement of as-built slabs, bricks, the monitoring and adjustment of the process and the monitoring of safety zones.

For ease of understanding, headings will be used in the following discussion.

Truck

Referring again to FIG. 1, a vehicle in the form of a rigid body truck 1 is used as a base for the automated brick laying machine 2. In the preferred embodiment the truck 1 is a 8×8, 8×6 or 8×4 rigid body truck manufactured for example by Volvo, Mercedes, Iveco, MAN, Isuzu or Hino. The truck has a typical driver's cabin 54. In an alternative arrangement, a semi-trailer intended for connection to a prime mover using a fifth wheel, may be used instead of a rigid body truck. The brick laying machine 2 could be mounted on a trailer, but this removes the convenience of having it truck mounted.

Frame

A frame 3 forming a rigid chassis is mounted to the truck. The frame 3 supports a pair of forward legs 4 and a pair of aft legs 5, one of each pair on each side of the truck. The legs 4 and 5 can telescopically extend outwardly, and hydraulic rams then push down feet 6 to provide stability to the automated brick laying machine 2. In practice, the hydraulic rams will adjust by positioning the feet 6 so that the frame 3 and hence the rigid body truck 1 is positioned horizontally. This results in correct vertical alignment of the vertical axis 9 and the tower 10 which are described hereafter. It follows then, that this correct alignment ensures that, subject to deflection tolerances, the axis 33 at the end of the element 20 is horizontal, and then with correct adjustment of the poise of the brick laying and adhesive applying head 32 by the ram 35, the base 811 of a clevis 813 of the robotic arm 36 mounts about a horizontal axis, and the tracker component 130 is disposed uppermost on the brick laying and adhesive applying head 32.

Figure 2:
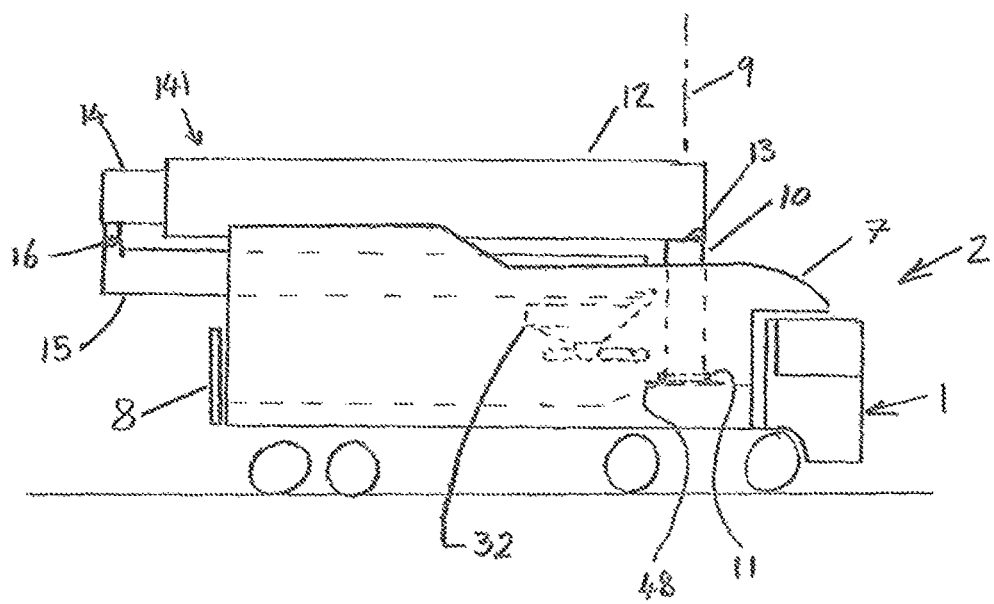
FIG. 2 shows a view of the automated brick laying machine 2 with the boom and stick assembly 141 folded and stowed for driving on a public road.
Figure 6:
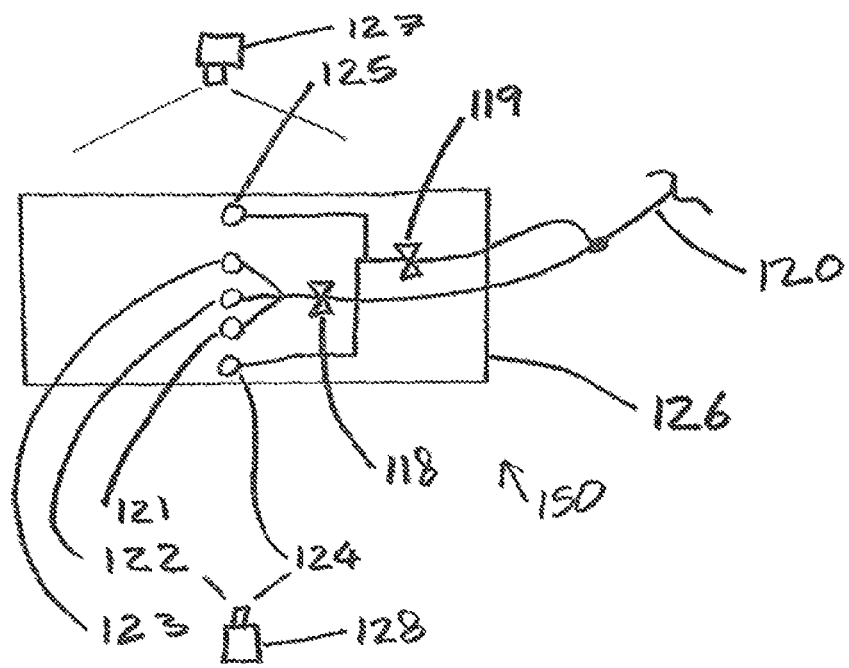
FIG. 6 shows a plan view and schematic diagram of the glue application system 150.

An enclosure 7 forming an outer body is mounted to the frame 3. The enclosure 7 provides some weather protection, noise isolation and guarding of moving parts. Referring to FIGS. 1, 2 and 6, the enclosure 7 is fitted with a pair of doors 85, 86 that are open when the boom 12 and stick 15 are folded. When the boom 12 and stick 15 are unfolded, the top doors 85, 86 are closed by moving door 85 to the right 87 and door 86 to the left 88 to provide a first level of rain protection and noise isolation.

Carousel

Figure 7:
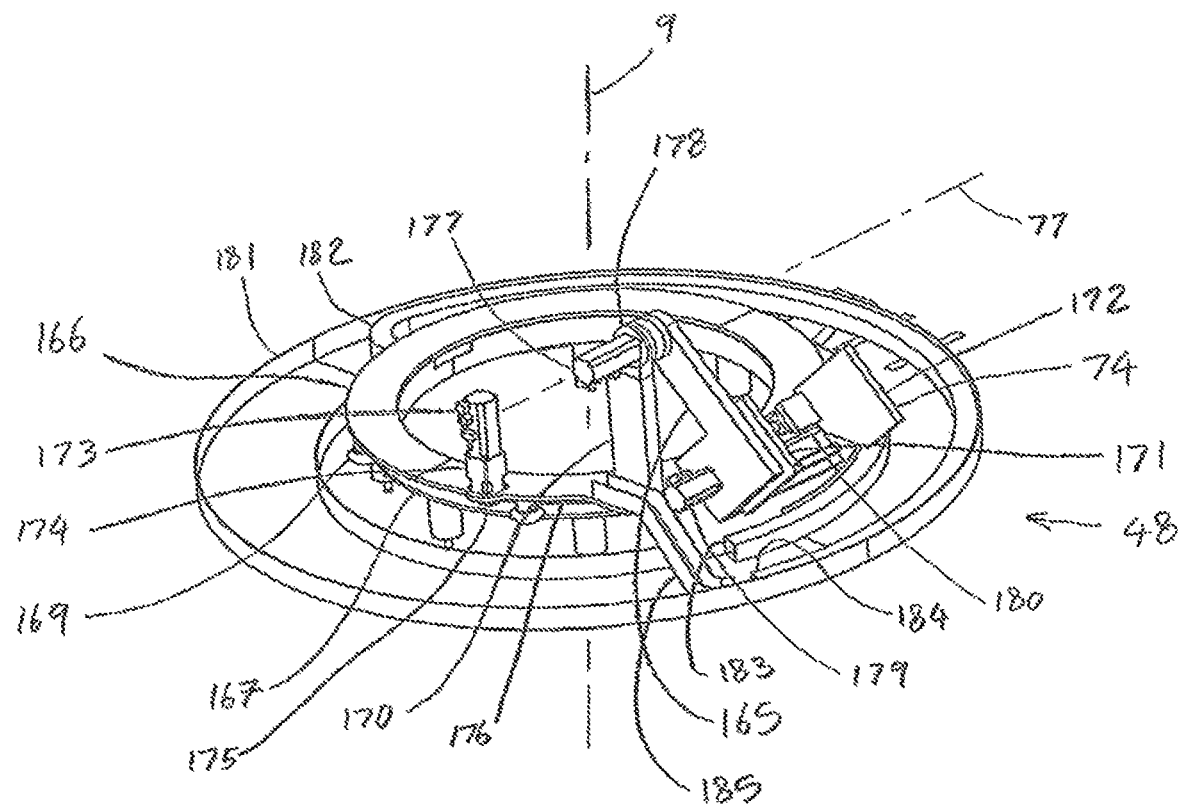
FIG. 7 shows a view of the carousel 48.
Figure 8:
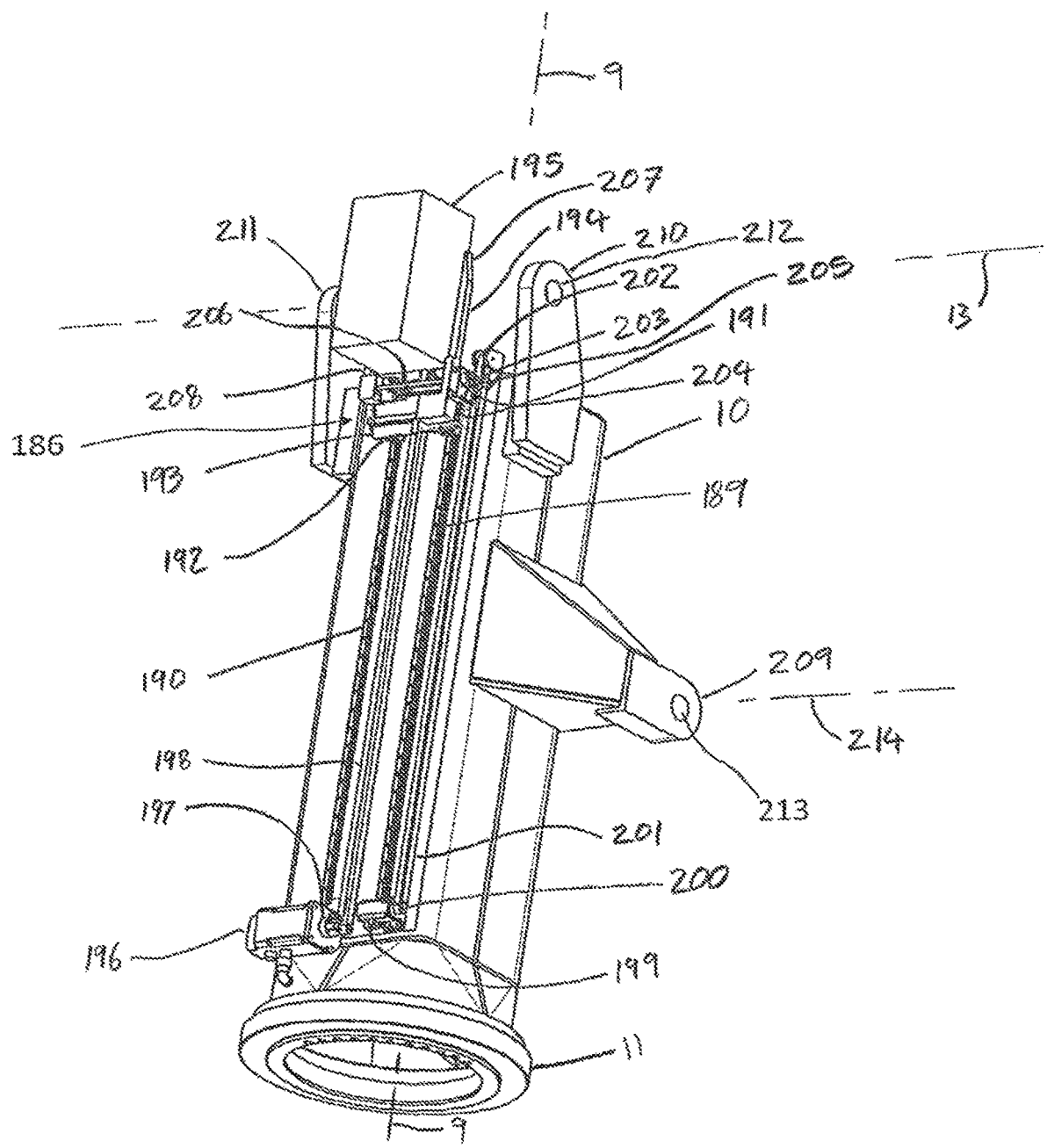
FIG. 8 shows a view of the tower 10.

Refer to FIGS. 1, 7 and 8. Referring to FIG. 1, the foldable boom 732 can be rotated about a vertical axis 9 to point in any direction away from the truck. Referring to FIGS. 1 and 2, the carousel 48 receives bricks, one at a time, at a location approximately on the centreline of the truck, behind the tower 10, and rotates about a vertical axis 9 to line the bricks up with the rotated folding boom 732.

Referring to FIGS. 7 and 8, the carousel 48 receives a brick from the transfer robot 64 and passes it to a tower shuttle 186 sliding on the tower 10. Referring to FIG. 7, the carousel 48 is shown in greater detail. The carousel has a ring frame 166 which rotates around the tower 10 (shown in FIG. 8). The ring frame 166 supports a gripper 74 that can tilt to receive a brick from the transfer robot 64 and then be rotated to line up with the tower shuttle 186. A detailed description follows.

Referring to FIG. 7, the frame 3 supports a ring guide 167 which supports a plurality of rollers 169 that in turn support the ring frame 166 which is thus able to rotate about the vertical slewing axis 9. The ring frame 166 supports a bracket 170 that in turn supports an arm 165 that rotates about a horizontal rotary axis 77. The arm 165 supports the gripper 74 which has jaws 171, 172 that move toward each other to hold a brick (not shown), or apart to release the brick. The ring frame 166 is rotated about the vertical axis 9 by a servo motor 173 and gearbox 174 that drives a pinion 175 engaged with a ring gear 176 fixed to the ring guide 167. The bracket 170 supports a servo motor 177 that drives a gearbox 178 which moves the arm 165. The arm 165 supports a servo motor 179 and a lead screw 180. The servo motor 179 rotates the lead screw 180. The jaws 171, 172 are respectively fitted with lead nuts not shown that engage with the lead screw 180. The ring frame 166 supports a cable duct 185.

The frame 3 supports a cable guide 181. The cable guide 181 supports a cable chain 182. The cable chain 182 is connected at a first end 183 to the cable guide 181 and is therefore fixed relative to the frame 3. The cable chain 182 has a second end 184 attached to the cable duct 185. Electric current carrying cables (not shown) that carry power and control signals and sensor signals from the electric control cabinet 82, are routed via the frame 3, through the cable chain 182 to the cable duct 185 and then to the servo motors 173, 177, 179.

The carousel 48 can move the gripper 74 from a pickup position where it receives a brick, and rotate to a drop off position where it deposits the brick to the gripper jaws 207, 208 on the tower shuttle 186 (shown on FIG. 8).

Tower

Referring to FIG. 8, the frame 3 supports a slewing ring 11 at its front end 78, located coaxially with the carousel 48. The slewing ring 11 supports a turret in the form of a tower 10. The tower 10 can slew about the vertical axis 9 of the slewing ring 11. The tower 10 supports the foldable boom 732 (shown in FIG. 1). The tower supports a tower shuttle 186 that moves bricks from the carousel 48 at the bottom end of the tower to the foldable boom 732 at the top of the tower 10.

Figure 59:
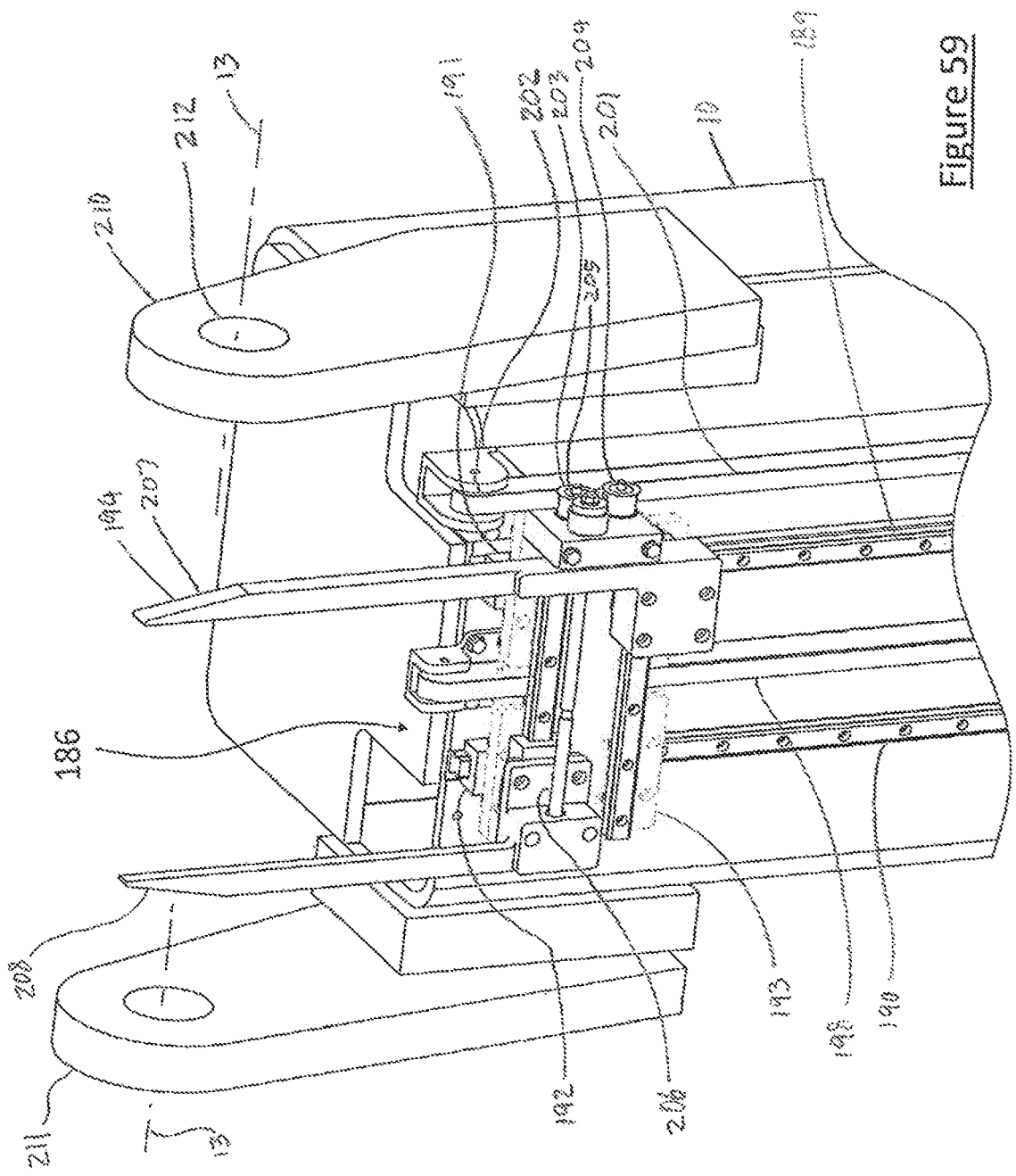
FIG. 59 shows a close up of the tower shuttle 186 at the top of tower 10.

Refer to FIG. 8 and FIG. 59. The tower 10 supports two parallel spaced linear bearing rails 189, 190. The linear bearing rails 189, 190 respectively support four bearing cars 191 and 192 (and others occluded, not shown). The bearing cars 191, 192 support a tower shuttle car 193 which in turn supports a gripper 194. The gripper 194 may grasp a brick 195. The tower 10 supports a servo motor 196 which drives a toothed pulley 197 that engages with and drives a belt 198 that is connected to, and thereby drives the tower shuttle 186 in a vertical direction. The tower 10 supports a servo motor 199 that drives a toothed pulley 200 that engages and drives a toothed belt 201. Tower 10 supports an upper idler pulley 202. Toothed belt 201 wraps around upper idler pulley 202. The tower shuttle car 193 supports pulleys 203 and 204. The tower shuttle car 193 supports a lead screw 206. Leadscrew 206 is connected to a pulley 205. The toothed belt 201 passes around pulley 203, then drives pulley 205 and thus drives the lead screw 206. The belt 201 passes around pulley 204 and then returns to pulley 200. The tower shuttle car 193 slideably supports gripper jaws 207, 208. Gripper jaws 207, 208 support lead screw nuts (not shown) that engage leadscrew 206. Leadscrew 206 moves jaws 207, 208 toward each other to grip a brick 195, and in the opposite rotational direction, moves jaws 207, 208 apart to release the brick 195.

Refer to FIG. 8. The tower 10 supports a lug 209 with a bore 213 having a horizontal axis 214, the bore receiving a fastener to connect an end of hydraulic ram 22 (shown in FIG. 1) to control the pose of the first boom 12. Tower 10 supports clevis plates 210, 211 which have a bore 212 with a horizontal axis 13, about which the near end of the first boom is attached for pivoting movement (shown in FIG. 1).

Boom

Figure 54A:
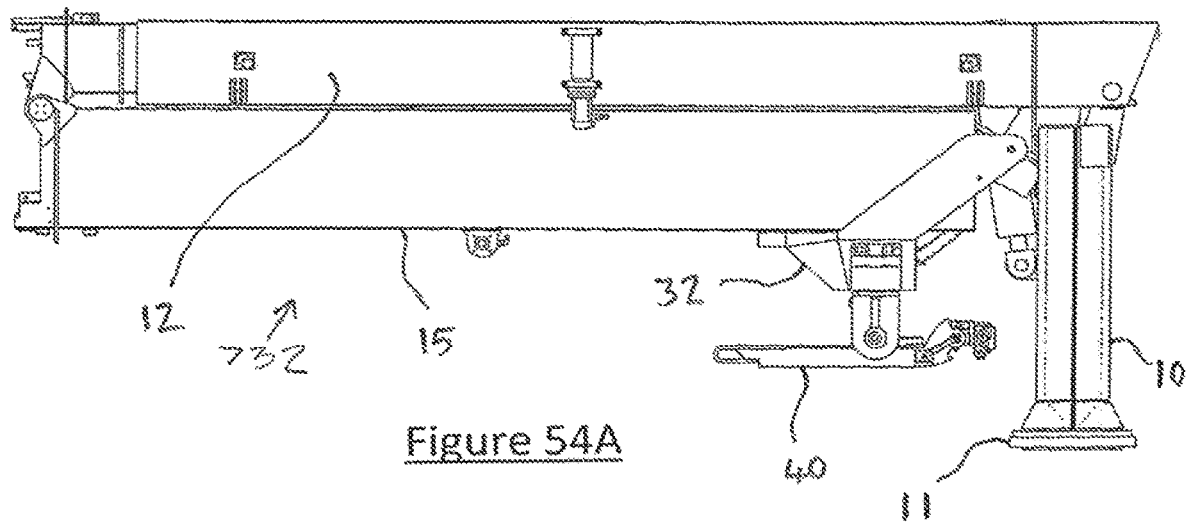
FIGS. 54A-54E show side views of the foldable boom in various poses.
Figure 54B:
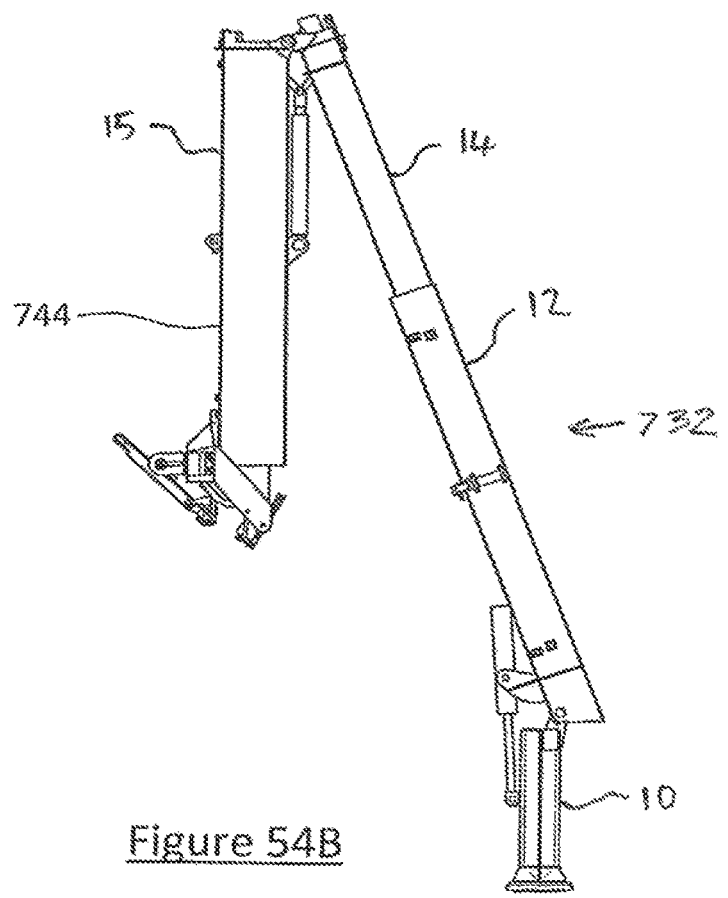
Figure 54C:
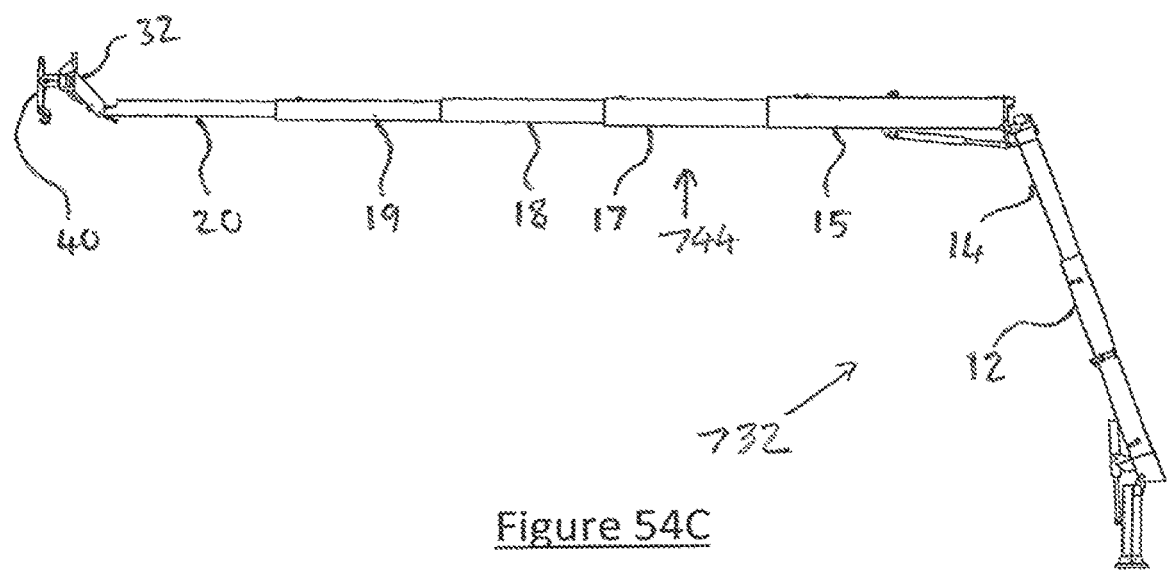
Figure 54D:
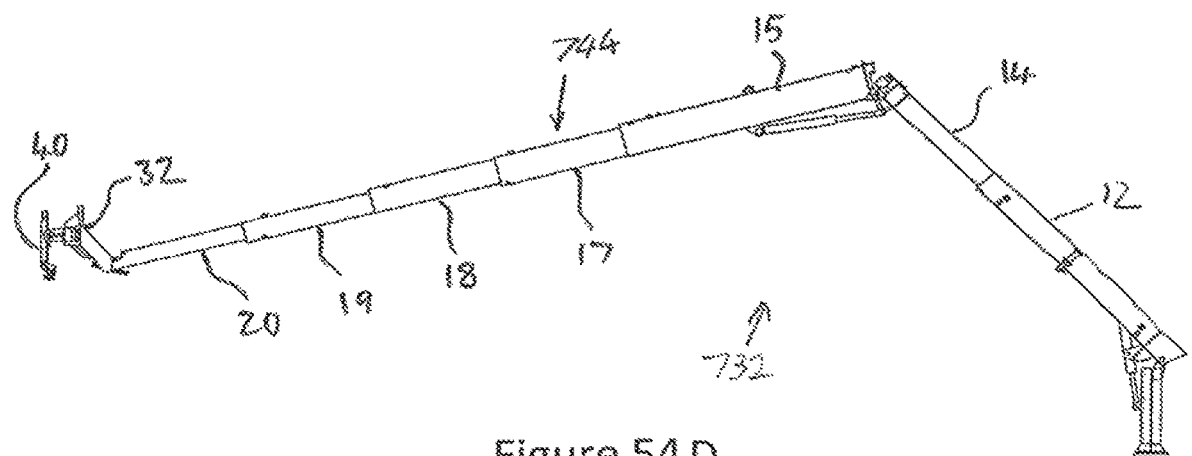
Figure 54E:
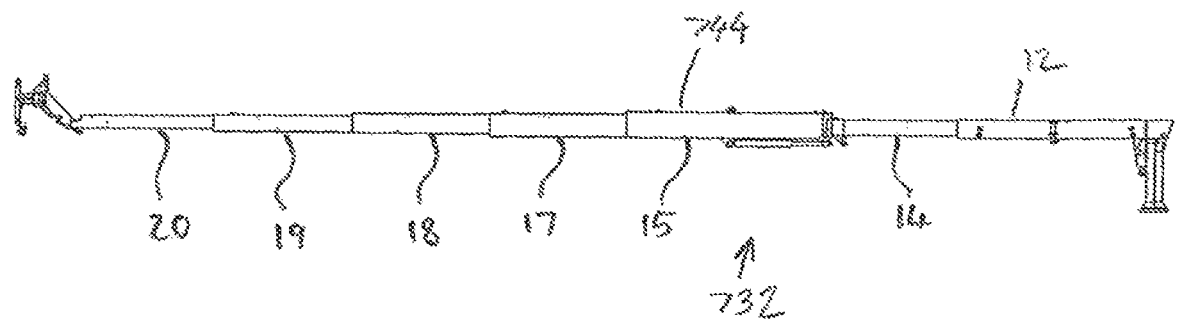

Refer to FIG. 1. The foldable boom 732 is articulated and telescopic so that it can position the laying head throughout a large working volume, far from and close to the truck, both low and high so that the laying head can reach all courses of the structure to be built, both near and far, low and high. FIG. 54A shows the foldable boom 732 in a folded pose for transport. FIG. 54B shows the foldable boom 732 with the first boom 12 raised and the stick assembly 744 vertical. FIG. 54C shows the foldable boom 732 with the stick assembly 744 horizontal with the telescopic sections extended. FIG. 54C shows a pose that could be used to build a multi storey structure. FIG. 54D shows the foldable boom 732 with the first boom 12 raised above horizontal and the stick assembly 744 lowered slightly below horizontal. FIG. 54E shows the foldable boom 732 at its maximum extension with both the first boom 12 horizontal and the stick assembly 744 horizontal.

The foldable boom 732 allows motion through a big envelope free of singularities and poles. A pole is a position within a robot's envelope that requires rapid rotation of one or more robot joints to maintain consistent orientation of the end effector, for the end effector to pass along a trajectory that passes through the pole. A singularity is a position or orientation, or a set of positions and orientations within the envelope that cannot be reached, or where the joints of the robot become poorly behaved, unstable, or the joint positions are difficult to calculate. Normal industrial robots typically complete the same task over and over so that it is possible to design, or alter the trajectory and robot pose to be free and clear of poles and singularities or to pass through a pole with specified rotation of the pole axis. The automated brick laying machine however must be able to complete a variety of tasks and any particular structure will require the boom to move through a large portion of its envelope, thus making a pole and singularity free working envelope desirable.

Shuttles within each section of the boom transport a brick along the inside of the boom. Shuttles pass a brick from a previous shuttle to the next. Rotators at each articulated joint of the boom move a brick from one boom element to the next, passing the brick from a previous adjacent shuttle to the next adjacent shuttle.

Figure 60:
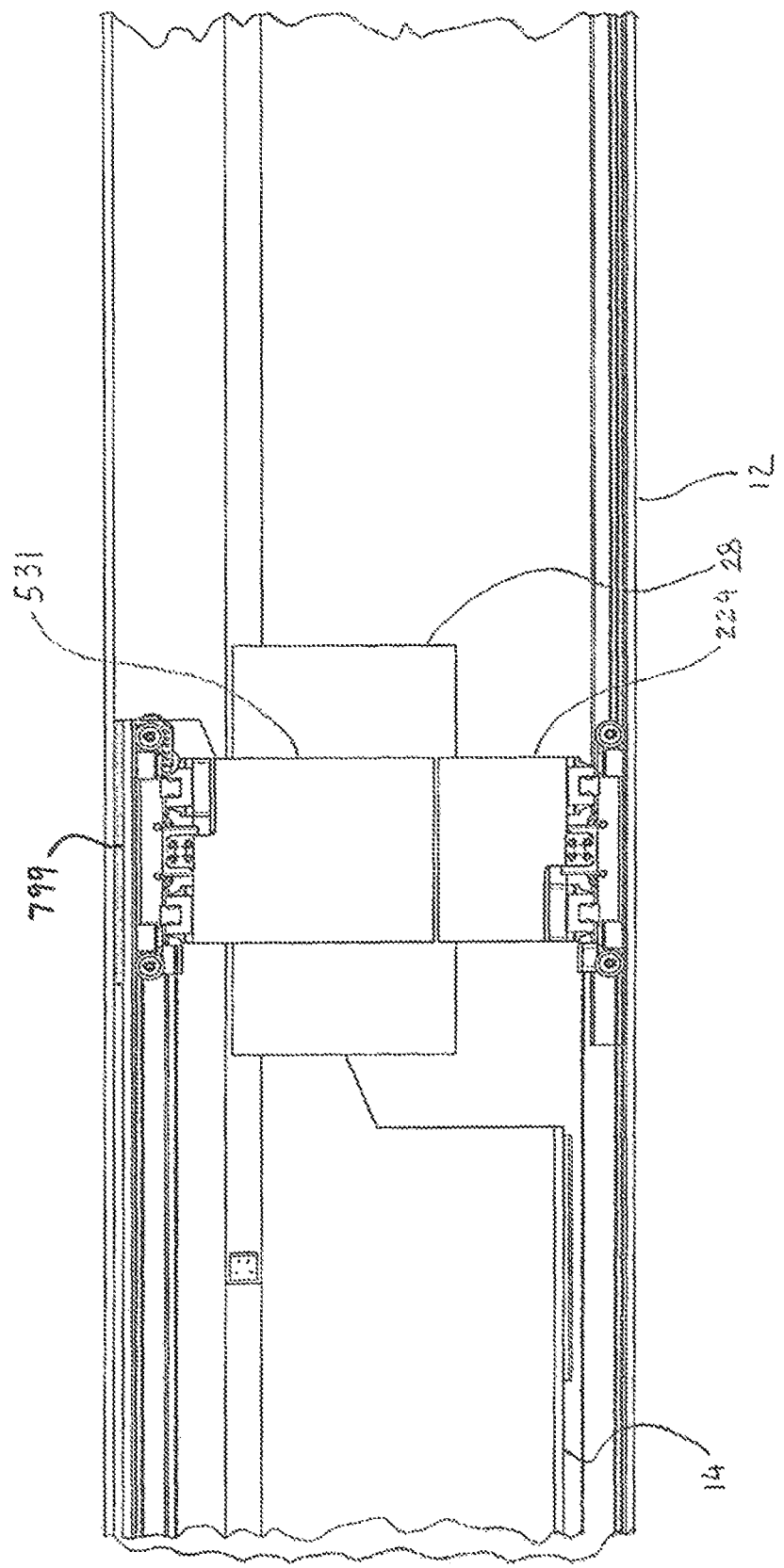
FIG. 60 shows a side view of first boom element 12 and in particular the transfer of a brick from shuttle-B1 224 to shuttle-B2 531.

The bricks are passed by the shuttles, through the inside of the boom. The bricks are moved through the inside of the boom so that the boom structure contains the bricks and/or debris, in the unlikely event that a brick, or debris from a brick becomes loose from a shuttle. The boom structure provides convenient support to mount shuttles opposite each other. In the present invention within the telescoping elements of the boom and within the telescoping elements of the stick, the shuttles are alternately mounted above or below the brick, so that adjacent shuttles may move so that the grippers on the shuttles can both grasp a brick simultaneously and thereby transfer a brick from one shuttle to the next, without letting go of the brick. FIG. 60 shows a partial view of the inside of the first boom element comprising first boom 12 and second boom 14, with shuttle-B1 224 gripping a brick 28 from below and shuttle-B2 531 gripping a brick from above. The invention could alternately be arranged to support the shuttles from the sides of the boom. The invention could alternately be arranged to support the shuttles on the top of the boom, however it would then be desirable to fit an additional enclosure to boom to contain any dropped bricks or debris and the overall size of the boom would be larger or less structurally stiff.

First Boom Element

Figure 17:
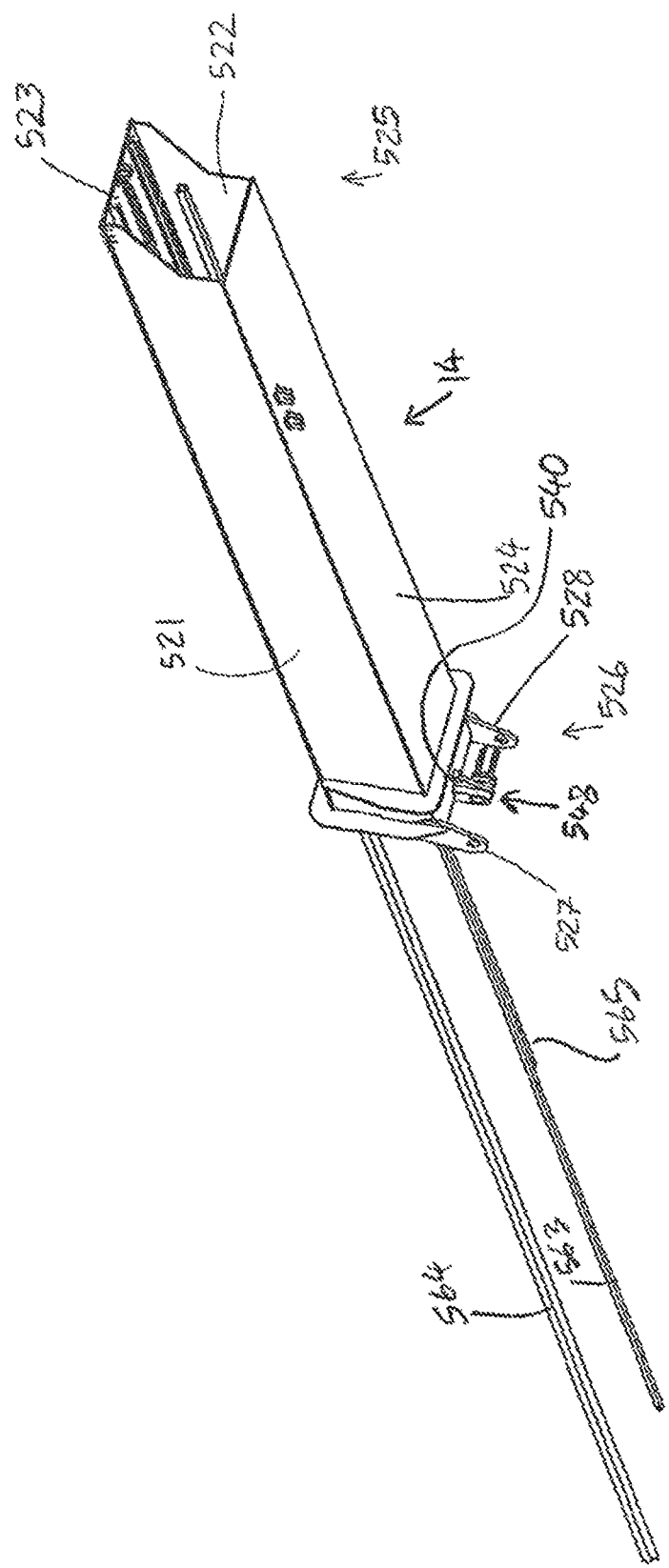
FIG. 17 shows a view of the second boom 14.

Referring to FIGS. 1 and 17, the tower 10 pivotally supports a foldable boom on clevis plates 210 and 211 for rotation about horizontal axis 13. The foldable boom comprises a first boom element comprising first boom 12 and telescoping second boom 14, and a second boom element comprising stick assembly 744. First boom 12 can pivot about the horizontal axis 13 at the top of the tower 10, and a sliding second boom 14 is telescopically able to slide within the first boom 12.

Second Boom Element

Referring to FIG. 1, the second boom element comprising stick assembly 744 is pivotally connected about a horizontal axis 16 by an element in the form of an articulating first stick 15 to the distal end of the second boom 14. The axis 16 is substantially parallel to the horizontal articulation axis 13 of the first boom.

A sliding second stick 17 is telescopically able to slide within the first stick 15. A sliding third stick 18 is telescopically able to slide within the second stick 17. A sliding fourth stick 19 is telescopically able to slide within the third stick 18. A sliding fifth stick 20 is telescopically able to slide within the fourth stick 19. Collectively first stick 15, second stick 17, third stick 18, fourth stick 19 and fifth stick 20 form a stick assembly 744 also referred to as the second boom element.

The number of telescopic booms 12, 14 or sticks 15, 17, 18, 19, 20 could be altered without deviating from the inventive concepts described. Collectively the tower 10, booms 12, 14 and sticks 15, 17, 18, 19, 20 form a foldable boom 732.

Figure 9:
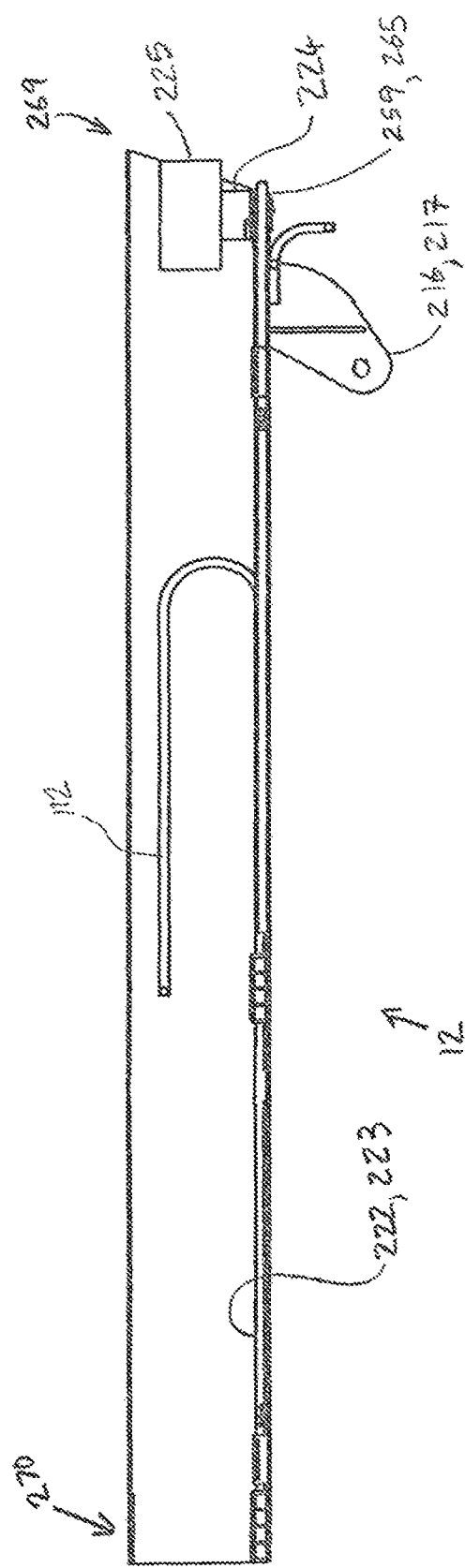
FIG. 9 shows a side view cross section of first boom 12.

First boom 12 has a first near end 269 and a second distal end 270 shown in FIG. 9. First boom 12 is connected to the tower 10 (shown in FIG. 8) by a pin or pins not shown, through the bore 212, in clevis plates 210 and 211, connecting through apertures in first boom located at its near end 269.

Lug 209 on the tower 10 is connected to the rod end of ram 22 by a pin (not shown). Ram 22 supports a trunnion mount 215 located a short distance along the first boom 12 from the near end 269. The trunnion mount 215 provides boom lift lugs 216, 217. The articulated joint 21 of the tower 10 to the boom 12 about axis 13 is moved by ram 22 powered by electricity or hydraulics.

Rotator

Figure 15:
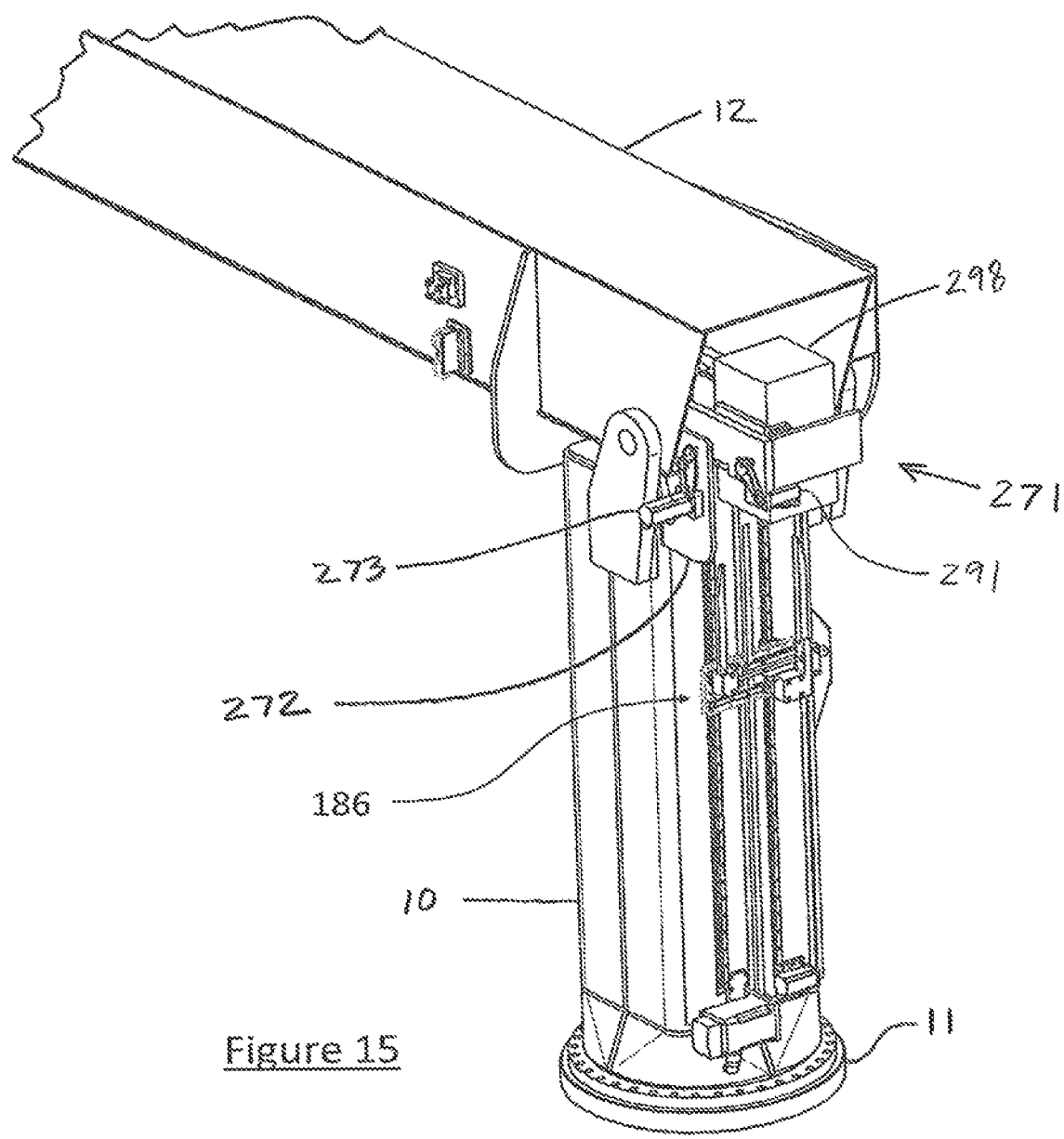
FIG. 15 shows a view of the tower—first boom (T-B1) rotator 271 and the tower 10 and first boom 12.
Figure 16:
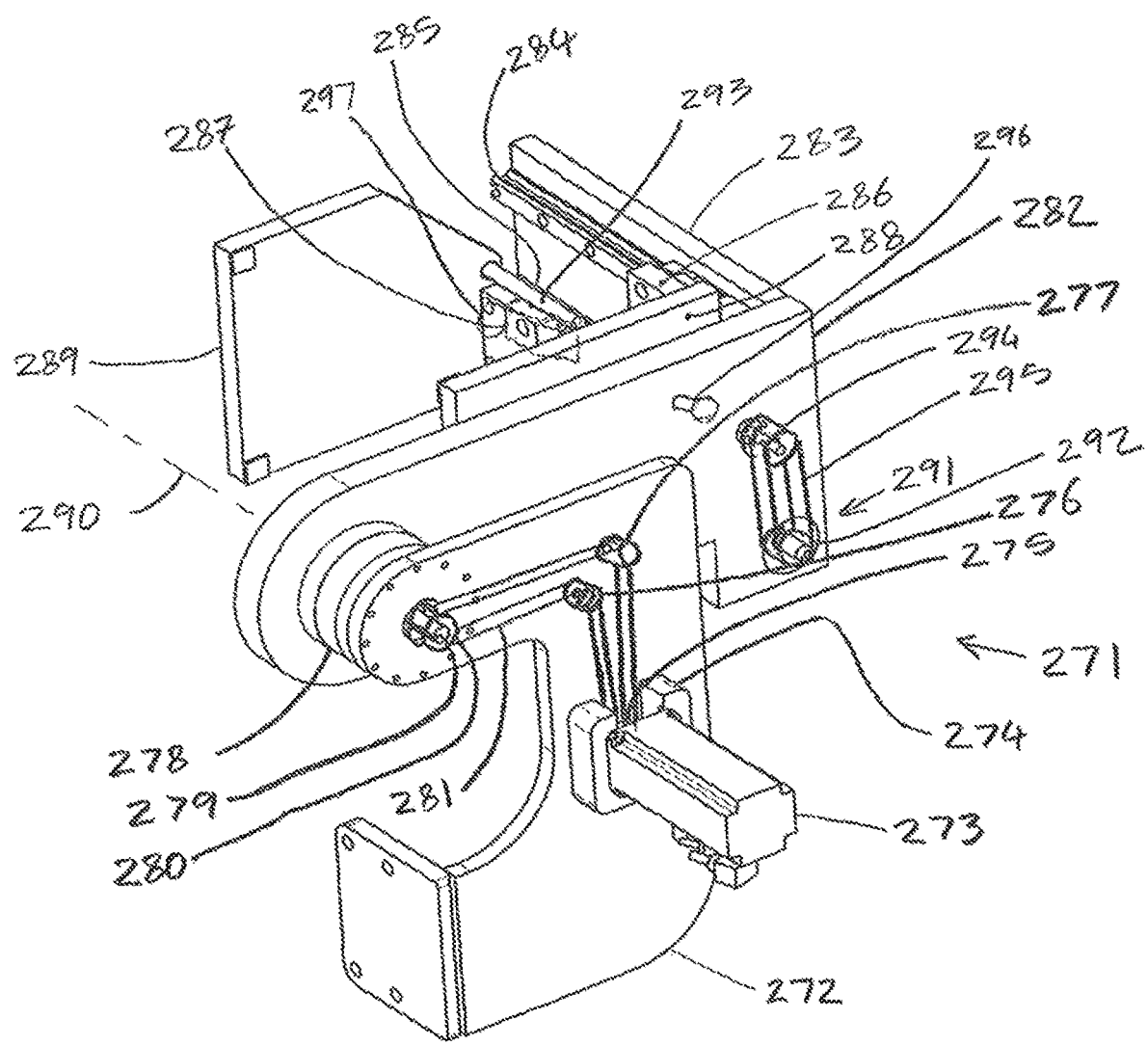
FIG. 16 shows a view of the tower—first boom (T-B1) rotator 271.
Figure 55A:
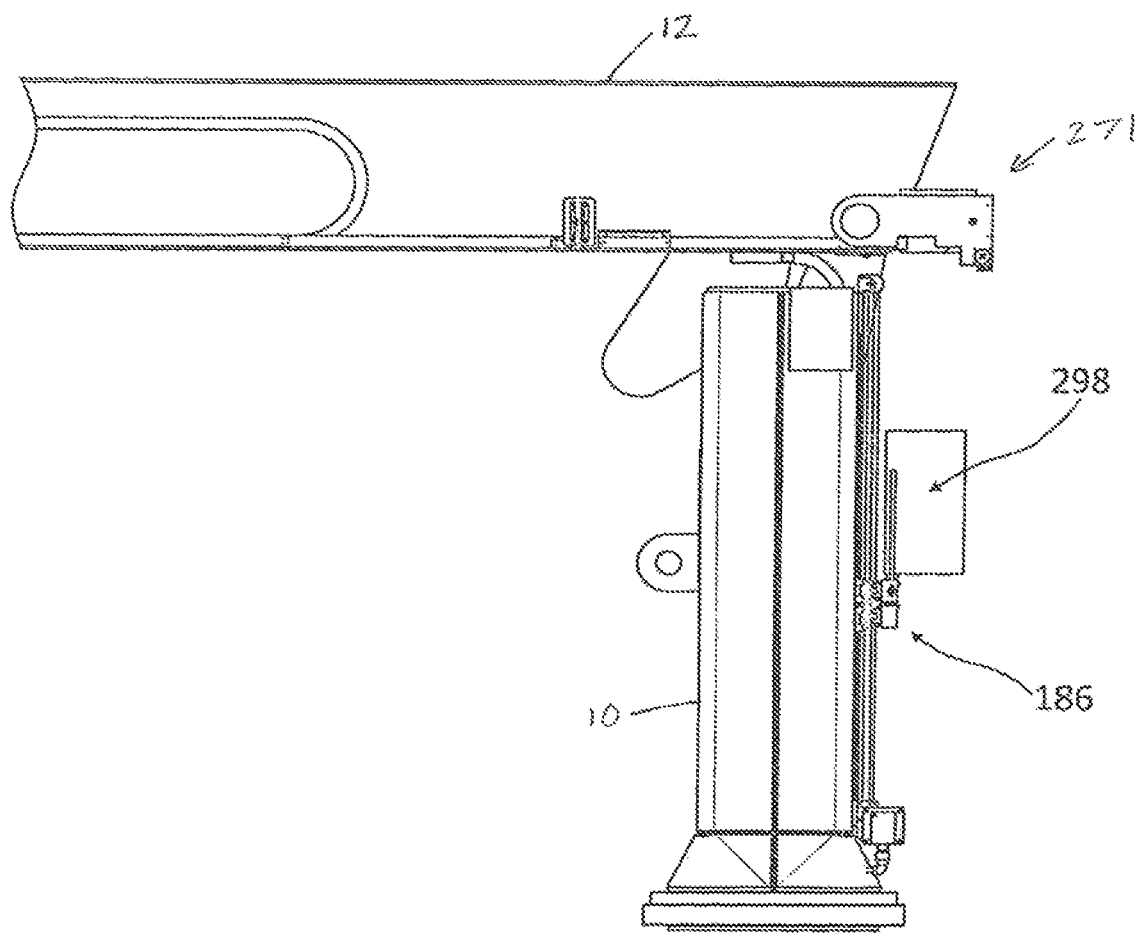
FIGS. 55A-55G show a sequence of a brick being transferred from the tower 10 to the T-B1 rotator 271 to first boom 12.
Figure 55B:
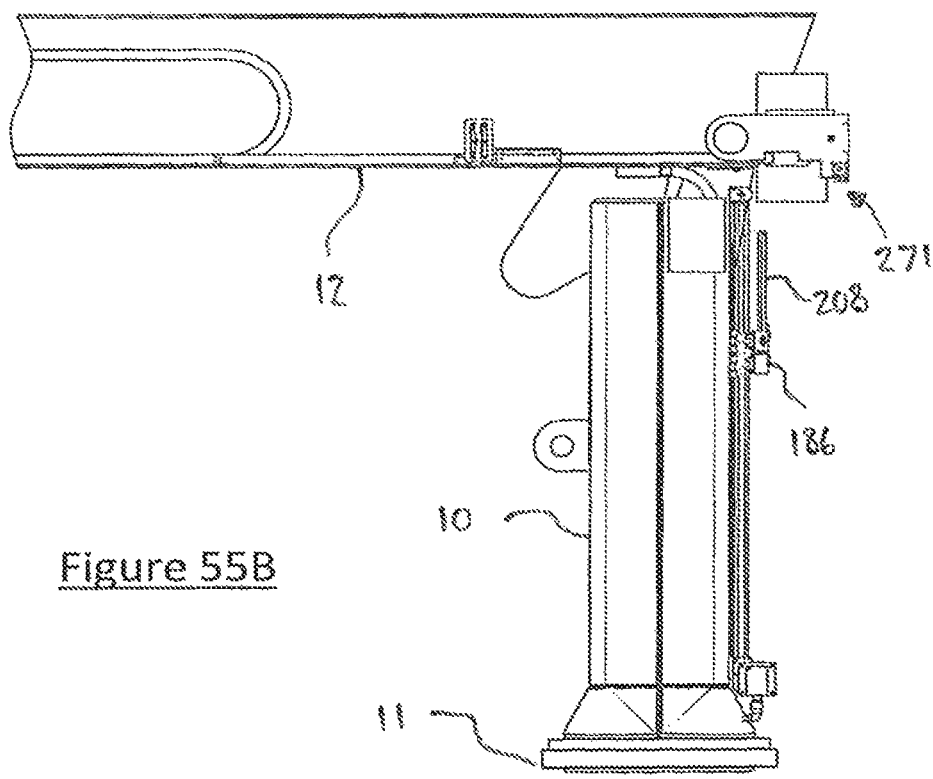
Figure 55C:
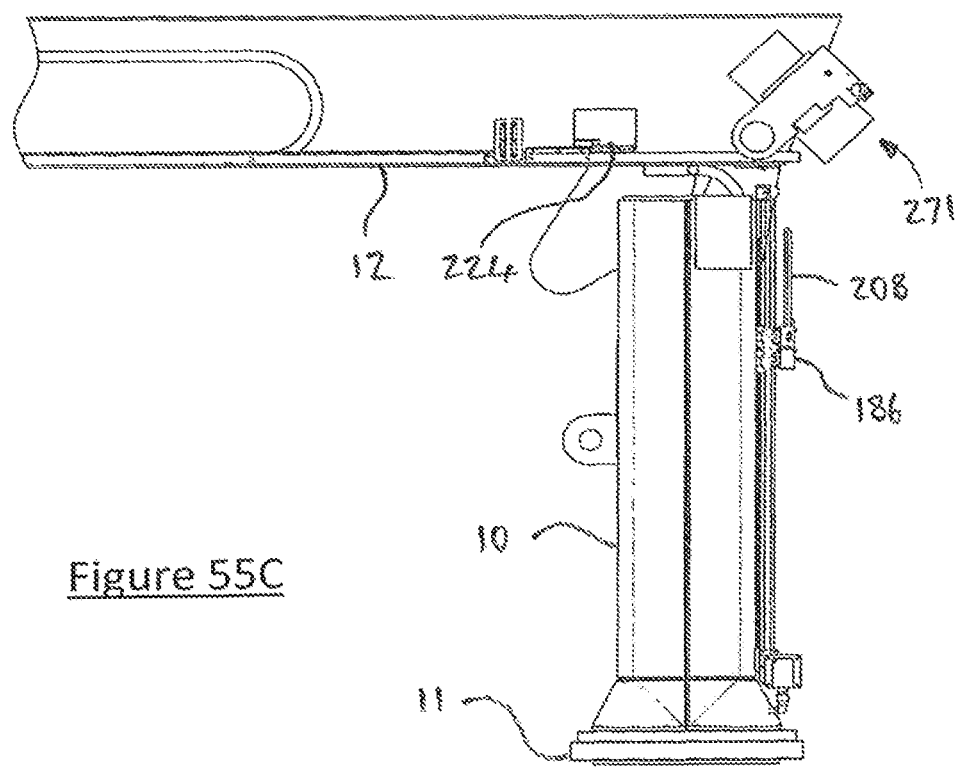
Figure 55D:
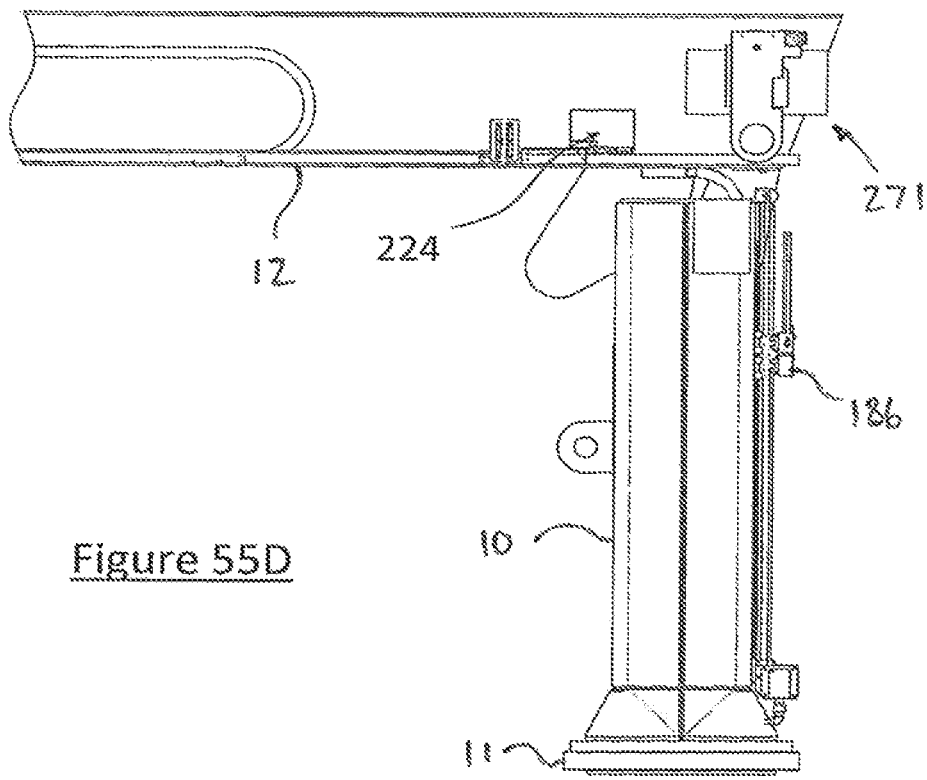
Figure 55E:
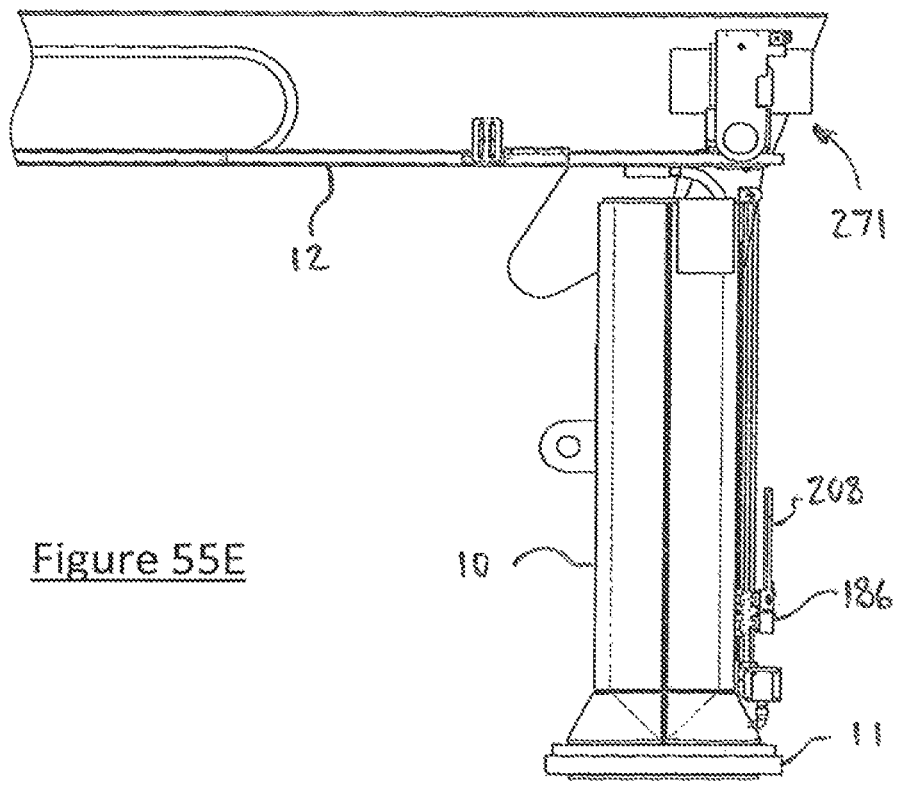
Figure 55F:
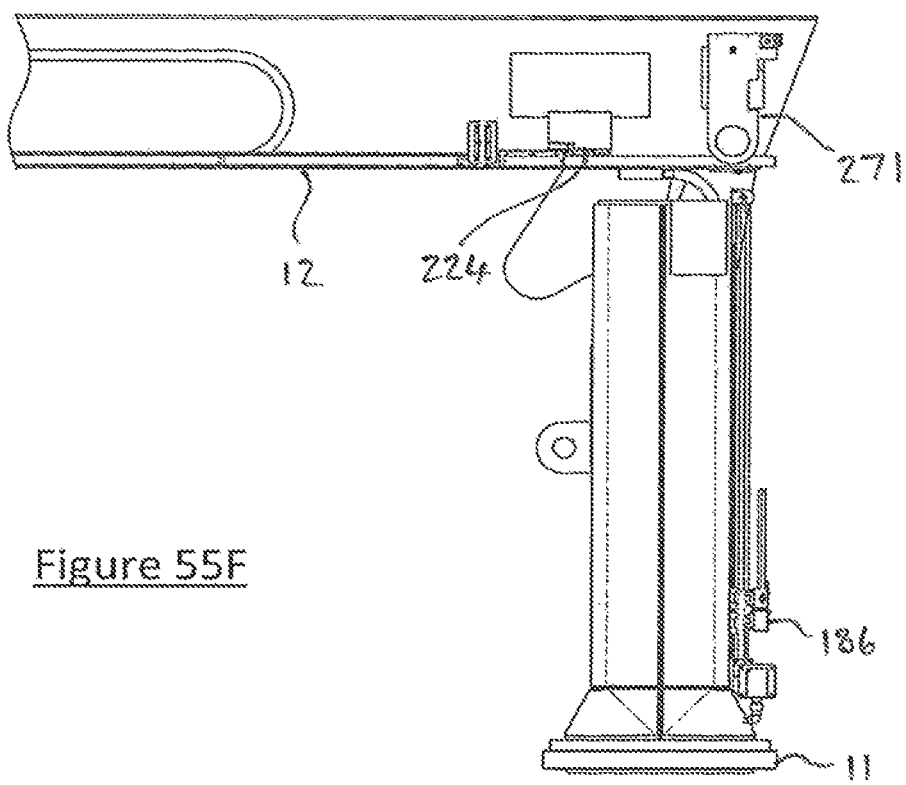
Figure 55G:
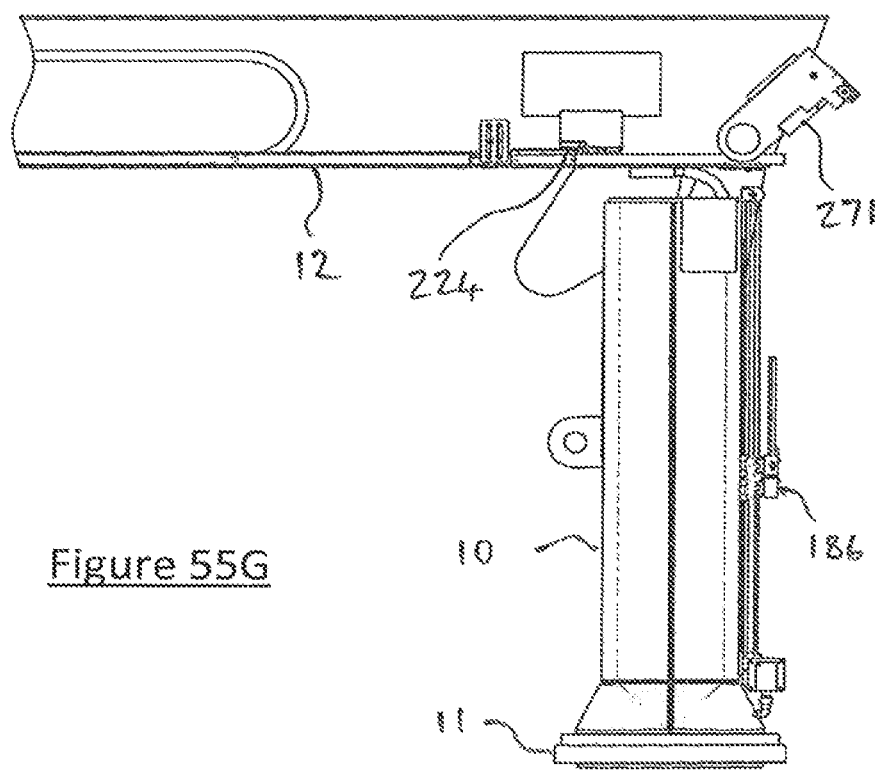
Figure 56A:
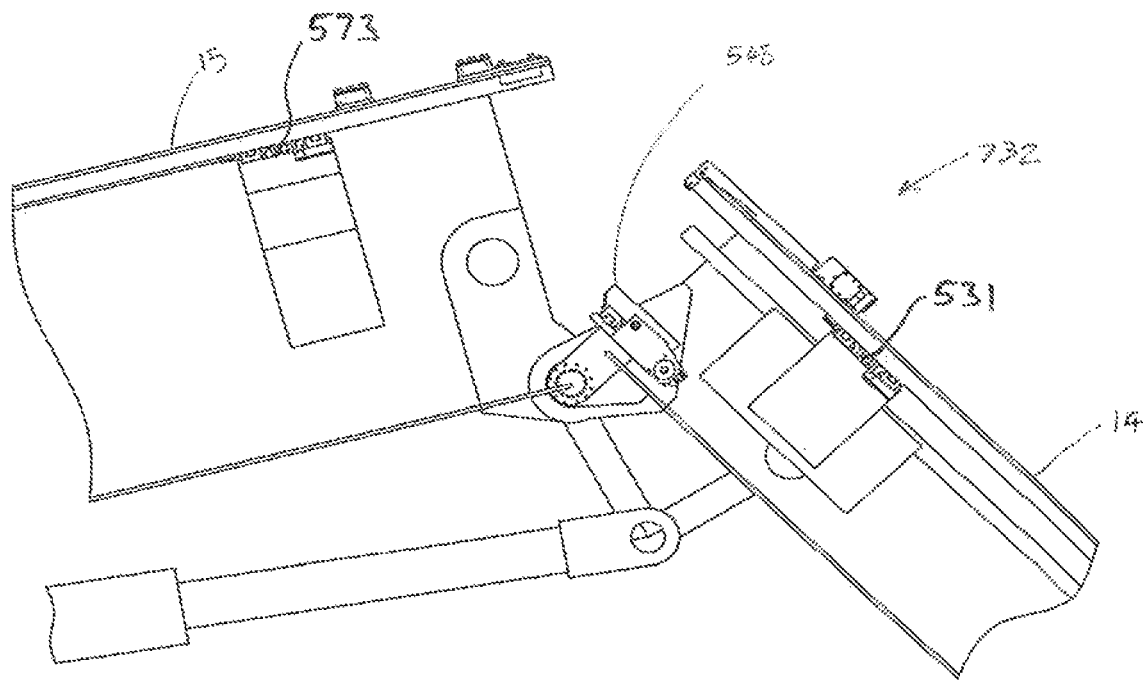
FIGS. 56A-56G show a sequence of a brick being transferred from the second boom 14 to the B2-S1 rotator 548 to the first stick 15. In the FIGS. 56A to 56G the foldable boom 732 is in a bent pose.
Figure 56B:
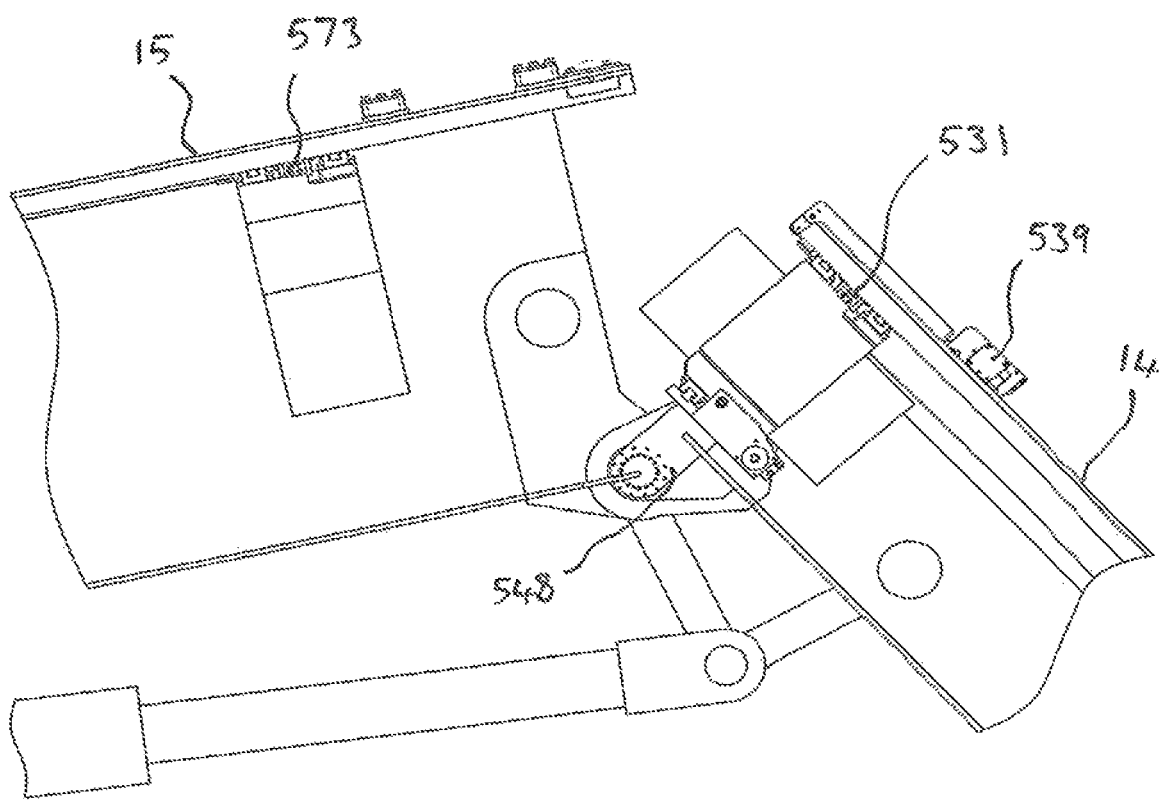
Figure 56C:
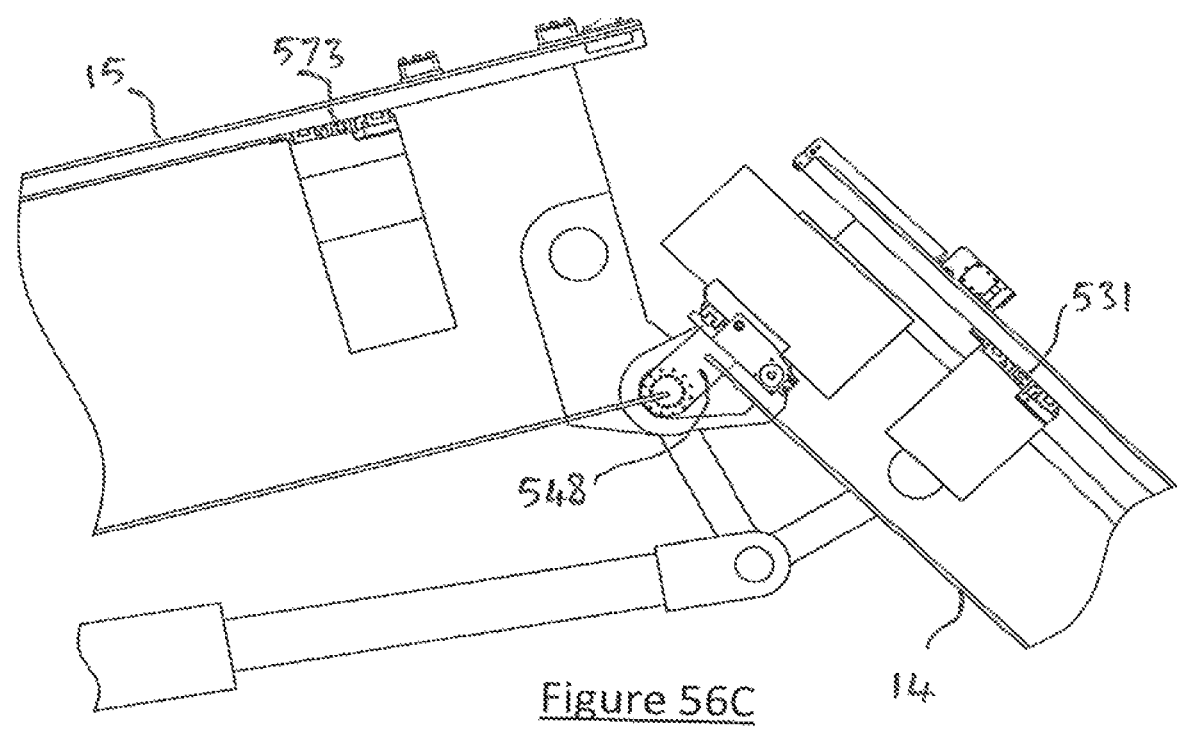
Figure 56D:
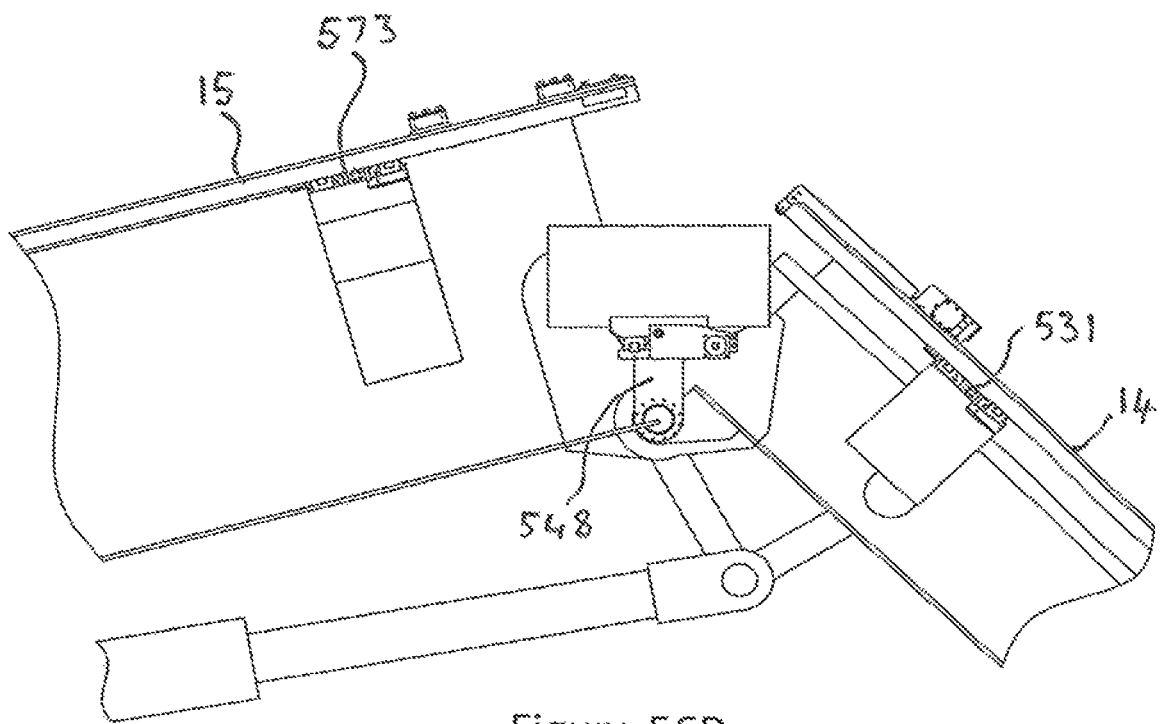
Figure 56E:
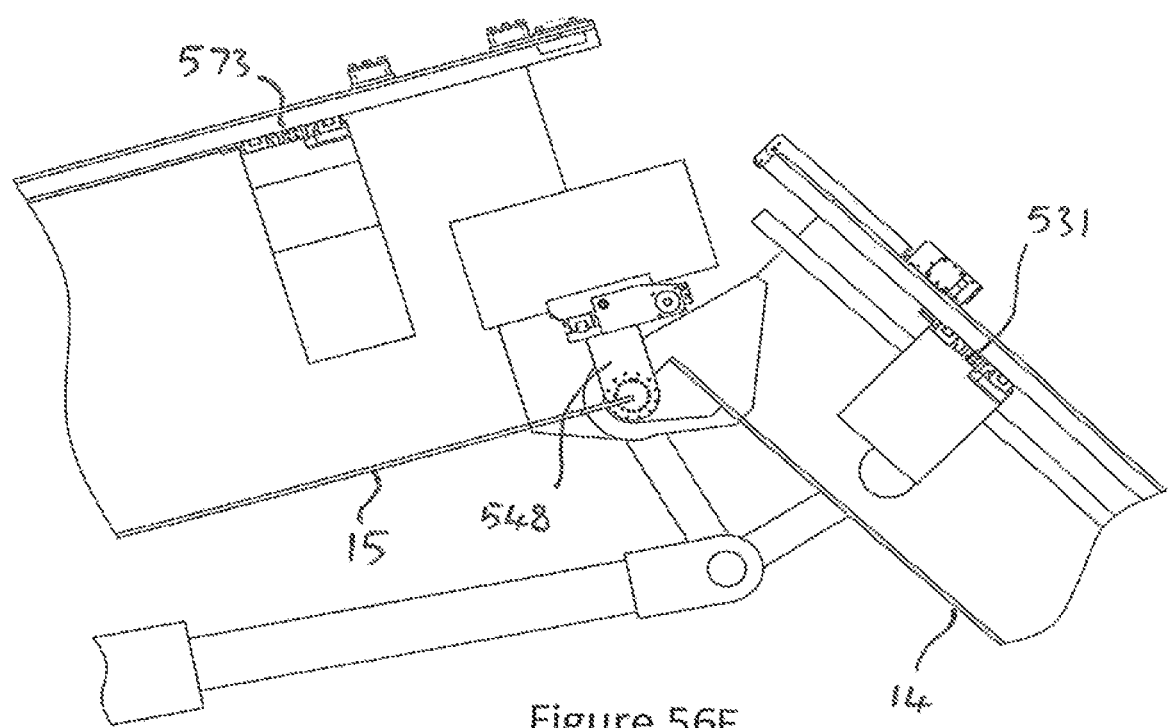
Figure 56F:
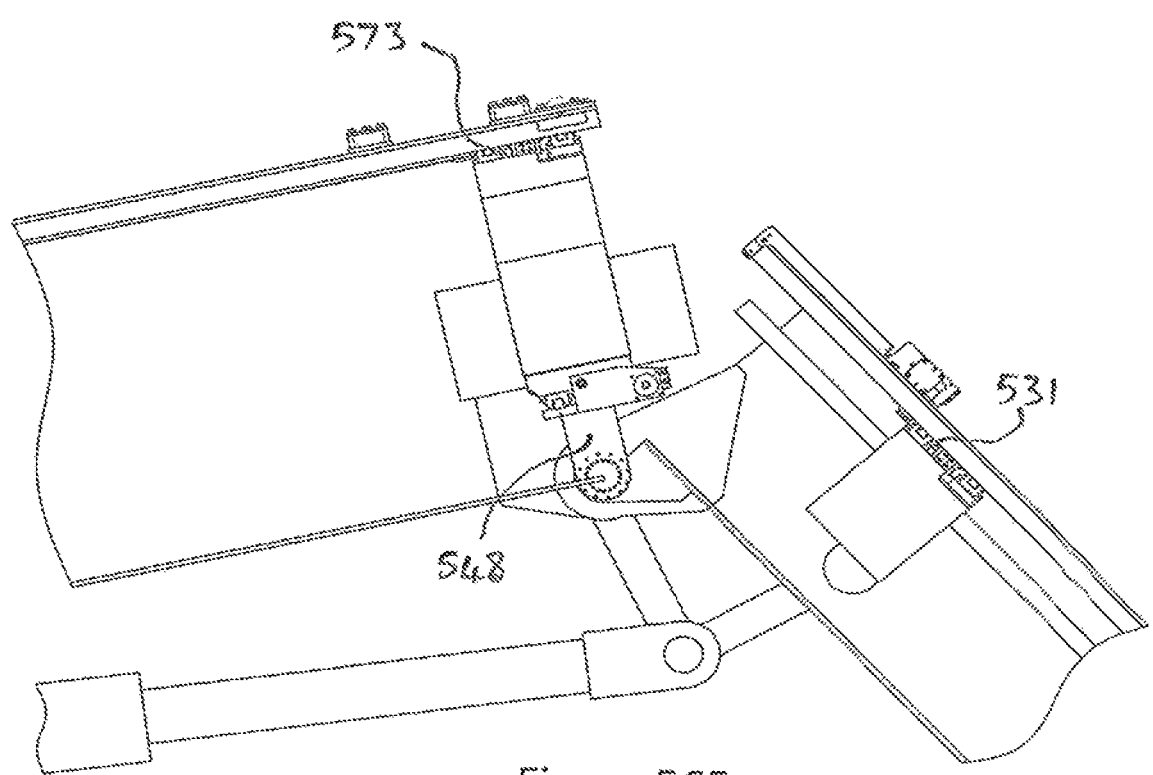
Figure 56G:
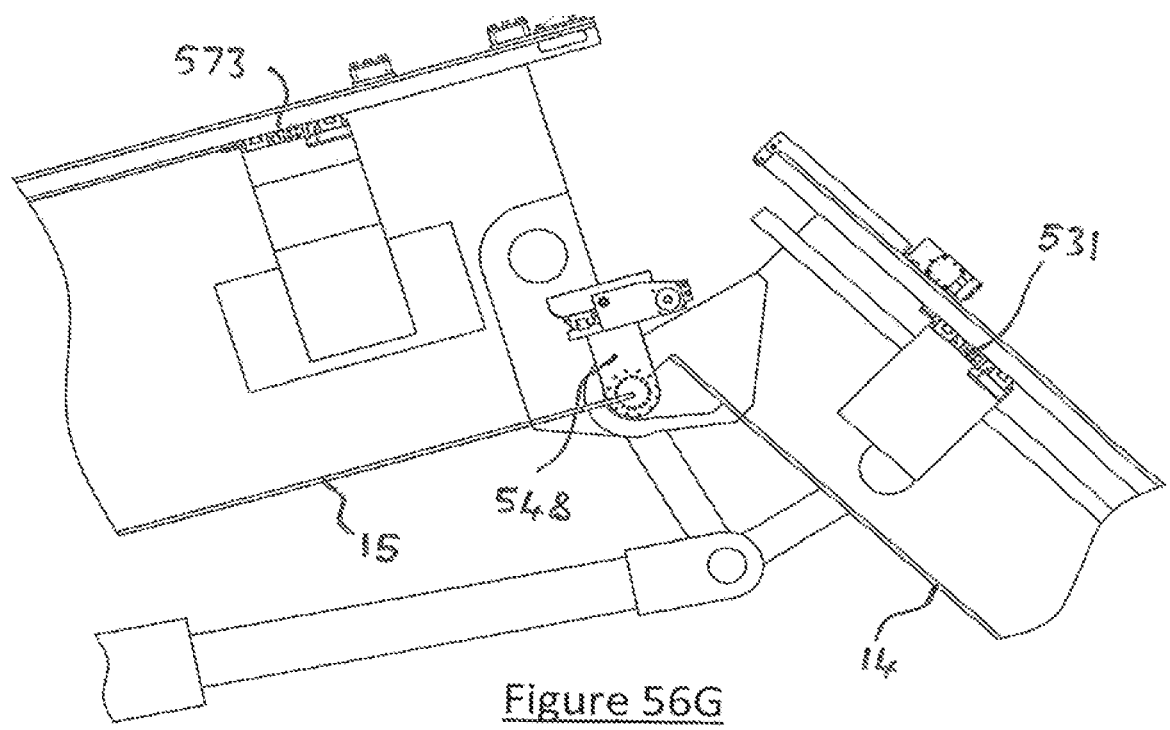

Refer to FIG. 15 and FIG. 16. The tower 10 supports a brick rotating mechanism in the form of T-B1-rotator 271. The T-B1-rotator 271 is used transfer a brick from the tower shuttle 186 to the first boom shuttle 224 (shown in FIGS. 10, 12 and 55D). FIG. 55A shows the tower shuttle 186 holding brick 298. FIG. 55B shows the brick held by the T-B1-rotator 271 after receiving it from the tower shuttle 186. FIG. 55C shows the T-B1-rotator 271 moving to align itself with the first boom segment 12. FIG. 55D shows the T-B1-rotator 271 aligned with the first boom segment and shuttle-B1 224 moving into position under brick 298. It should be understood that the boom will not necessarily be horizontal while this process occurs. FIG. 55E shows the shuttle-B1 224 in position under the brick 298. In this position the shuttle-B1 224 will grip the brick and the T-B1-rotator 271 will release the brick. FIG. 55F shows the brick 298 held by the shuttle-B1 224 moving up the first boom segment 12. FIG. 55G shows the T-B1-rotator 271 moving into position to accept another brick from the tower shuttle 186.

A detailed description of the T-B1-rotator follows.

Referring to FIG. 16, T-B1-rotator 271 has a bracket 272 which is fastened to the tower 10 (shown in FIG. 8). Bracket 272 supports a spacer 274 which supports a servo motor 273. Servo motor 273 drives a pulley 275. Bracket 272 supports idler pulleys 276, 277 and a bearing reducer 278. Bearing reducer 278 is fitted with an input shaft 279 which is fitted with a pulley 280 driven by servo motor 273 via an endless toothed belt 281 wrapped around pulleys 275, 276, 277 and 280. Arm 282 is rotated by bearing reducer 278 about a horizontal axis 290.

Bearing reducer 278 supports an arm 282 having a plate 283 depending therefrom at right angles. Plate 283 supports linear guides 284, 285. Linear guides 284, 285 respectively support bearing cars 286, 287 which respectively support jaws 288, 289 provided to clamp a brick. Jaws 288, 289 respectively are fitted with lead screw nuts 296, 297 shown as hidden lines. Leadscrew nuts 296, 297 engage with leadscrew 293.

Arm 282 supports a servo motor 291 (not shown clearly in FIG. 16, but shown in FIG. 15) which drives a pulley 292. Arm 282 supports a leadscrew 293 fitted with a pulley 294. An endless toothed belt 295 is wrapped around pulleys 292 and 294. Through this arrangement, servo motor 291 drives leadscrew 293 which is engaged with leadscrew nuts 296, 294 to move jaws 288, 289 together to grip a brick 298 or apart to release the brick 298.

As can be seen in the drawings, and particularly in the sequence of FIGS. 55A to 55G, the brick 298 is transported up the tower 10 with its longitudinal extent parallel with the vertical axis 9 of the tower 10. The tower shuttle 186 holds the brick 298 in its gripper jaws 207 and 208 vertically above the body of the tower shuttle car 193, so that the brick can be passed within reach of the jaws 288, 289 of T-B1-rotator 271. The T-B1-rotator 271 rotates the brick 298 so that its longitudinal extent is aligned with the longitudinal extent of boom 12 (and 14). The T-B1-rotator 271 rotates about the same horizontal axis 13 as first boom 12 is mounted to the tower 10. The location of this horizontal axis 13 is such that the shuttle-B1 224 is able to travel under the T-B1-rotator 271 to allow the transfer of the brick 298 from T-B1-rotator 271 to the shuttle-B1 224.

First Boom

Figure 10:
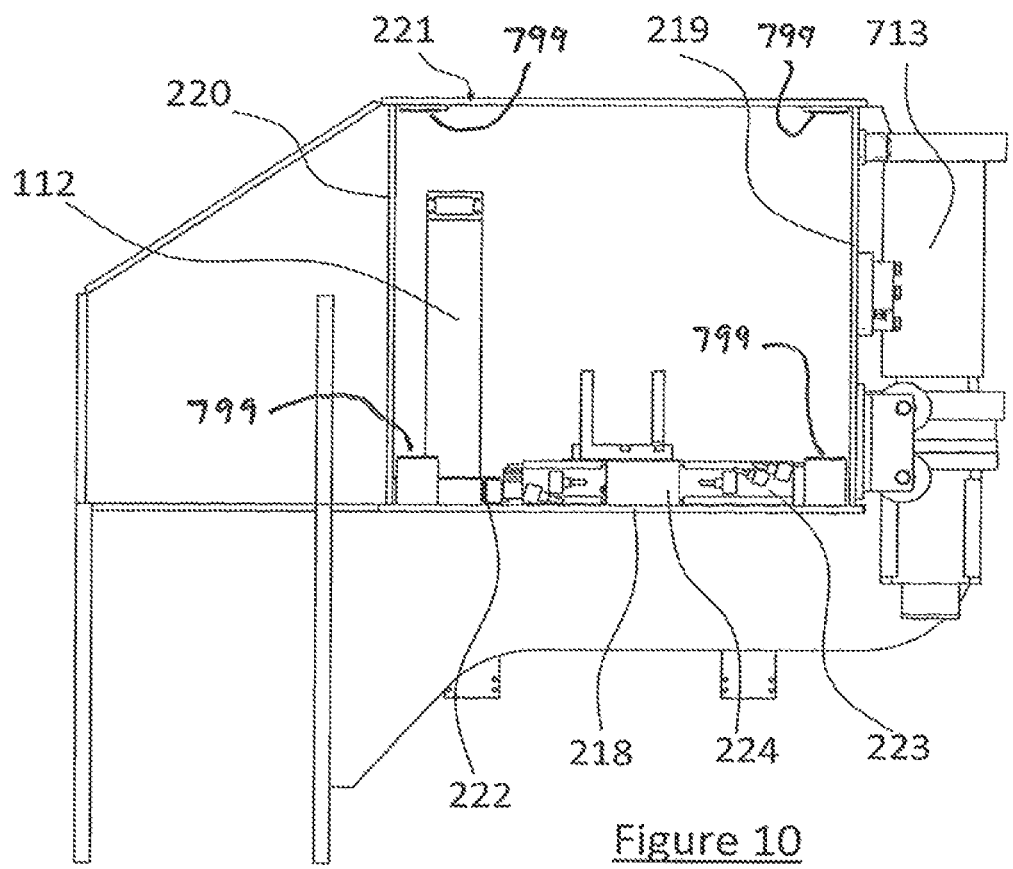
FIG. 10 shows an end view cross section of first boom 12.
Figure 11:
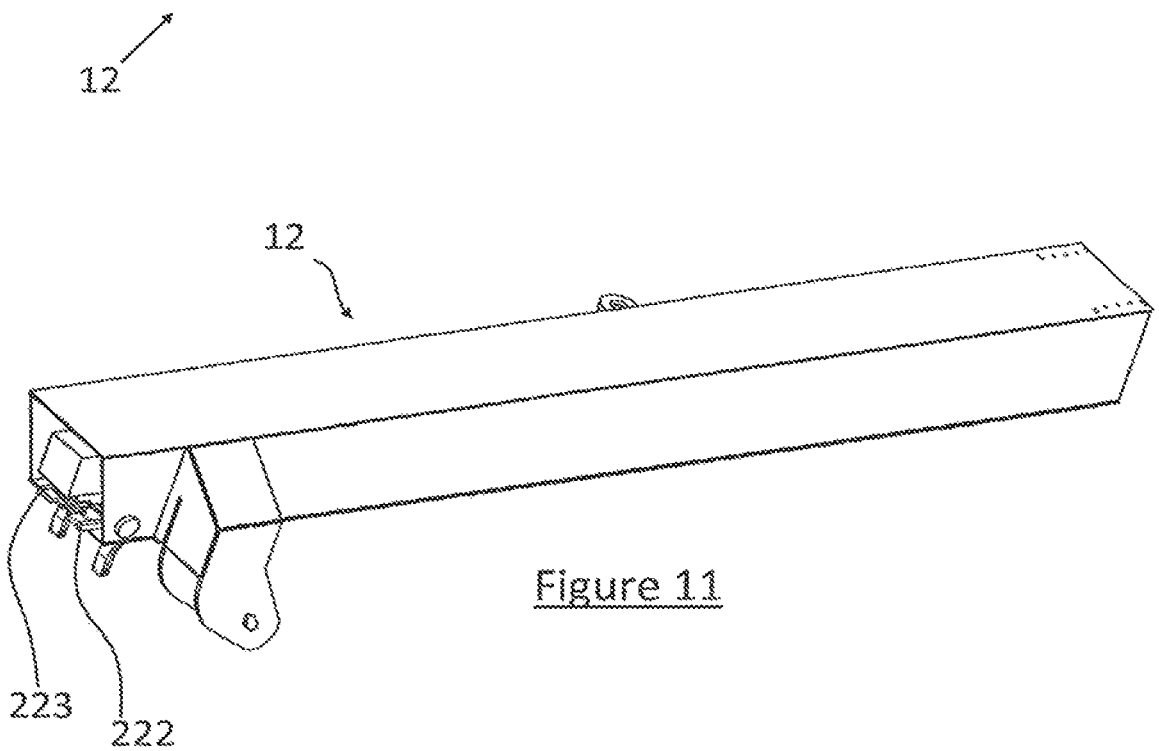
FIG. 11 shows a view of first boom 12.

Refer to FIGS. 9, 10 and 11. Referring to FIG. 9 first boom 12 has boom lift lugs 216, 217 welded thereto. Referring to FIG. 10, boom 12 is of a substantially rectangular or box cross section, and is constructed by welding bottom plate 218 to side plates 219, 220 which are welded to top plate 221. Removable panels (not shown) may be provided in convenient positions along any of the plates 218, 219, 220, 221, to provide access for servicing of internal componentry within first boom 12. The bottom plate 218 supports a track in the form of channels 222, 223 (also shown in FIG. 9). Channels 222 and 223 support shuttle-B1 224. Referring to FIG. 9, shuttle 224 is shown gripping a brick 225.

Shuttle

A shuttle grips a brick and is moved along the inside of the boom from the near end of the boom, nearly to the distal end of the boom, by toothed belts driven by servo motors fitted to the boom. The servo motors are fitted to the boom to minimise the size and weight of the moving shuttle and also to avoid having to use cable chains or slip tracks to transfer electrical power and signals to and from the shuttles. One servo motor 256 moves the shuttle and the other servo motor 255 moves the jaws of the shuttle. A detailed description follows.

Figure 14:
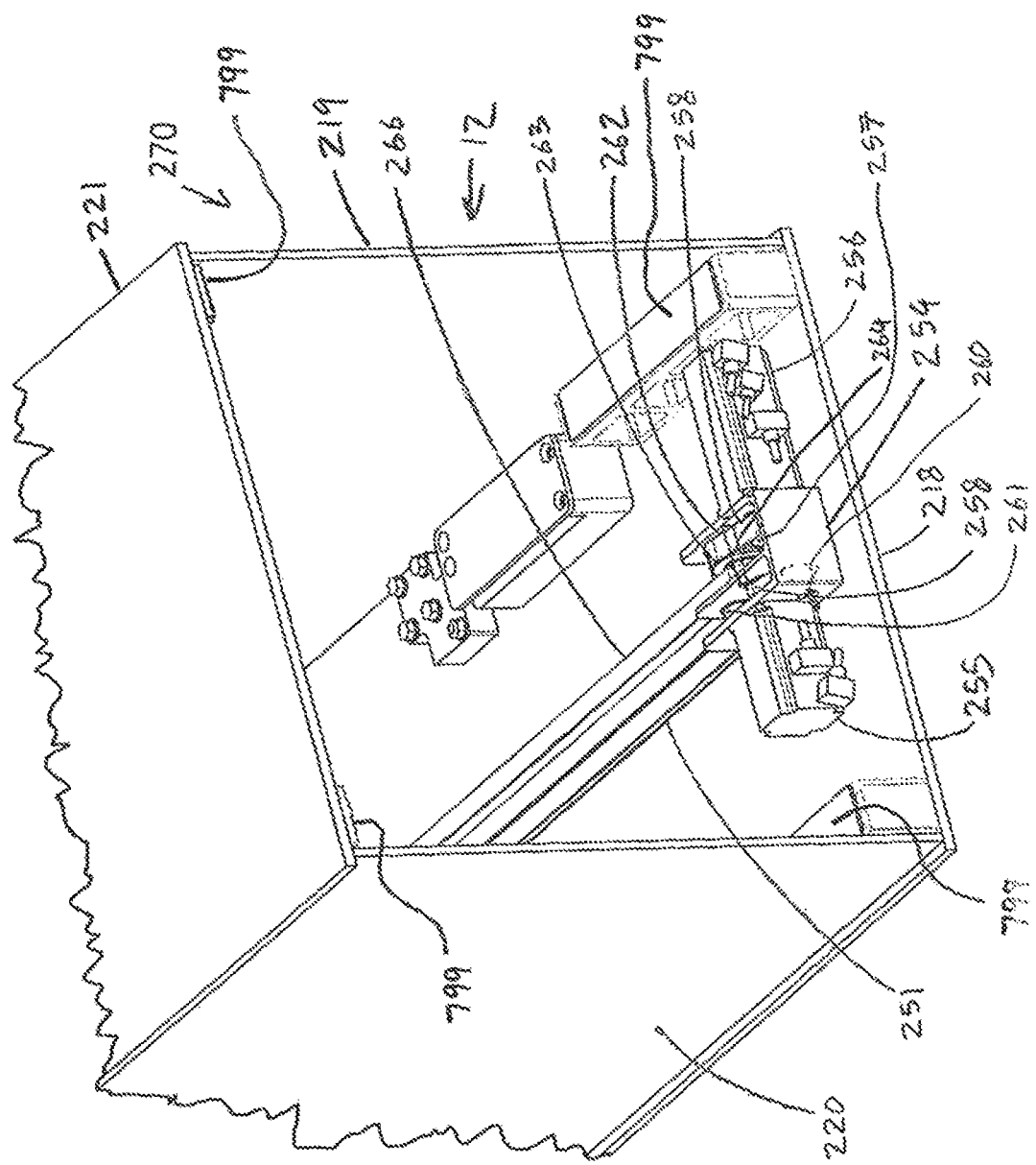
FIG. 14 shows a view of the tip end of boom 12 and a drive assembly 254.

Refer to FIGS. 9, 10 and 14. Referring to FIG. 14, bottom plate 218 supports a drive assembly 254 located at the distal end 270 of the first boom 12. Drive assembly 254 has a body that supports servo motors 255 and 256. Servo motor 255 drives a pulley 258 which drives an endless belt 251. Endless belt 251 passes around idlers 260, 261. Plate 218 supports idler pulley assembly 259 (shown in FIG. 9) to turn the belt.

Servo motor 256 drives a pulley 257. Drive assembly 254 has a shaft 262 that supports a large pulley 263 and a small pulley 264, forming part of a reduction drive. An endless toothed belt 258 wraps around pulley 257 and large pulley 263. A belt 266 wraps around pulley 264 and idler pulley assembly 265 at the near end 269 of first boom. Belt 266, running the length of first boom 12 is driven by pulley 264.

Figure 12:
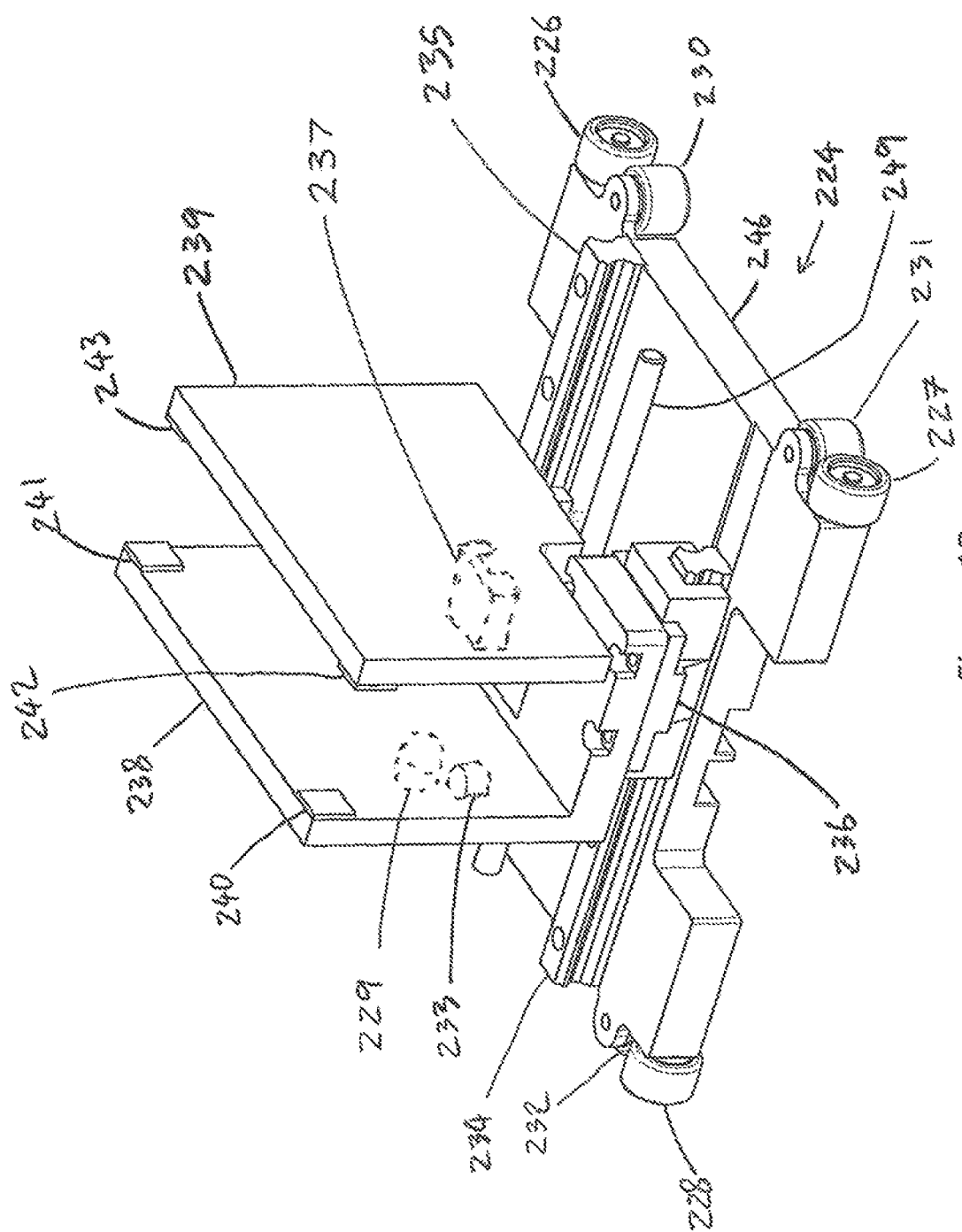
FIG. 12 shows a view of shuttle-B1 224.
Figure 13:
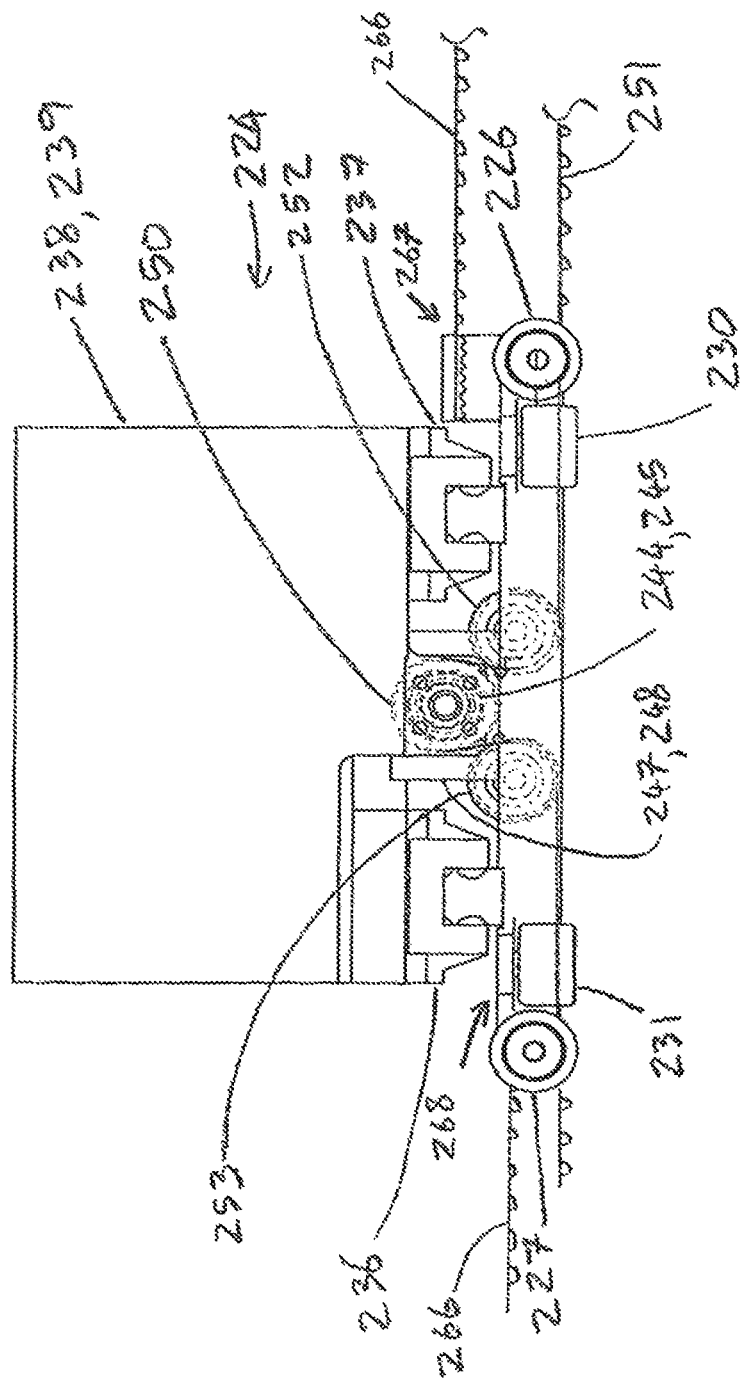
FIG. 13 shows a side view of shuttle-B1 224.

Refer to FIGS. 9, 12 and 13. Referring to FIG. 12, shuttle-B1 224 has a body 246 which supports wheels 226, 227, 228, 229 that rotate about substantially horizontal axes, and supports wheels 230, 231, 232, 233 that rotate about axes in a vertical plane. Shuttle-B1 224 supports linear guides 234, 235. Linear guides 234, 235 respectively support bearing cars 236, 237 which respectively support jaws 238, 239. Jaw 238 is provided with rubber gripping pads 240, 241 and jaw 239 is provided with rubber gripping pads 242, 243. Jaws 238, 239 respectively support lead screw nuts 244, 245 at the base thereof (shown in FIG. 13). Body 246 supports bearing housings 247, 248 (shown in FIG. 13) which support a leadscrew 249. Referring to FIGS. 12 and 13, leadscrew 249 is fitted with a pulley 250, located between the bearing housings 247 and 248. Leadscrew 249 engages with leadscrew nuts 244, 245. Body 246 supports idler pulleys 252, 253. Tooth belt 251, shown partially in FIG. 13 and also in FIG. 14, wraps partially around pulley 252, then pulley 250 then pulley 253. Tooth belt 251 drives pulley 250, which in turn rotates leadscrew 249 which moves the jaws 238, 239. Belt 265 is connected to body 246 at a first location 267 and a second location 268. The drive train described allows servo motor 255 to move the jaws 238, 239 together to clamp a brick 225, or apart to unclamp a brick 225. The drive chain described allows servo motor 256 to move the shuttle-B1 along the inside of first boom 12. Thus a brick 225 can be clamped by a shuttle-B1 224 and moved from the first end 269 of first boom 12 to the second end 270 of first boom 12 and then brick 225 (shown in FIG. 9) can be unclamped. As servo motor 256 moves the shuttle-B1 224 along the boom, servo motor 255 must be synchronised with servo motor 256 to avoid the jaws 238 and 239 from inadvertent movement which could result in the brick being released or over-tightening of the jaws, or the shuttle jaws being run past their intended travel limits.

It will be seen in the discussion that follows, that the tracks, shuttles and drive assemblies of sticks 15, 17, 18, and 19 follow the same fundamental configuration as that of boom 12.

Winch

Winches and cables are used to move the telescopic sections of the boom and stick via a system of pulleys. The winch and cable system provides a very light weight means of moving the telescopic sections of the foldable boom. It was found that electric ball screws or hydraulic rams or toothed racks and gears could be used to move the telescopic sections of the boom, but these systems have a higher weight than the cable drive system described. The winch and cable system is detailed below.

Figure 41:
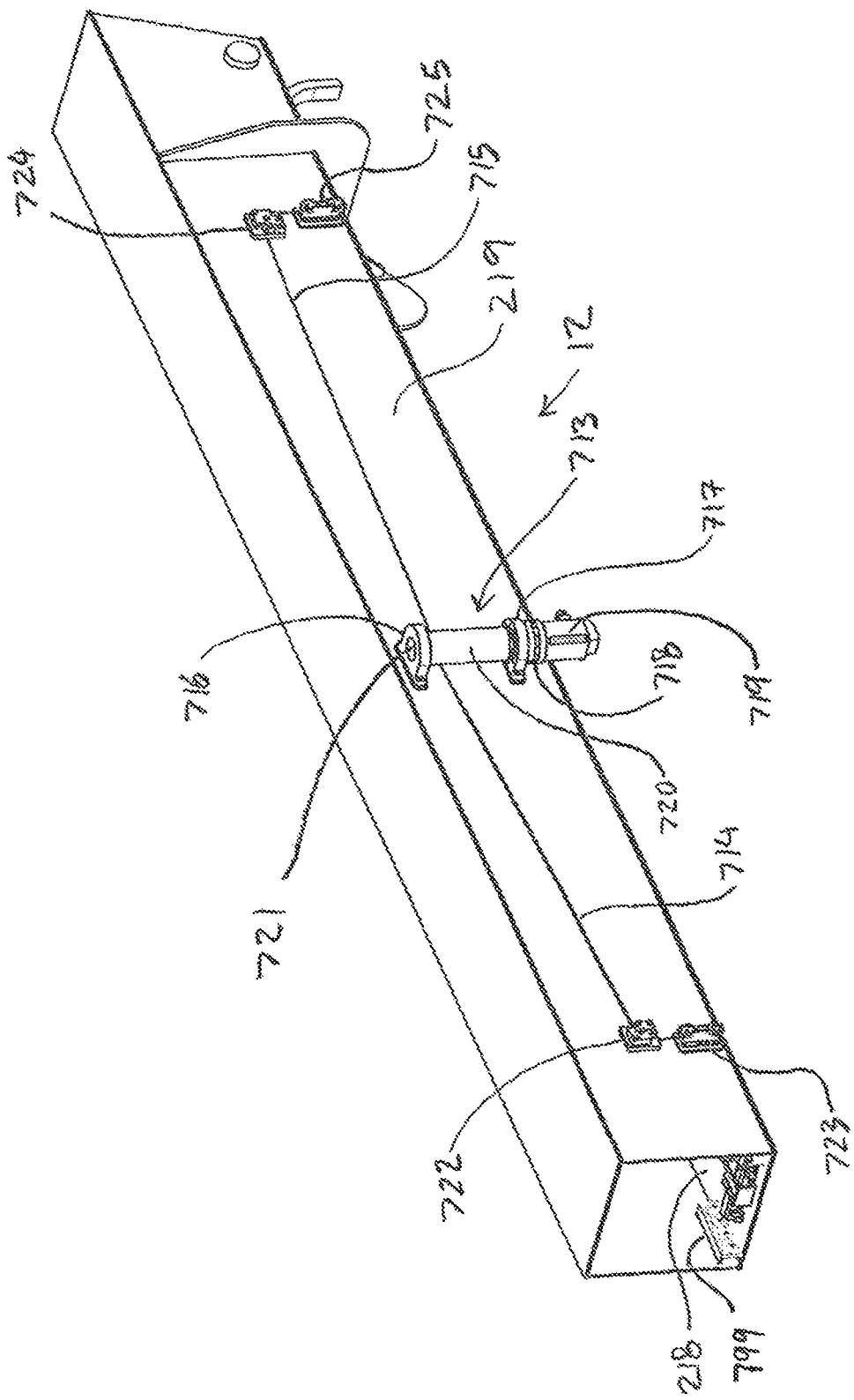
FIG. 41 shows a view of the first boom 12.

Referring to FIGS. 10 and 41, side plate 219 supports a winch assembly 713. Referring to FIG. 41, winch 713 winds cables 714, 715 that telescopically move the second boom 14 relative to the first boom 12 (shown in FIG. 1). Winch assembly 713 has bracket 716 and bracket 717 supported on side plate 219. Bracket 717 supports bearing reducer 718 which is driven by servo motor 719, providing a reduction drive for winch drum 720. Bracket 716 supports a roller bearing 721 that rotateably supports winch drum 720.

Figure 42:
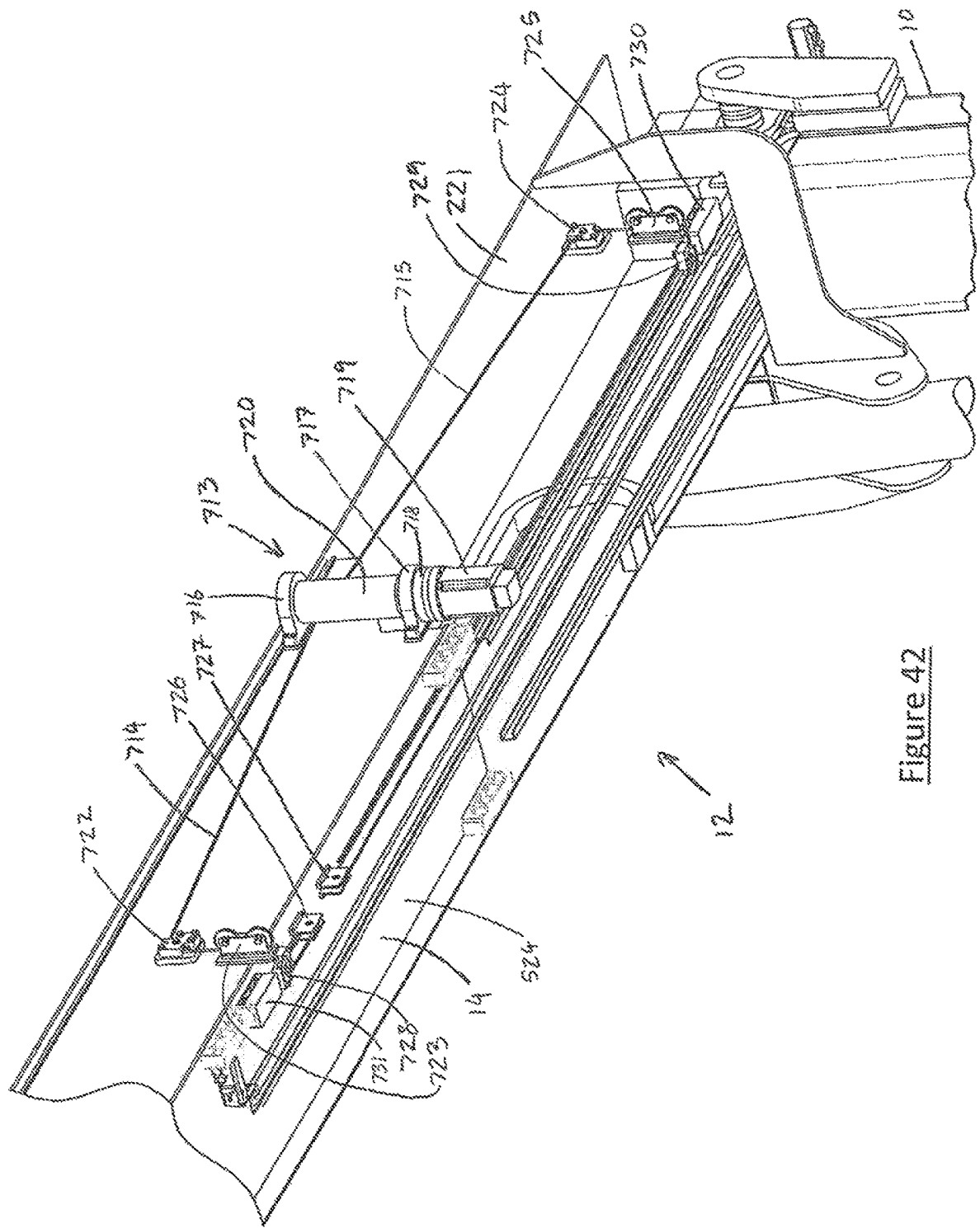
FIG. 42 shows a cut-away view of first boom 12 and second boom 14.

Side plate 219 supports idler pulleys blocks 722, 723, 724, 725. FIG. 42 shows a view of the boom 12 with side plate 219 and bottom plate 218 removed for clarity so that the second boom 14 can be seen more clearly. First boom 12 bottom plate 218 supports idler pulley blocks 728, 729, 730, 731. Second boom 14 bottom plate 524 supports idler pulley blocks 726, 727. Cable 714 passes in turn from the winch drum 720 to pulley block 722 then to pulley block 723, then pulley block 728 then through pulley block 726 then pulley block 731 and then is fastened to the bottom plate 524 of second boom 14. Cable 714 passes in turn from the winch drum 720 to pulley block 724, then to pulley block 725, then to pulley block 729, then through pulley block 727 then through pulley block 730 and then is fastened to the bottom plate 524 of second boom 14. The pulley blocks provide mechanical advantage so that a thin cable can be used. Servo motor 719 rotates the input of bearing reducer 718 which rotates the winch drum 720 which moves cables 714, 715 which slides second boom 14 relative to first boom 12.

Wear blocks 799 formed from ultra high molecular weight polyethylene (UHMPE) or other suitable material, are secured to the distal end of boom 12 and the near end of boom 14 to provide bearing surfaces for the elements to telescopingly slide. Wear blocks 799 of such material are described throughout this description to provide bearing surfaces for the telescoping parts of both the boom and the stick.

Second Boom

Figure 18:
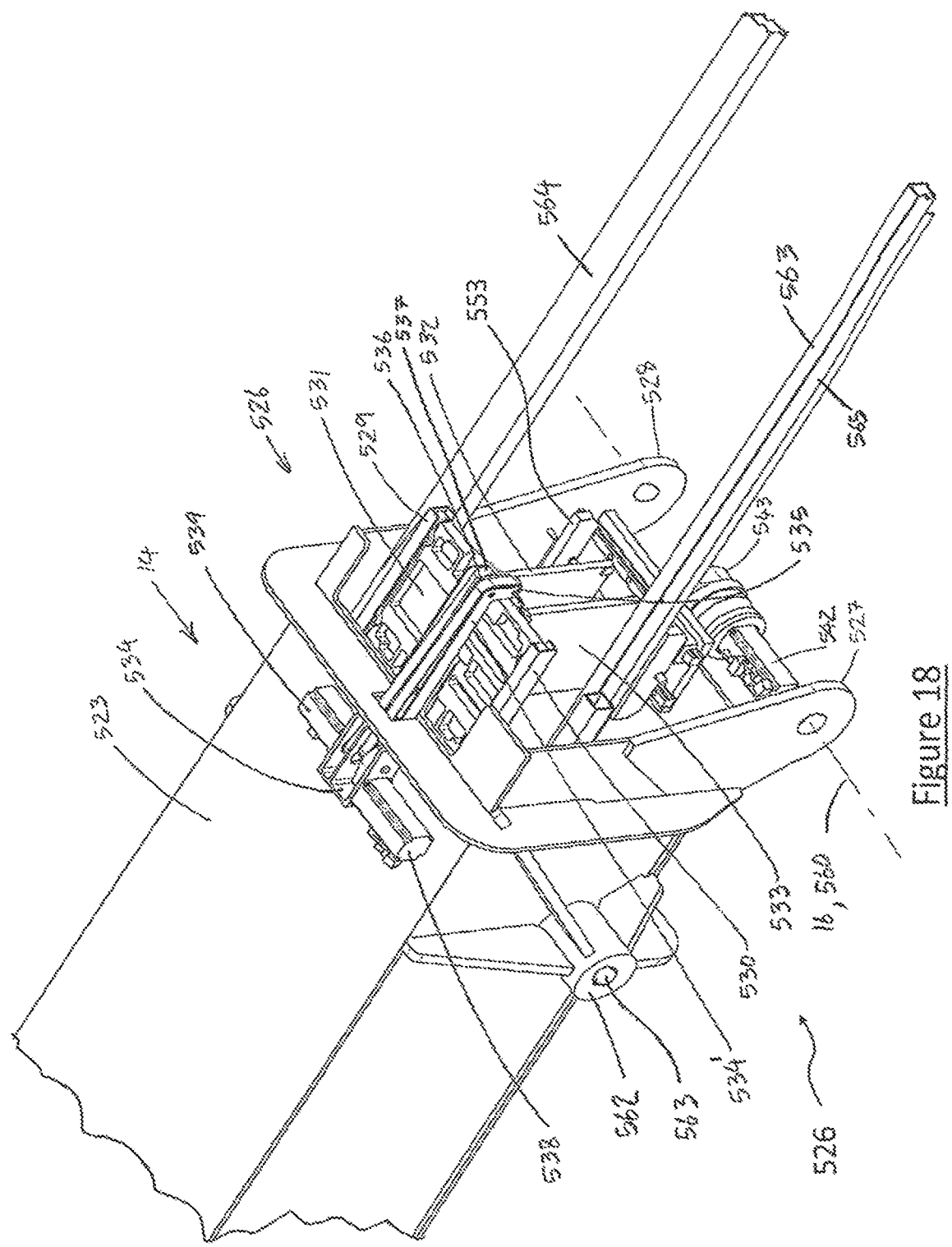
FIG. 18 shows a view of the second end 526 of second boom 14.
Figure 19:
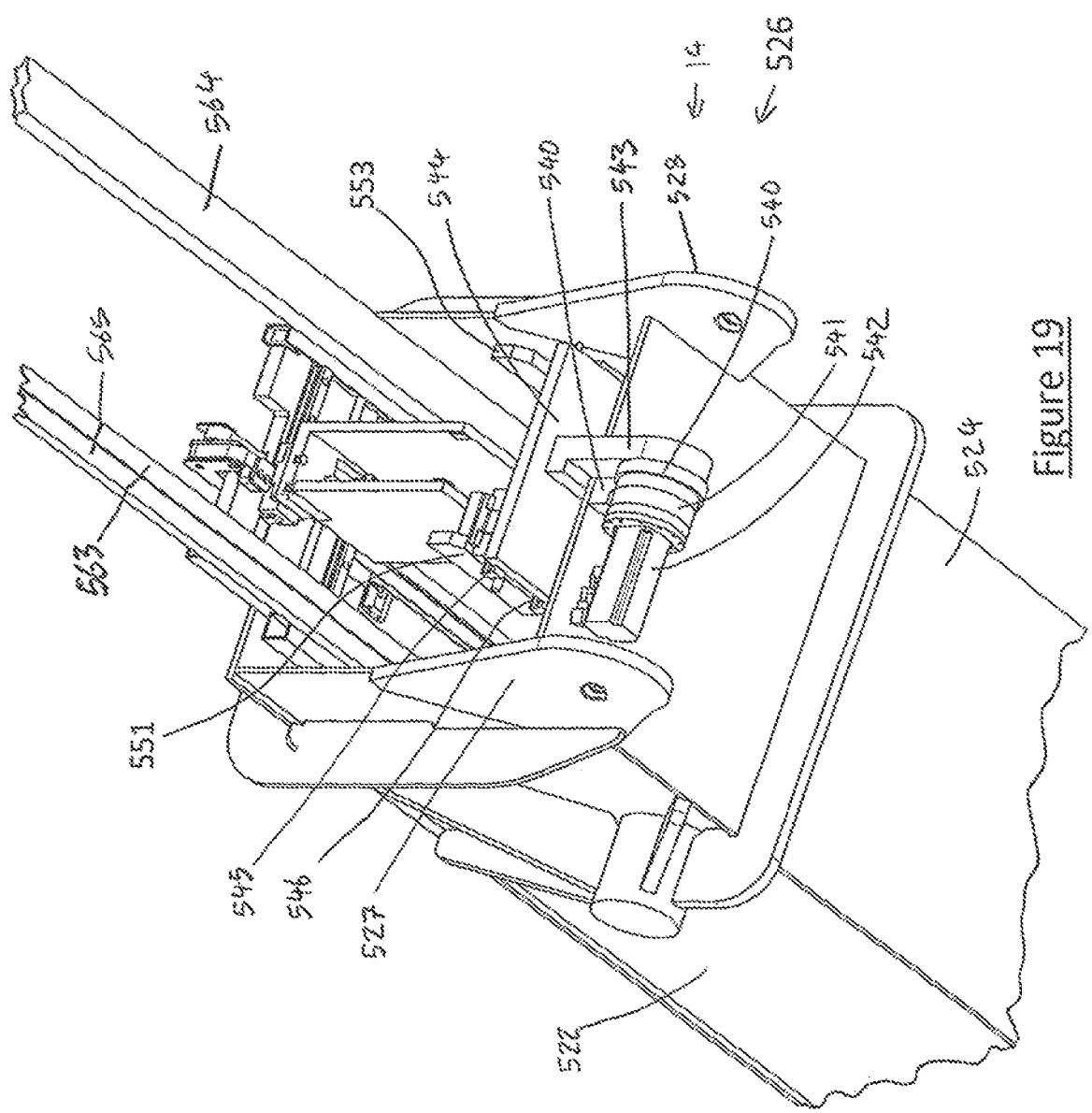
FIG. 19 shows a view of the second end 526 of second boom 14.

Referring to FIGS. 17, 18, 19, 20, 21, second boom 14 is of a substantially rectangular or box cross section. Referring to FIG. 17, second boom 14 is constructed by welding bottom plate 524 to side plates 521, 522, and welding side plates 521, 522 to top plate 523. As with the first boom 12, removable panels (not shown) may be provided in convenient positions along any of the plates 521, 522, 523, 524, to provide access for servicing of internal componentry within second boom 14. Second boom 14 has a first near end 525 and a second distal end 526. Second distal end 526 supports lugs 527, 528. Referring to FIG. 18, top plate 523 supports channels 529, 530, which form a track to support shuttle-B2 531.

Shuttle-B2 531 has jaws 532, 533 for the gripping of a brick. Top plate 523 supports bracket assembly 534, which supports idler pulleys 535, 536, 537. Bracket assembly 534 supports servo motors 538, 539. Servo motor 539 drives the jaws 532, 533. Servo motor 538 drives the shuttle-B2 531. Shuttle-B2 531 can move linearly from the first end 525 to the second end 526 of second boom 14. The arrangement is the same as described for the first boom 12 except that the servo motors 538 and 539 are mounted externally on boom 14 to allow the channels 529 and 530 that form the track within second boom 14 to extend from the near end 525, to the distal end 526, so that the shuttle-B2 531 can traverse the entire length of second boom 14.

Referring to FIG. 18, side plate 521 supports a boss 562. Boss 562 has a bore 563. Bore 563 supports an end of dog bone link 156 seen in FIG. 1.

Figure 20:
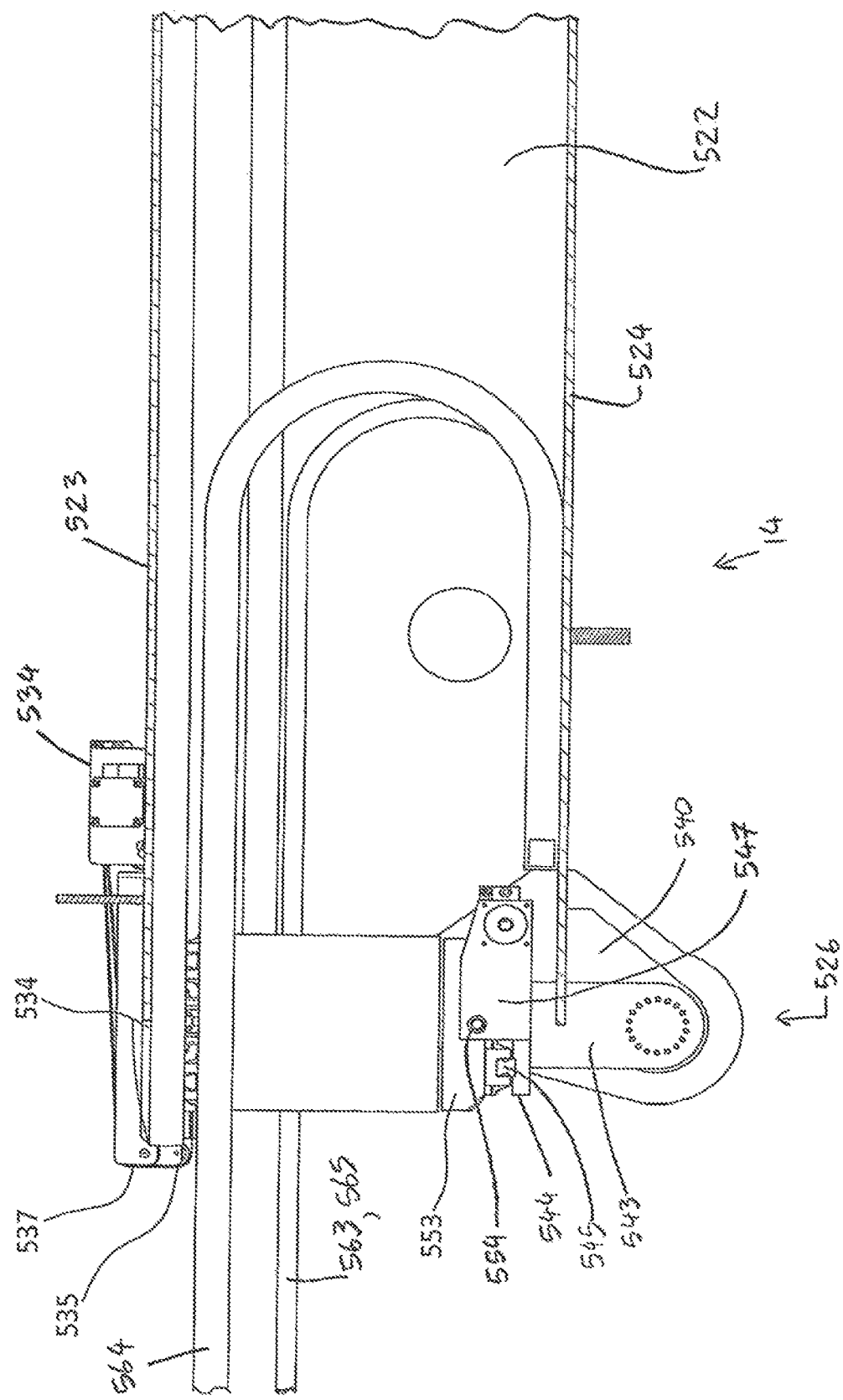
FIG. 20 shows a cross section side view of the second end 526 of second boom 14.
Figure 21:
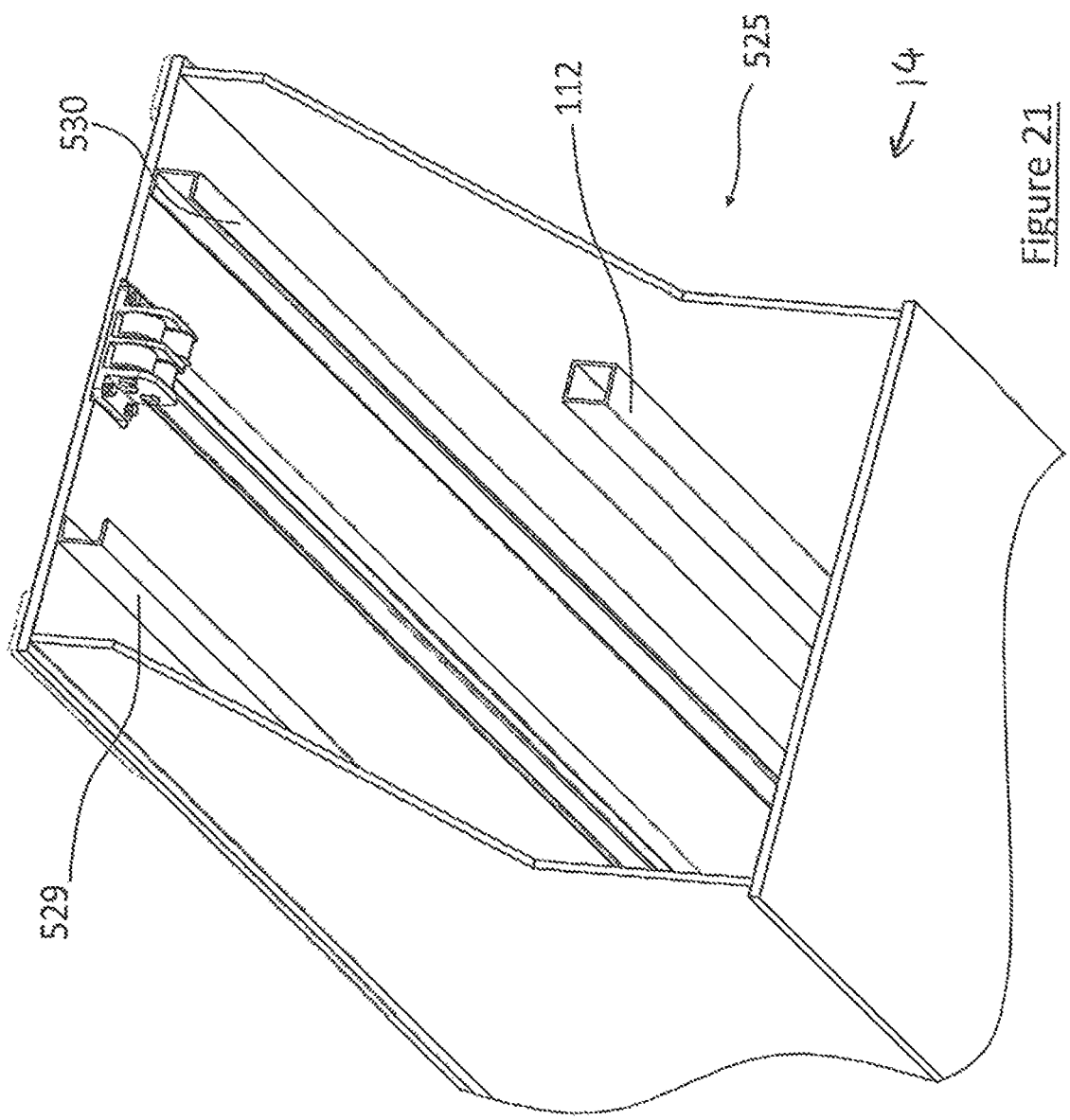
FIG. 21 shows a view of the first end 525 of second boom 14.

Refer to FIGS. 4, 20 and 21. An arrangement of energy chains 112 is provided within the boom and stick assembly 141 to carry cables and hoses. Bottom plate 524 supports cable chains 563, 564, 565.

Rotator-B2-S1

The rotator-B2-S1 548 transfers a brick from the second boom shuttle to the first stick shuttle. It can rotate to align with either the second boom, or the first stick, so that the brick maintains orientation with its longitudinal extent extending with the first stick longitudinal extent, when the brick is transferred from the second boom 12 to the first stick 15. The rotator-B2-S1 548 has movable gripper jaws to grasp the brick. A detailed description follows.

Figure 22:
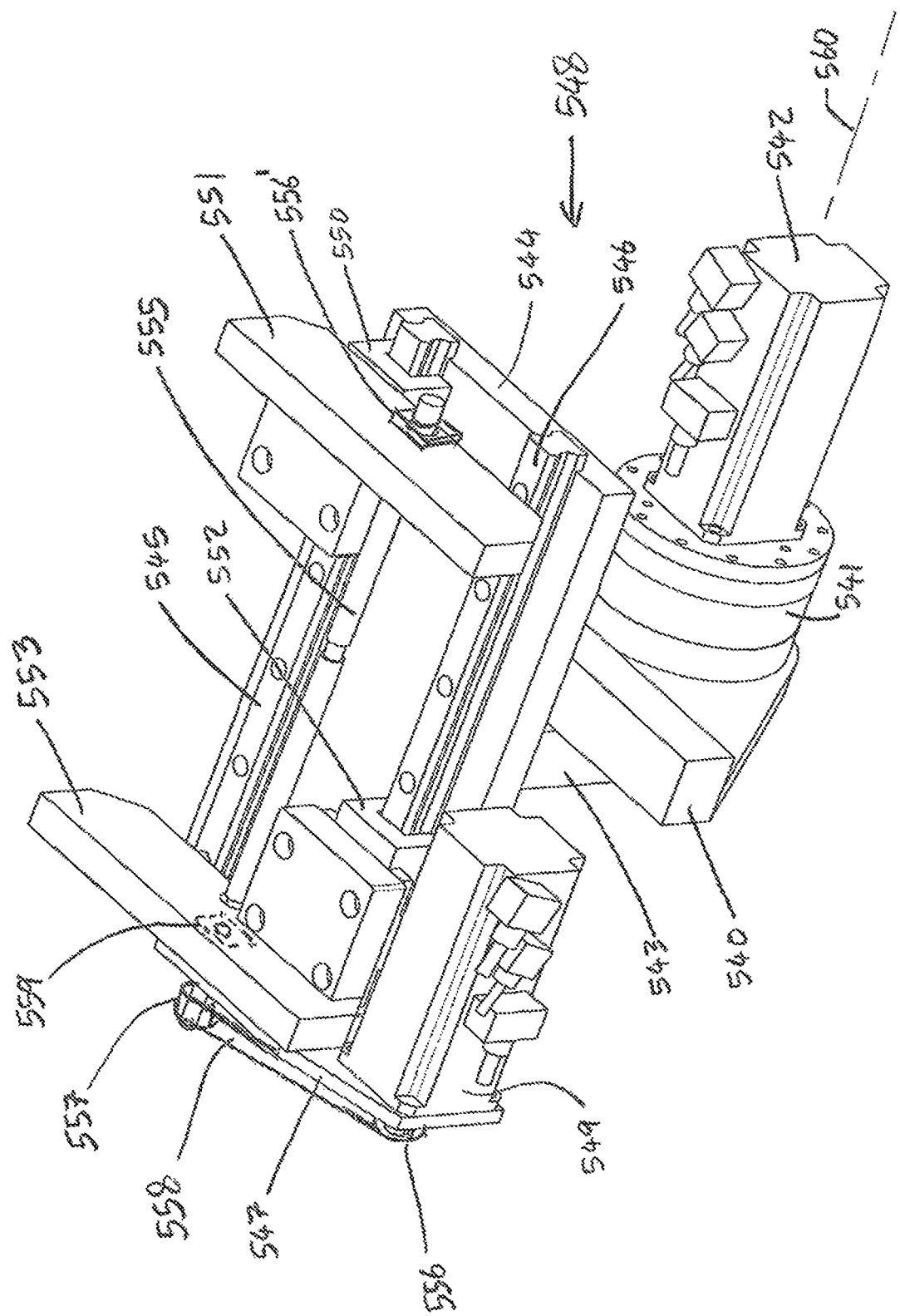
FIG. 22 shows a view of the rotator-B2-S1 548.

Referring to FIGS. 20 and 22, bottom plate 524 supports Rotator-B2-S1 548 from supporting bracket 540. Bracket 540 supports bearing reducer 541, which supports servo motor 542. Bearing reducer 542 supports an assembly of arm 543 and base 544. Base 544 supports mount plate 547 which supports servo motor 549. Base 544 also supports linear guides 545, 546. Linear guide 545 supports bearing car 550 which supports jaw 551. Linear guide 546 supports bearing car 552 which supports jaw 553. Mount plate 547 supports bearing 554 (see FIG. 20), which supports leadscrew 555. Motor 549 has a toothed pulley 556, and leadscrew 555 has a pulley 557, with endless toothed belt 558 wrapped around pulley 556 and pulley 557. Jaw 551 supports nut 556', and jaw 553 supports nut 559 (shown with hidden lines in FIG. 22). Leadscrew 555 engages with nuts 556', 559. Servo motor 549 thus drives leadscrew 555 to move jaws 551 and 553 together to clamp a brick, or apart to release a brick. Servo motor 542 rotates the input of bearing reducer 541. The output of bearing reducer 541 rotates arm 543 about a horizontal axis 16, which is the same axis as the articulated joint 23 connection of second boom 14 to first stick 15. Thus arranged, rotator 548 can grasp a brick located in shuttle-B2 at the second end 526 of second boom 14 and transfer it to a shuttle-S1 located at the first end 561 of first stick 15.

Joint

Refer to FIG. 1. The articulated joint 23 of second boom 14 to first stick 15 about axis 16 is moved by a luffing ram 24 powered by electricity or hydraulics and a first dog bone link 155 and a second dog bone link 156.

Figure 23:
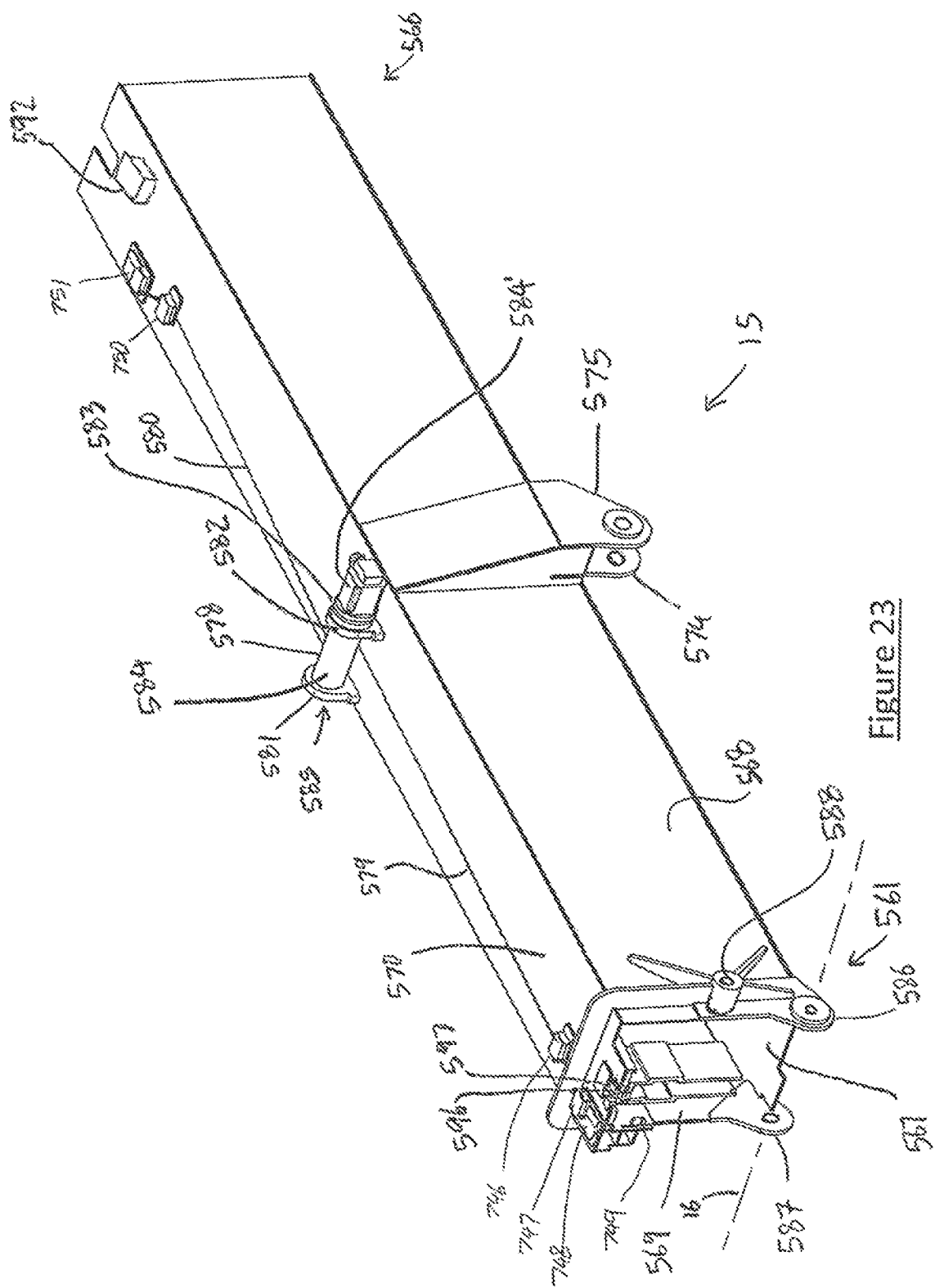
FIG. 23 shows a view of the first stick 15.
Figure 24:
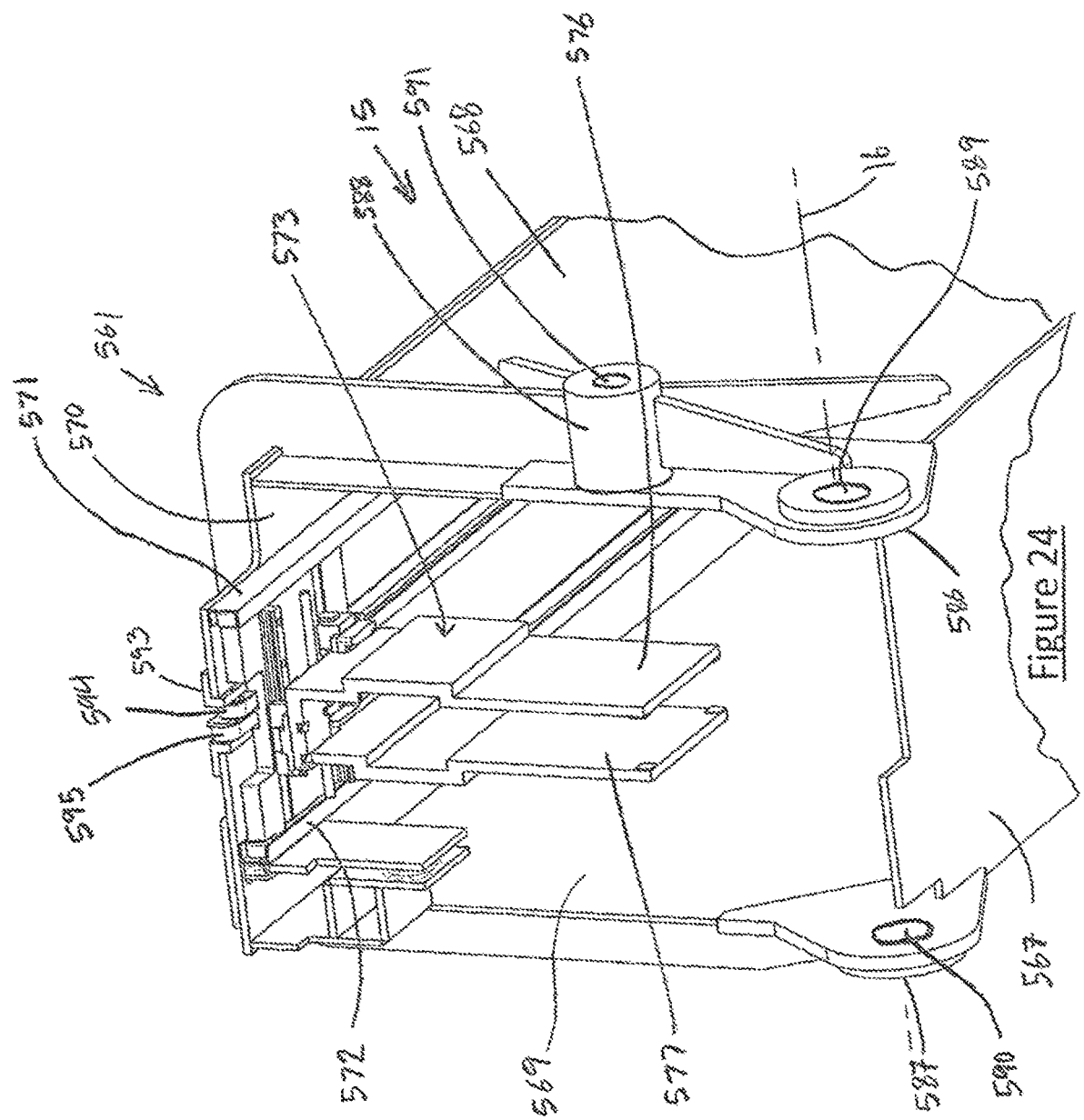
FIG. 24 shows a view of the first end 561 of the first stick 15.

Refer to FIG. 23 and FIG. 24. Side plate 568 supports lug 586. Side plate 569 supports lug 587. Side plate 568 supports boss 588. Lugs 586, 587 respectively have concentric bores 589, 590. Bores 589, 590 are on axis 16. Boss 588 has a bore 591. Bore 591 supports a pin not shown that supports an end of dog bone link 156.

First Stick

Refer to FIGS. 23, 24. First stick 15 has a first near end 561 and a second distal end 566. First stick 15 is of a substantially rectangular or box cross section and welded plate construction, comprising a bottom plate 567, welded to side plates 568, 569, and side plates 568, 569 welded to top plate 570. Side plate 568 supports lugs 574, 575 for connecting an end of luffing ram 24 (shown in FIG. 1).

Stick Assembly

The stick assembly has telescopic sticks that can extend and retract. The extension and retraction is servo controlled. Each stick supports channels that in turn support shuttles that move bricks from a first near end to the next stick. The shuttles move back and forth on tracks within their respective sticks. The shuttles are provided with clamps, and can pass a brick along the stick assembly.

Stick Winch and Cables

The telescopic stick assembly is extended and retracted by a winch that winds cables that wrap around a system of pulleys to move the sticks. The winch is driven by a servo motor and bearing reducer. A detailed description follows.

Figure 46:
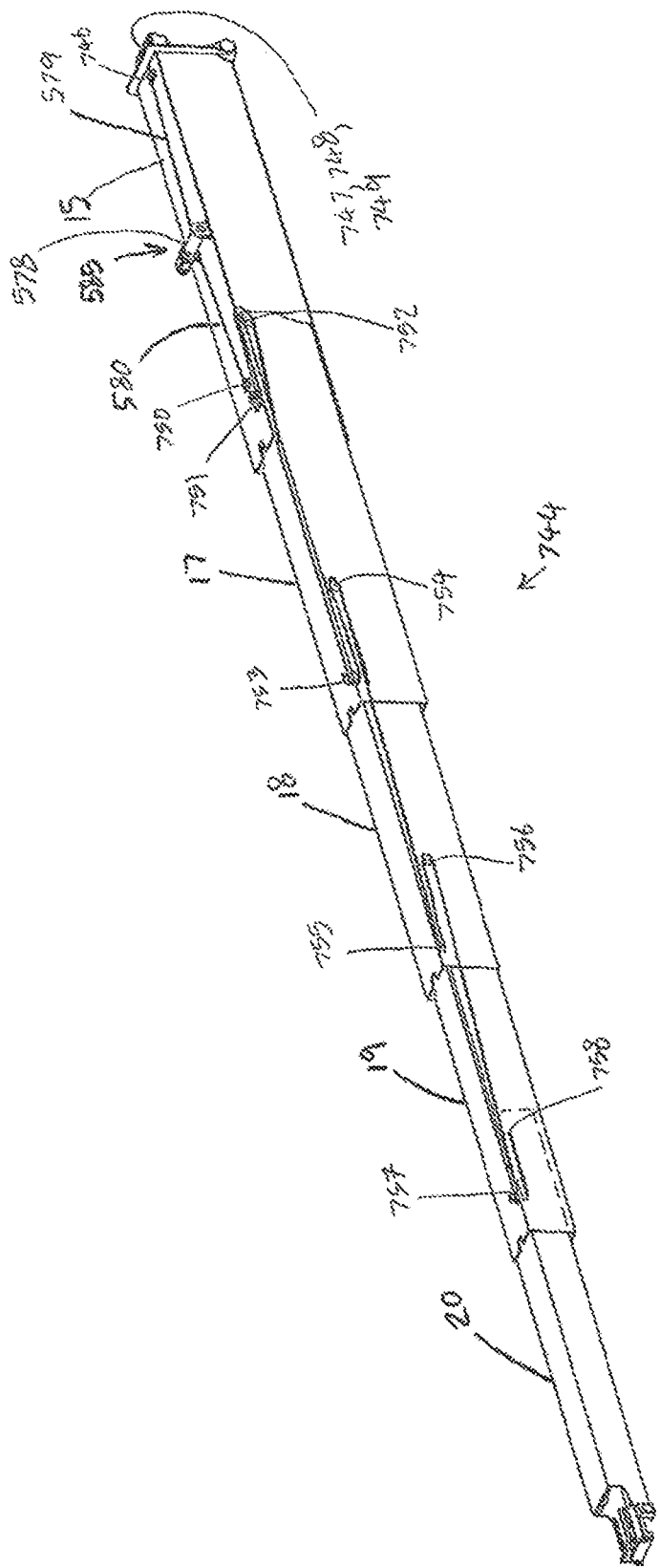
FIG. 46 shows a view of the stick assembly 744 showing extension cable.

Refer to FIGS. 23 and 46. Referring to FIG. 23, the top plate 570 supports a winch 578. Winch 578 winds cables 579, 580 that telescopically move the second stick 17, third stick 18, fourth stick 19 and fifth stick 20 within and relative to first stick 15 (shown in FIG. 46).

Winch 578 is mounted to top plate 570 by bracket 581 and bracket 582. A bearing reducer 583 is provided between servo motor 584' and a winch drum 584. Bracket 581 supports a roller bearing 585 (not visible) that rotateably supports the winch drum 584, at the end thereof away from the bearing reducer 583. Top plate 570 supports pulley blocks 746, 747, 748, 749, 750, 751.

FIG. 46 shows a view of the stick assembly 744. Second stick 17 supports pulley blocks 752, 753. Third stick 18 supports pulley blocks 754, 755. Fourth stick 19 supports pulley blocks 756, 757. Extension cable 580 is wrapped on winch drum 578 and then passes through pulleys 750, 751, then to second stick 17 pulley block 752, then to pulley block 753, then to third stick 18 pulley block 754, then to pulley block 755, then to fourth stick 19 pulley block 756, then to pulley block 757, then to a termination 758 on fifth stick 20. Tension on cable 580 forces the stick assembly 744 to extend.

Figure 47:
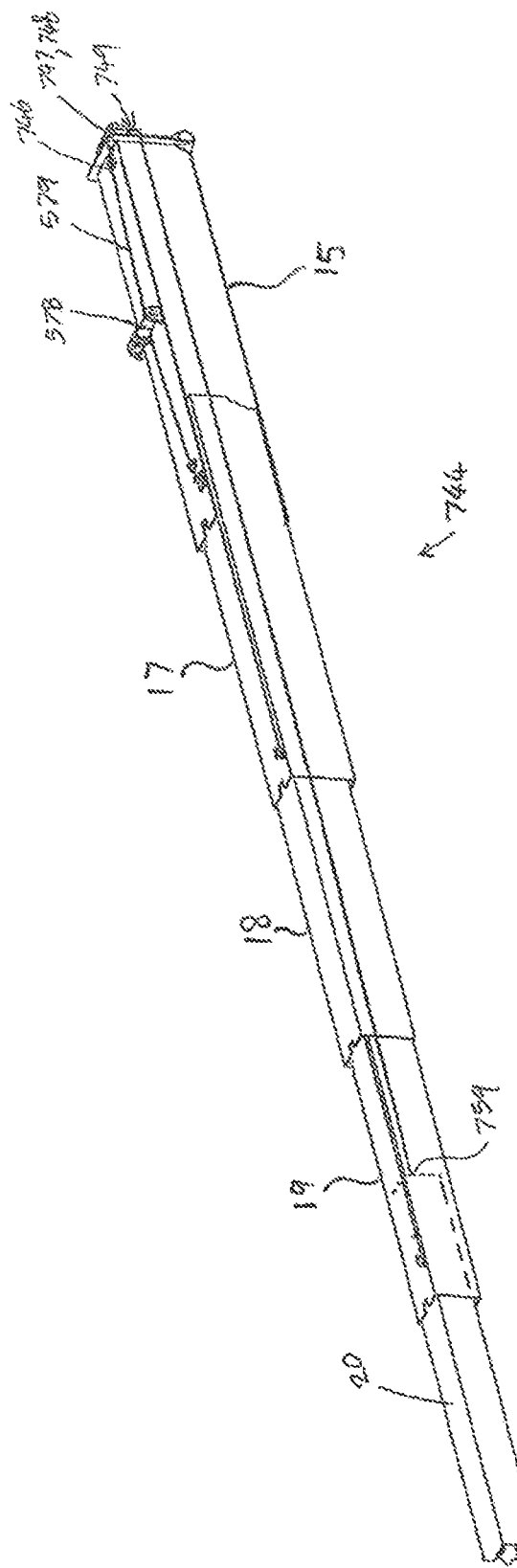
FIG. 47 shows a view of the stick assembly 744 showing retraction cable.

Referring to FIG. 47, retraction cable 579 is wrapped on winch drum 578 and then passes through pulley blocks 746, 747, 748 and 749 and then runs internally inside stick assembly 744 to termination 759 on fifth stick 20. Tension of cable 579 forces the stick assembly 744 to retract.

Figure 48:
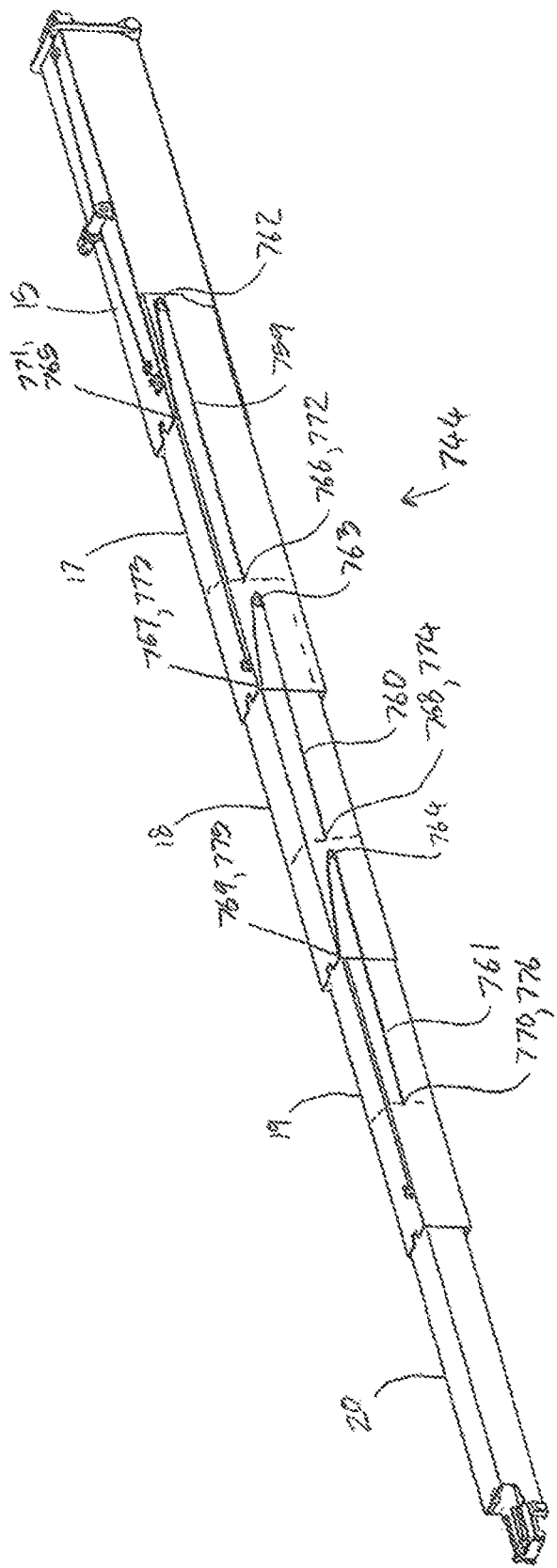
FIG. 48 shows a view of the stick assembly 744 showing retraction cables.

FIG. 48 shows a view of stick assembly 744. Cables 759, 760 and 761 act to keep the extension of each stick, relative to its neighbours, similar. Second stick 17 supports pulley block 762. First stick 15 supports a termination 765 of first end 771 of cable 759. Cable 759 passes through pulley block 762 and third stick 18 supports a termination 766 of second end 772 of cable 759. Third stick 18 supports a pulley block 763. Second stick 17 supports a termination 767 of first end 773 of cable 760. Cable 760 passes through pulley block 763. Fourth stick 19 supports a termination 768 of second end 774 of cable 760. Fourth stick 19 supports pulley block 764. Third stick 18 supports a termination 769 of first end 775 of cable 761. Cable 761 passes through pulley block 764. Fifth stick 20 supports a termination 770 of second end 776 of cable 761.

First Stick

Referring to FIGS. 23 and 24, the top plate 570 supports a track in the form of longitudinally extending channels 571, 572, inside the stick 15. Channels 571, 572 run from the first near end 561 of first stick 15, nearly to the second distal end 566, save room for the drive assembly 592 at the end of the track, inside the first stick 15. Channels 571, 572 slideably support shuttle-S1 573. Shuttle-S1 573 has jaws 576, 577 provided to clamp a brick.

Figure 57A:
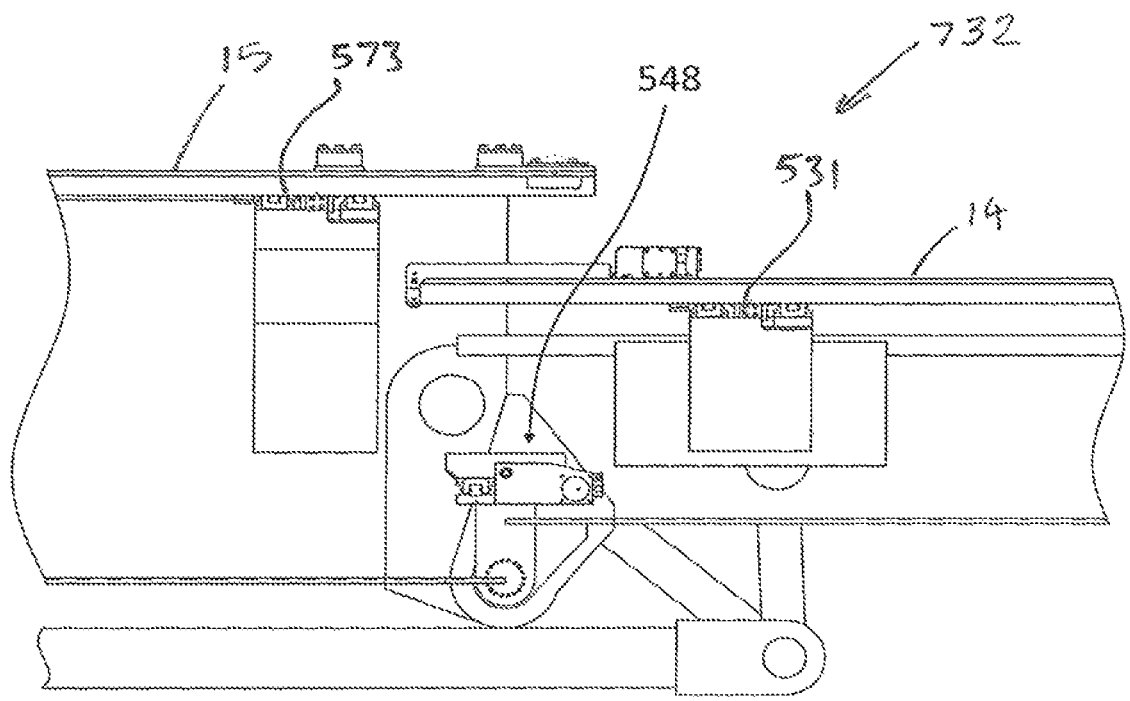
FIGS. 57A-57D show a sequence of a brick being transferred from the second boom 14 to the B2-S1 rotator 548 to the first stick 15. In the FIGS. 57A to 57D the foldable boom 732 is in a horizontal pose.
Figure 57B:
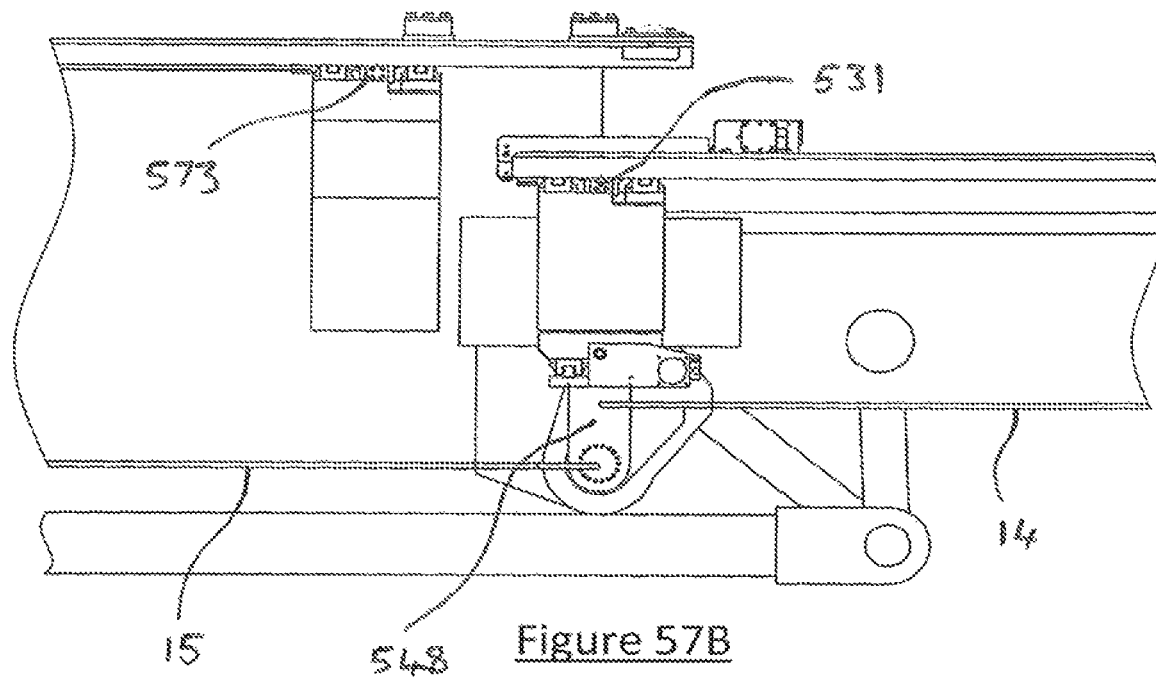
Figure 57C:
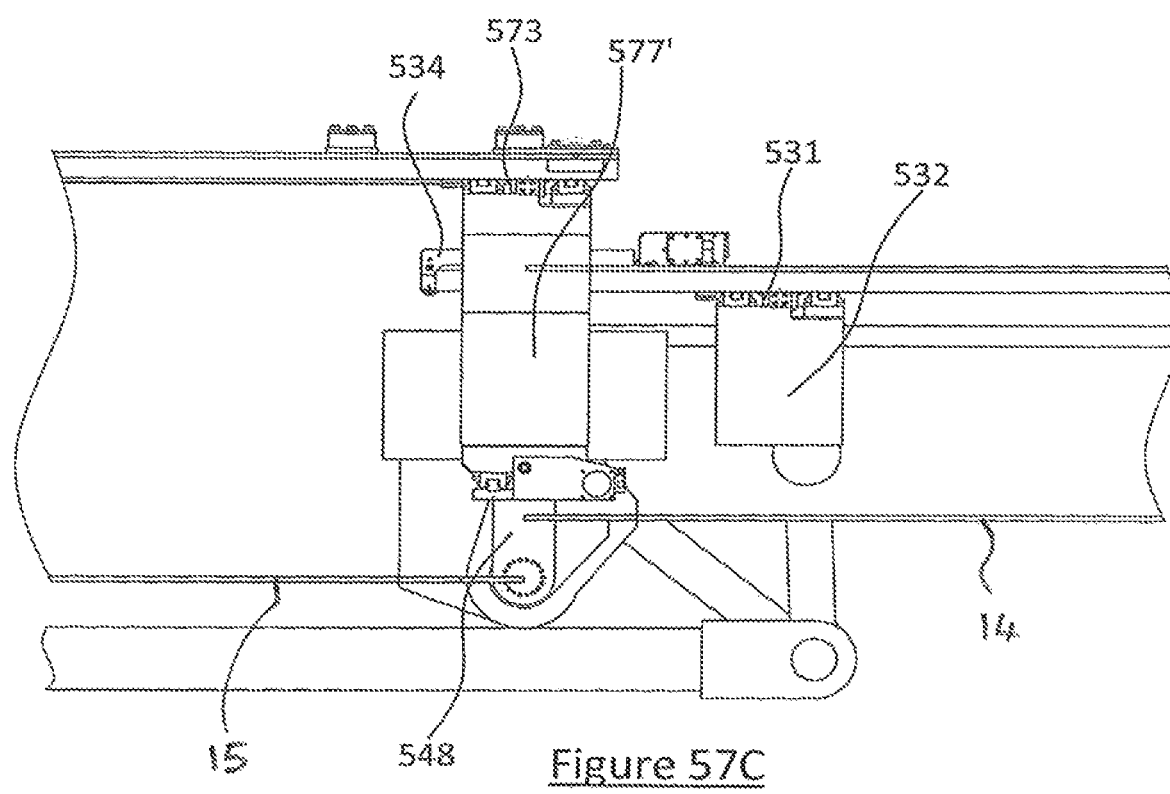
Figure 57D:
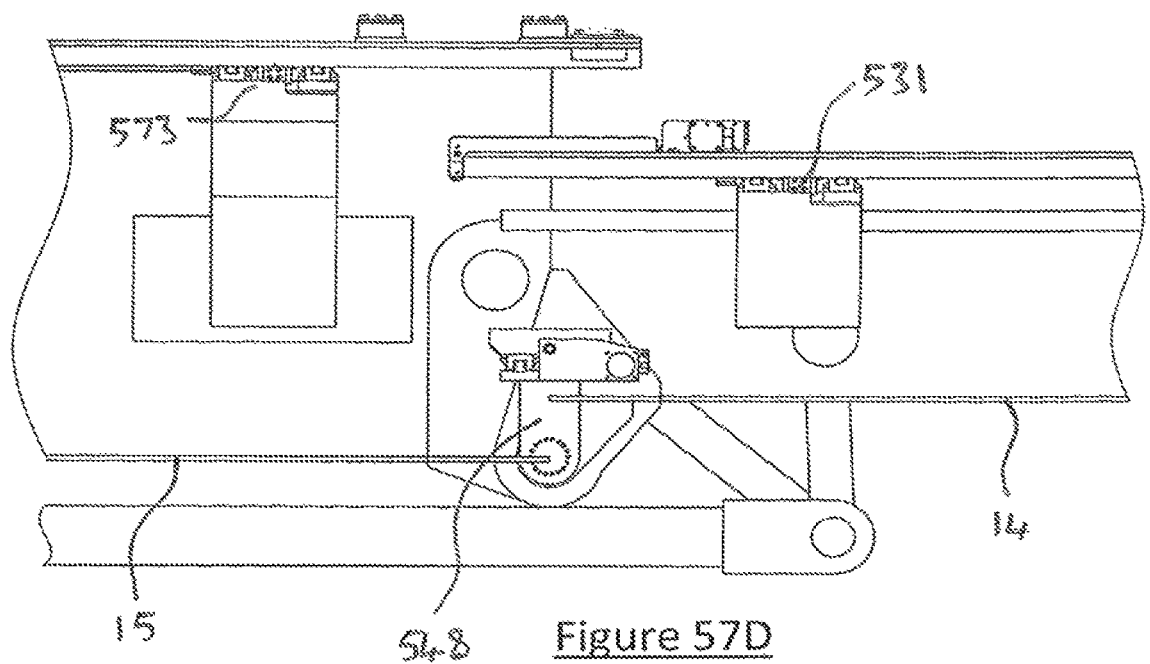

Top plate 570 supports drive assembly 592 inside first stick 15, in the same manner as that of the first boom 12. Top plate 570 supports bracket 593, which supports idler pulleys 594, 595, 596, 597. Servo motors not shown on drive assembly 592 move the shuttle-S1 573 along the top of and inside first stick 15 and can open and close jaws 576, 577 to grip or release a brick. Thus shuttle 573 can grasp a brick at first near end 561 of first stick 15 and move it to or toward second distal end 566 of first stick 15, then unclamp the brick not shown. The mechanism for this functions in the same manner as that of the first boom 12 and its shuttle. The jaws 576 and 577 each include a deviation 576' and 577' which aligns with the bracket assembly 534 of second boom 14, to provide clearance to receive bracket assembly 534 at the distal end of second boom 14, when the shuttle-S1 573 moves in to take a brick from rotator-S2-S1 548 when second boom 14 and first stick 15 are aligned in line, as shown in FIG. 57C.

Second Stick

Figure 25:
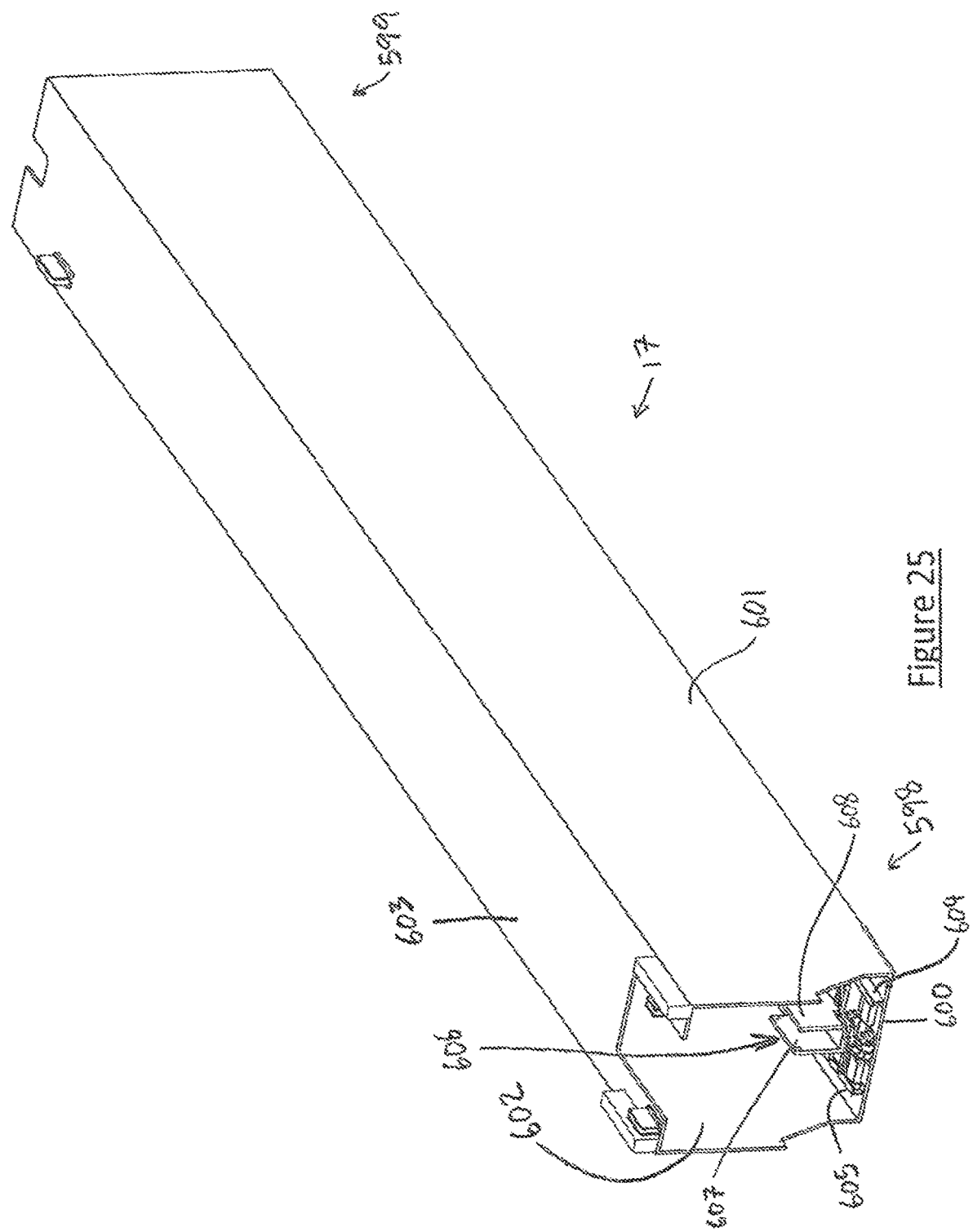
FIG. 25 shows a view of the second stick 17.
Figure 26:
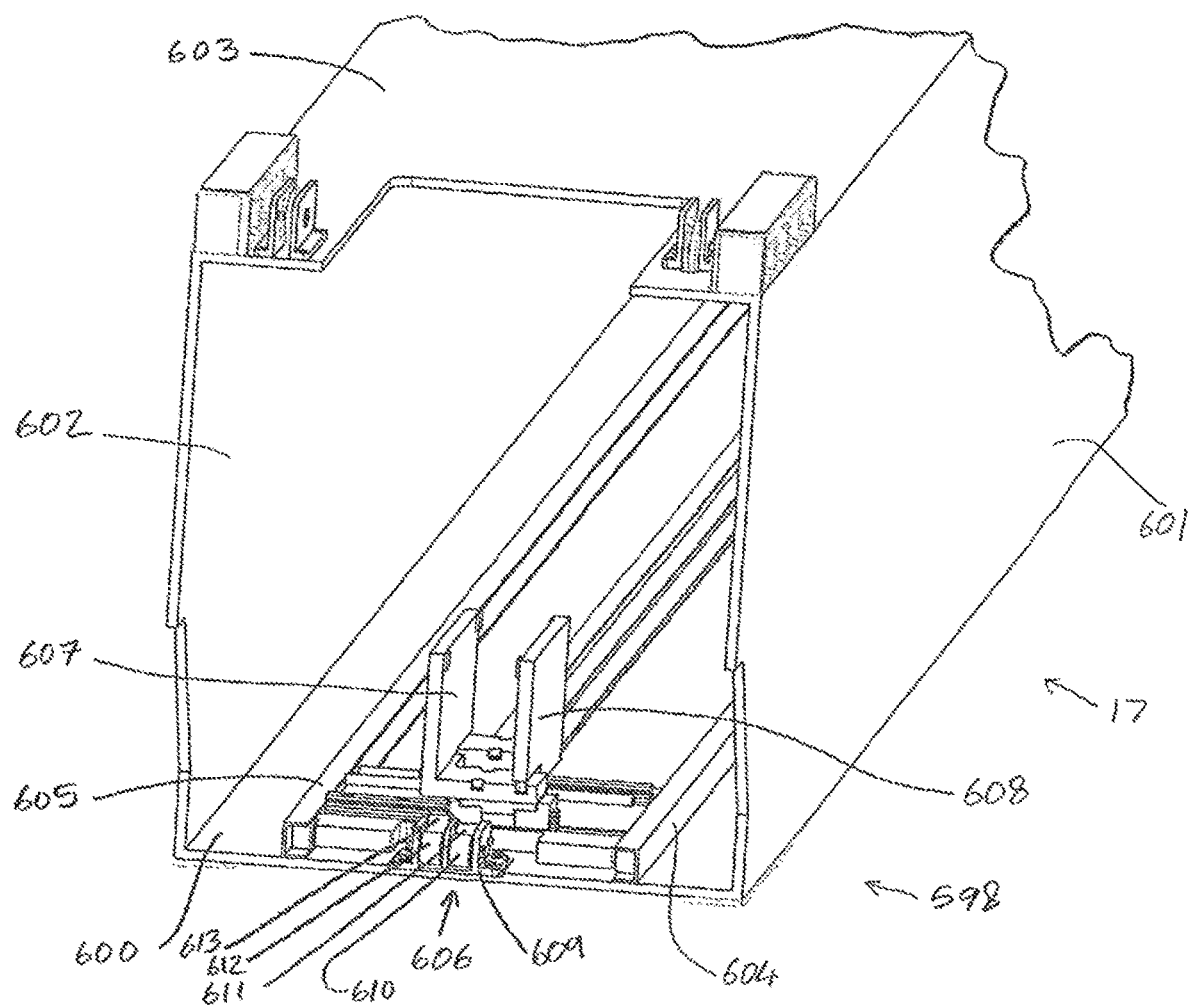
FIG. 26 shows a view of the first end 598 of the second stick 17.
Figure 27:
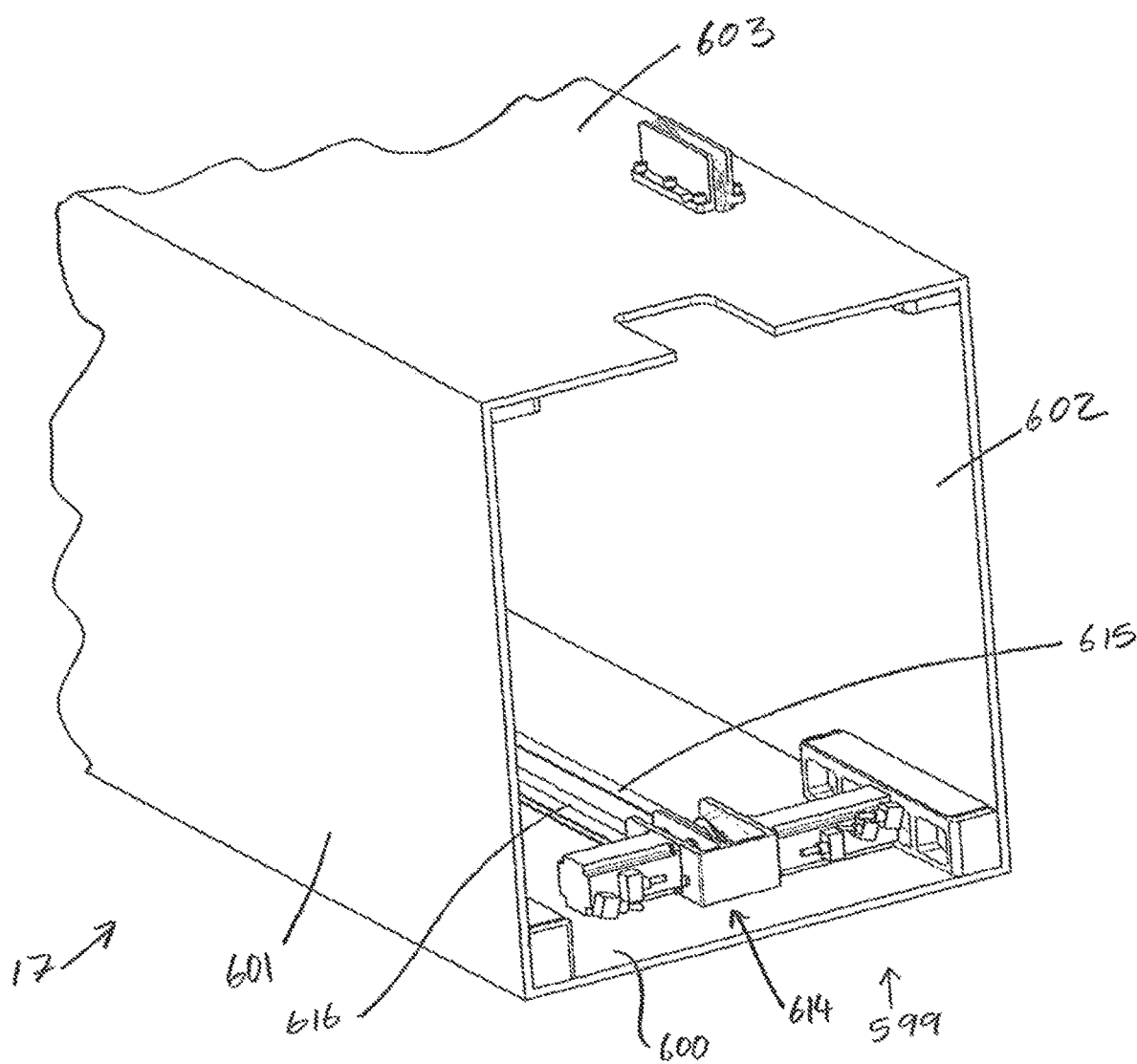
FIG. 27 shows a view of the second end 599 of the second stick 17.

Refer to FIGS. 25, 26, 27. Referring to FIG. 25, second stick 17 has a first near end 598 and a second distal end 599. Second stick 17 is hollow and internally supports a shuttle that moves bricks from the first near end 598 to or toward the second distal end 599.

Second stick 17 is preferably constructed from carbon fibre sandwich panels for low weight. Alternatively, second stick 17 way be welded with metal plates. Second stick 17 is of a substantially rectangular or box cross section. Second stick 17 is constructed by welding or bonding bottom plate 600 to side plates 601, 602. Side plates 601, 602 are welded or bonded to top plate 603. Bottom plate 600 supports a track formed by longitudinally extending channels 604, 605. Channels 604, 605 support shuttle-S2 606 for movement therealong. Shuttle-S2 606 has jaws 607 and 608 to grasp a brick. Referring to FIG. 26, bottom plate 600 supports bracket 609 which supports idler pulleys 610, 611, 612, 613. Referring to FIG. 27, bottom plate 600 supports drive assembly 614 located at the distal end 599 of second stick 17, which moves belts 615 and 616, in order to move shuttle-S2 606 (shown in FIG. 26) and open and close jaws 607, 608, in the same manner as that of the first boom 12 and its shuttle. Thus shuttle-S2 can grasp a brick located at the first near end 598 of second stick 17 and move the brick to or toward the second distal end 599 of second stick 17 and unclamp the brick. The second stick 17 has a void in the top plate 603 at the near end 598 (shown in FIG. 26), which is opposite the track formed by channels 604 and 605. This allows the shuttle-S1 573 of the first stick 15 to line up above the shuttle-S2 606 to enable the clamps thereof to transfer a brick from shuttle-S1 573 to shuttle-S2 606.

Third Stick

Figure 28:
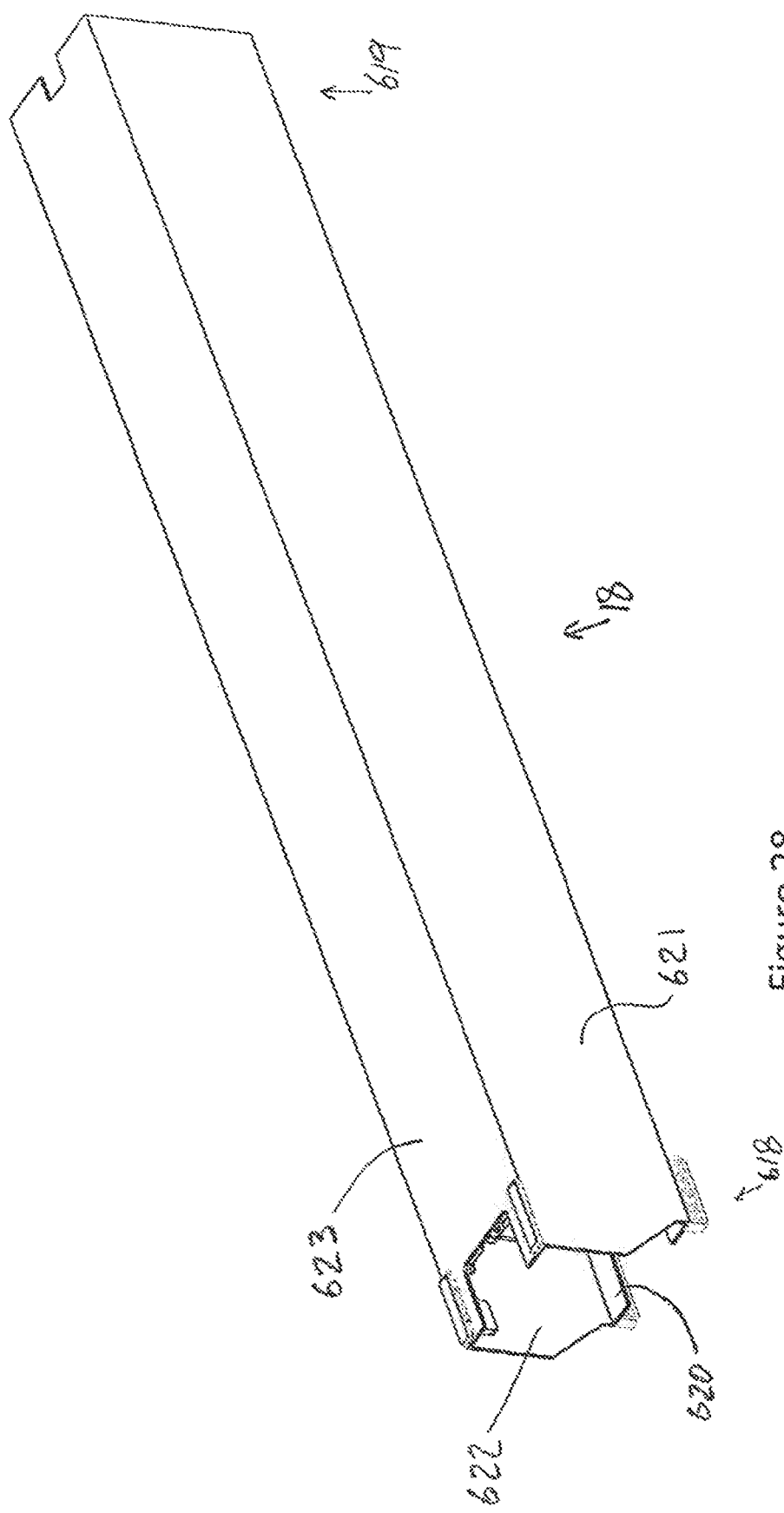
FIG. 28 shows a view of the third stick 18.
Figure 29:
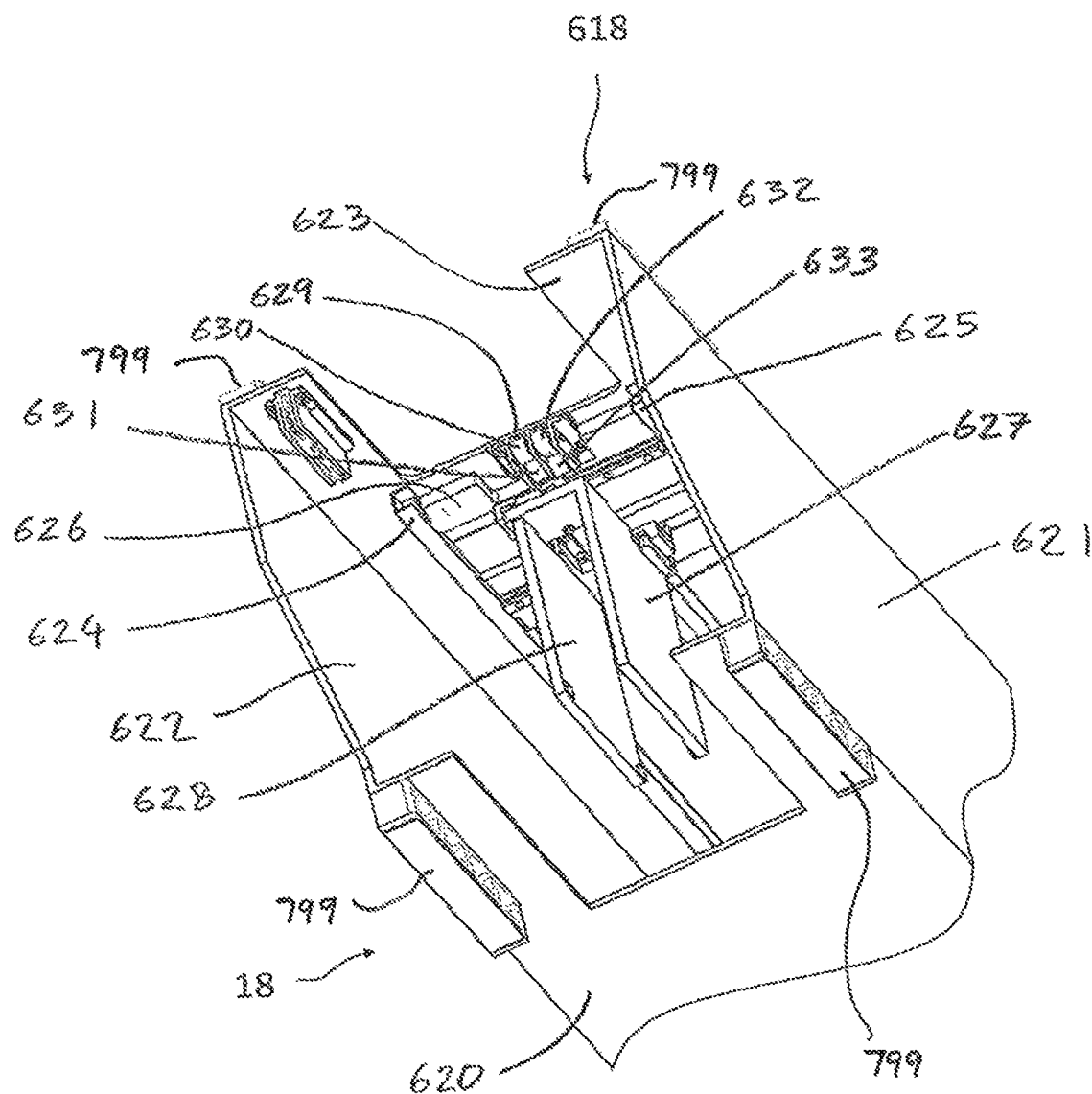
FIG. 29 shows a view of the first end 618 of the third stick 18.
Figure 30:
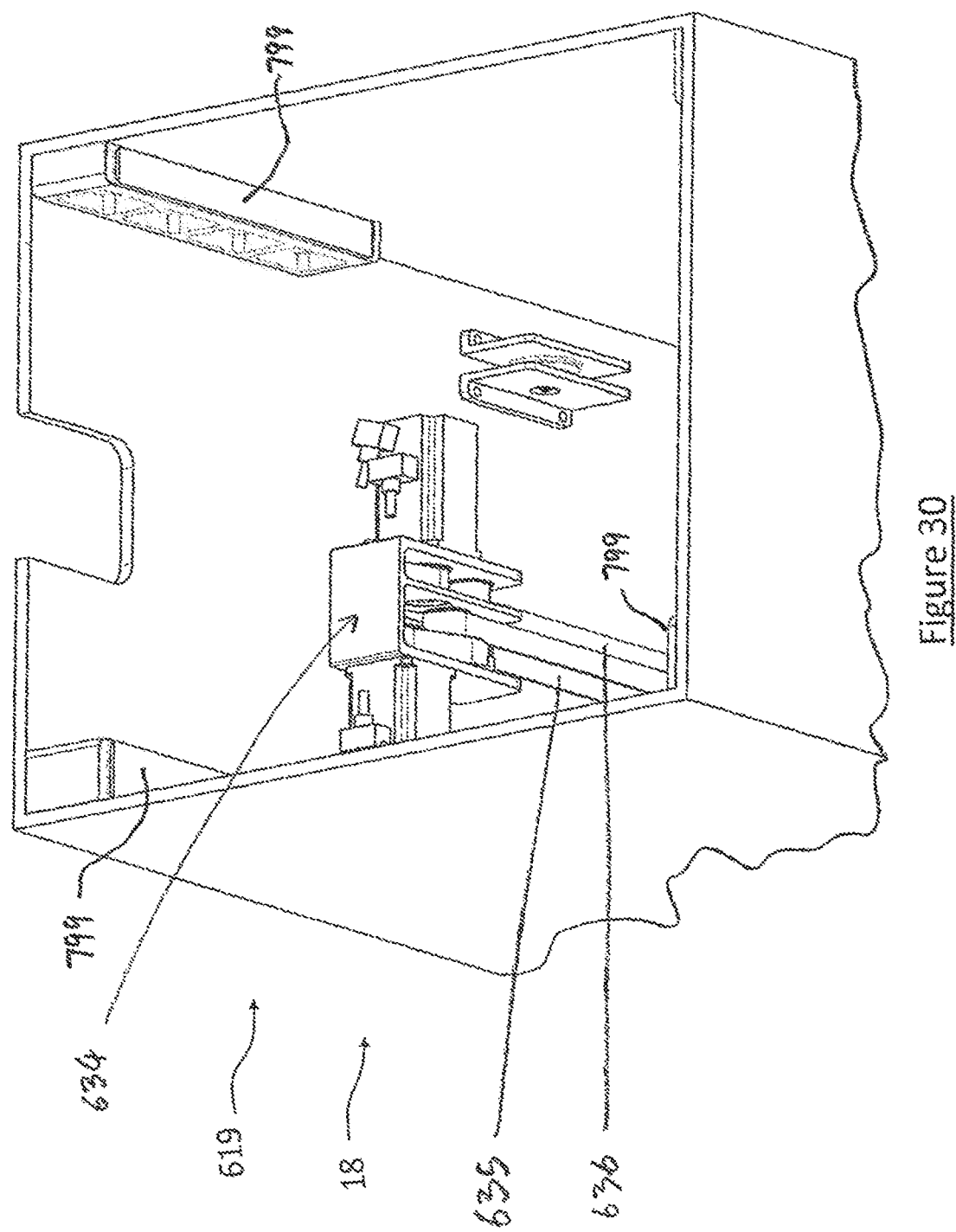
FIG. 30 shows a view of the second end 619 of the third stick 18.

Refer to FIGS. 28, 29 and 30. Referring to FIG. 28, third stick 18 has a first near end 618 and a second distal end 619. Third stick 18 is preferably constructed from carbon fibre sandwich panels for low weight. Alternatively, third stick 18 may be constructed with welded metal plates. Third stick 18 is of a substantially rectangular or box cross section. Third stick 18 is constructed by welding or bonding bottom plate 620 to side plates 621, 622. Side plates 621, 622 are welded or bonded to top plate 623. Referring to FIG. 29, top plate 623 supports a track formed by longitudinally extending channels 624 and 625 which extend from the first near end 618 to the drive assembly 634 located at the second distal end 619, shown on FIG. 30. Channels 624, 625 support shuttle-S3 626 for movement along third stick 18 from first near end 618 to or toward second distal end 619. Shuttle-S3 626 has jaws 627 and 628, to clamp a brick. Top plate 623 supports bracket 629. Bracket 629 supports idler pulleys 630, 631, 632, 633. Referring to FIG. 30, top plate 623 supports drive assembly 634 at the second distal end 619, which moves belts 635 and 636. Drive assembly 634 can move shuttle-S3 626 and open and close jaws 627, 628. Thus shuttle-S3 can grasp a brick located at the first end 618 of third stick 18 and move said brick to or toward the second end 619 of second stick 18 and unclamp the brick, in the same manner as that of the first boom 12 and its shuttle. The third stick 18 has a void in the bottom plate 620 at the near end 618, which is opposite the track formed by channels 624 and 625. This allows the shuttle-S2 606 of the second stick 17 to line up above the shuttle-S3 626 to enable the clamps thereof to transfer a brick from shuttle-S2 606 to shuttle-S3 626.

Fourth Stick

Figure 31:
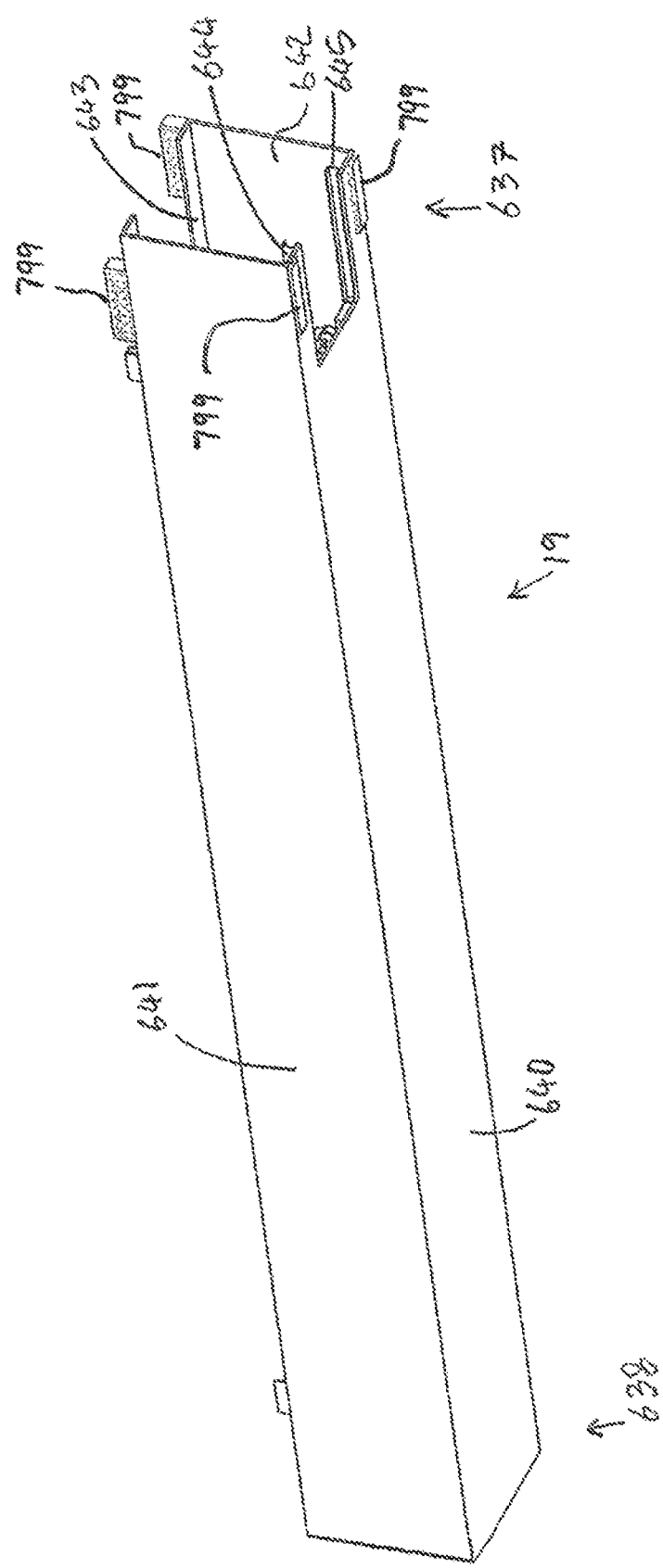
FIG. 31 shows a view of the fourth stick 19.
Figure 32:
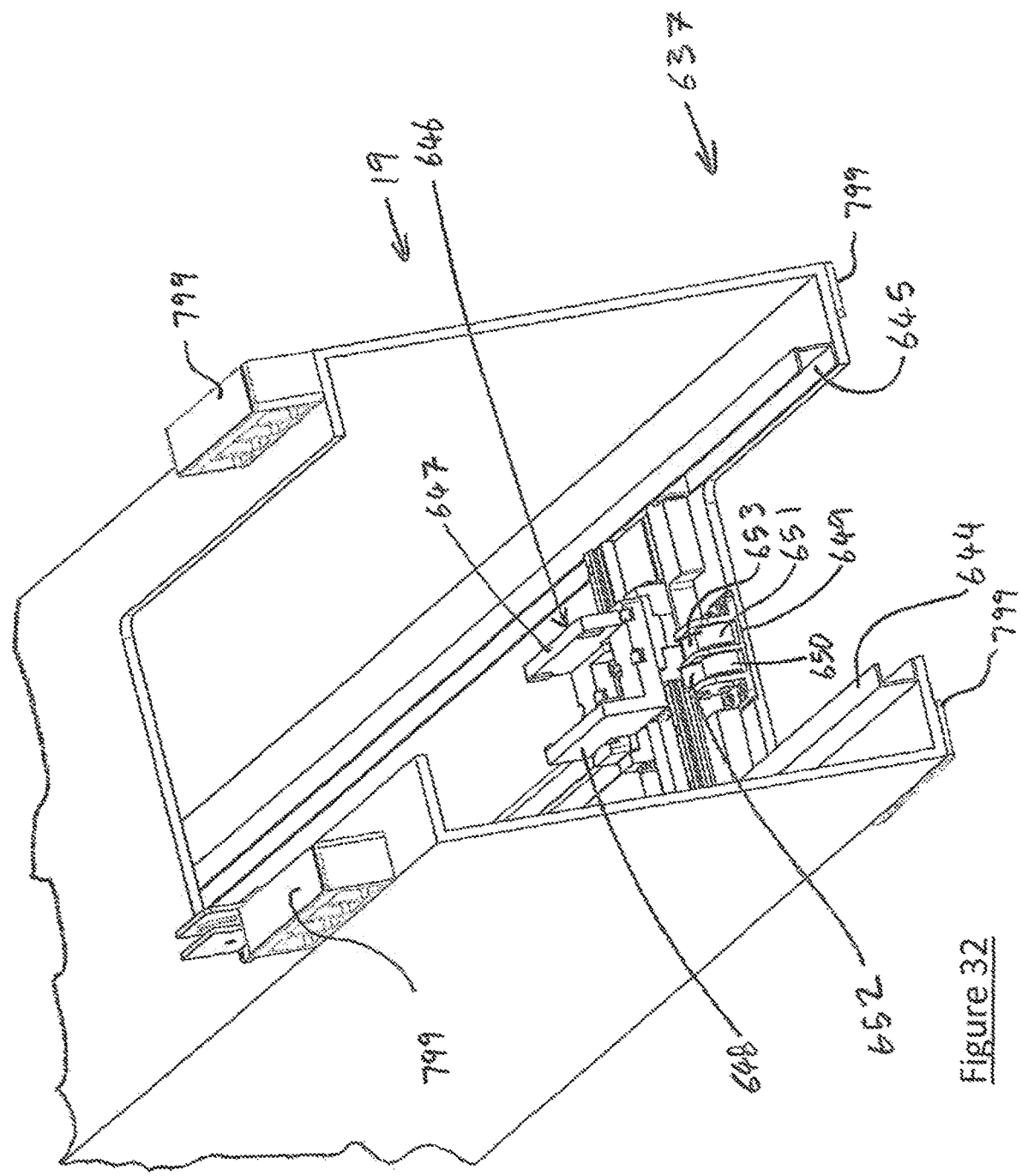
FIG. 32 shows a view of the first end 637 of the fourth stick 19.
Figure 33:
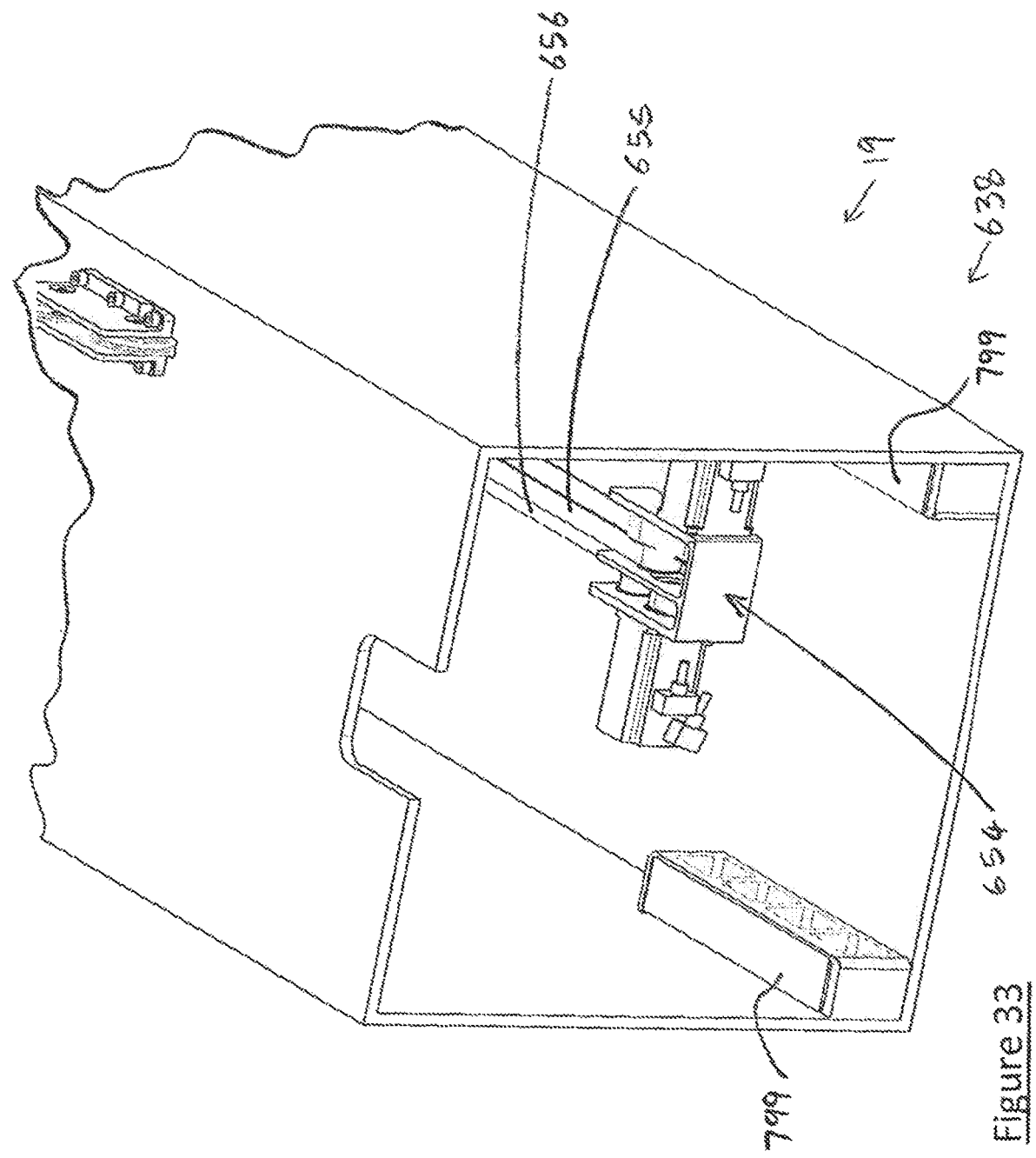
FIG. 33 shows a view of the second end 638 of the fourth stick 19.

Refer to FIGS. 31, 32, 33. Referring to FIG. 31, fourth stick 19 has a first near end 637 and a second distal end 638. Fourth stick 19 is preferably constructed from carbon fibre sandwich panels for low weight. Alternatively, fourth stick 19 may be constructed from welded metal plates. Fourth stick 19 is of a substantially rectangular or box cross section. Fourth stick 19 is constructed by welding or bonding bottom plate 640 to side plates 641, 642. Side plates 641, 642 are welded or bonded to top plate 643. Bottom plate 640 supports a track formed by longitudinally extending channels 644, 645. Channels 644, 645 extend from the near end 637 to drive assembly 654 located at the distal end, and support shuttle-S4 646 (shown on FIG. 32) for linear movement therealong. Referring to FIG. 32, shuttle-S4 646 has jaws 647 and 648 to grasp a brick. Bottom plate 640 supports bracket 649 at the near end 637 which 649 supports idler pulleys 650, 651, 652, 653. Referring to FIG. 33, bottom plate 640 supports drive assembly 654 at the distal end 638, inside fourth the stick 19. Drive assembly 654 moves belts 655 and 656 in order to move shuttle-S4 646 along fourth stick and open and close jaws 647, 648, in the same manner as that of the first boom 12 and its shuttle. Thus shuttle-S4 646 can grasp a brick located at the first end 637 of fourth stick 19 and move it to or toward the second end 638 of fourth stick 19 and unclamp the brick. Referring to FIG. 32, the fourth stick 19 has a void in the top plate 643 at the near end 637, which is opposite the track formed by channels 644 and 645. This allows the shuttle-S3 626 of the third stick 18 to line up above the shuttle-S4 646 to enable the clamps thereof to transfer a brick from shuttle-S3 626 to shuttle-S4 646.

Fifth Stick

Figure 34:
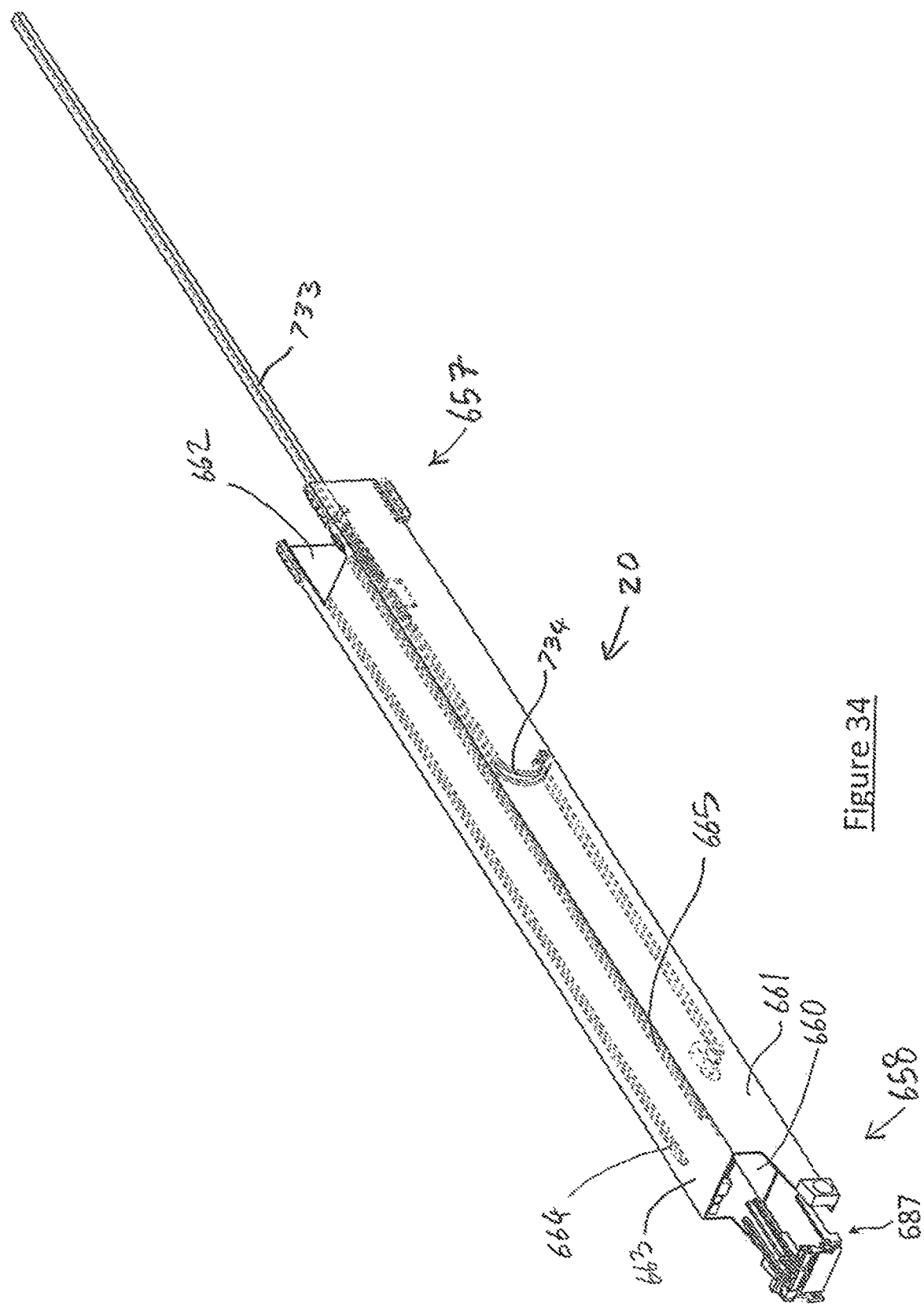
FIG. 34 shows a view of the fifth stick 20.
Figure 35:
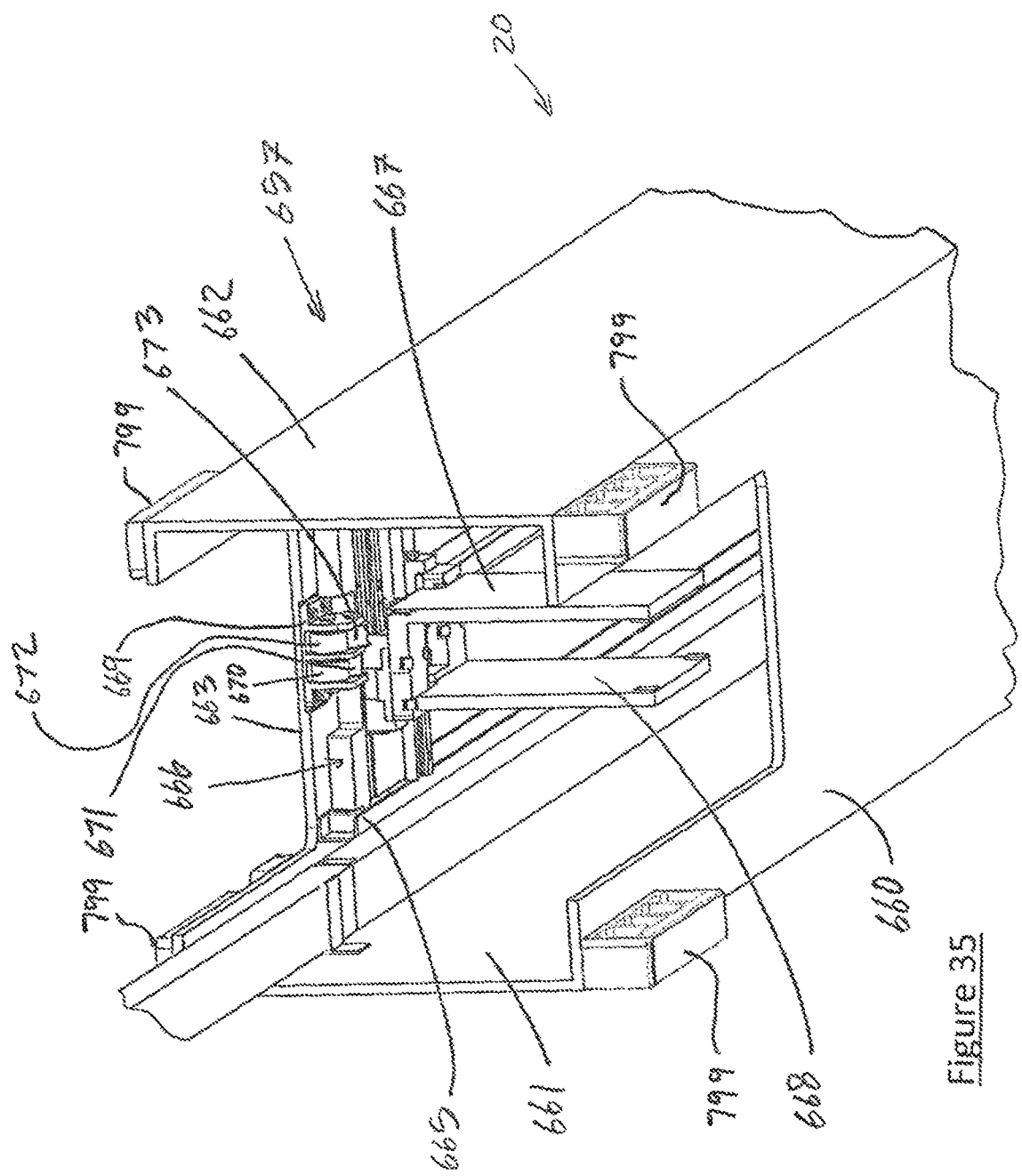
FIG. 35 shows a view of the first end 657 of the fifth stick 20.
Figure 36:
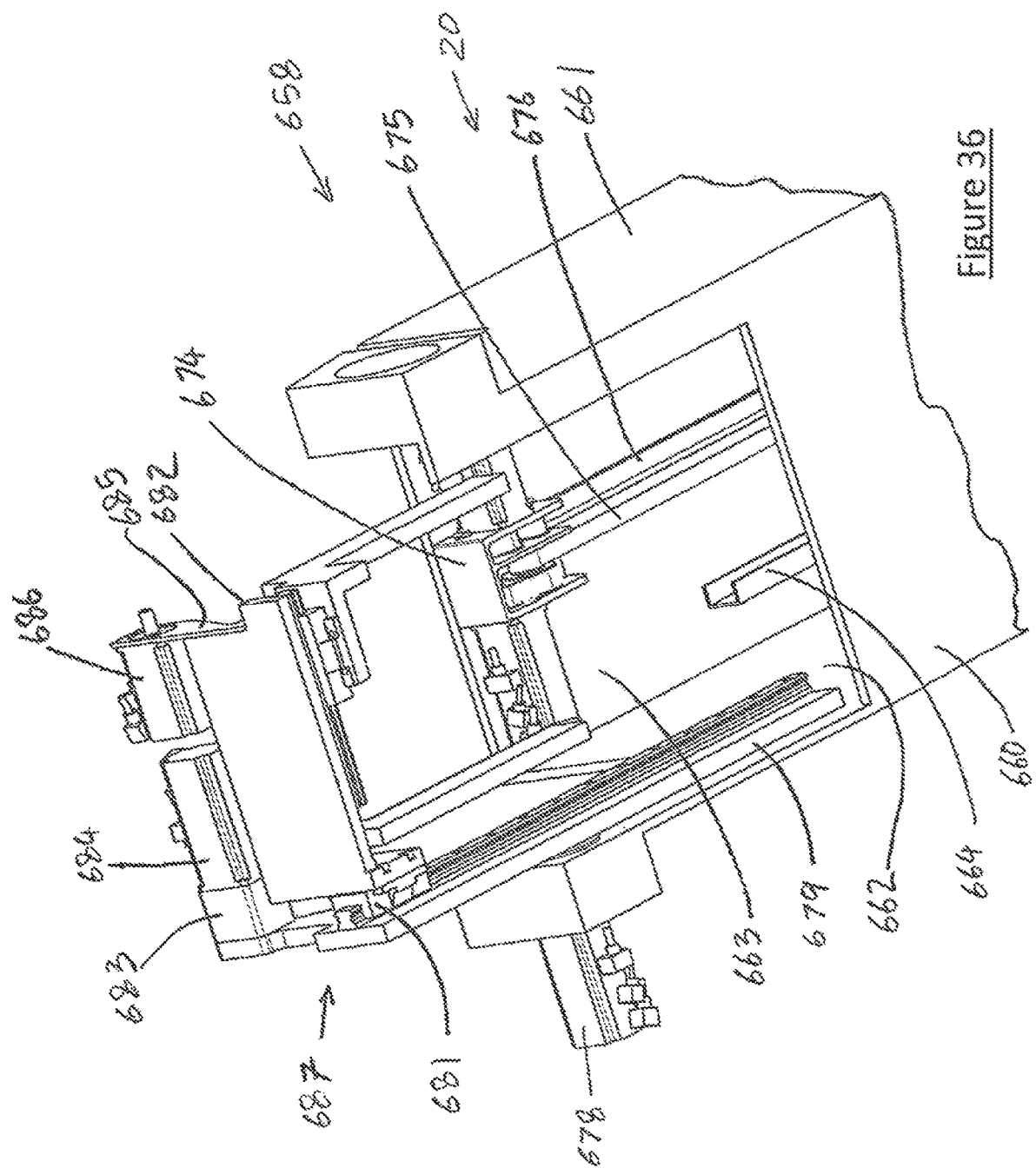
FIG. 36 shows a view of the second end 658 of the fifth stick 20.

Refer to FIGS. 34, 35, 36 and 37. Referring to FIG. 34, fifth stick 20 has a first near end 657 and a second distal end 658. Fifth stick 20 is preferably constructed from carbon fibre sandwich panels for low weight. Alternatively, fifth stick 20 may be constructed from welded metal plates. Fifth stick 20 is of a substantially rectangular or box cross section. Fifth stick 20 is constructed by welding or bonding bottom plate 660 to side plates 661, 662. Side plates 661, 662 are welded or bonded to top plate 663. Top plate 663 supports a track formed by longitudinally extending channels 664, 665, which extend from the near end 657 to the drive assembly 663, along the inside of the fifth stick 20. Referring to FIG. 35, channels 664, 665 support shuttle-S5 666 for linear movement therealong. Shuttle-S5 666 has jaws 667, 668 provided to grip a brick. Top plate 663 supports bracket 669 at the near end 657 which supports idler pulleys 670, 671, 672, 673. Referring to FIG. 36, top plate 663 supports drive assembly 674 at the distal end 658. Drive assembly 674 moves belts 675 and 676 in order to move shuttle-S5 666 and open and close jaws 667, 668 (shown in FIG. 35). Drive assembly 674 moves belts 675 and 676 in order to move shuttle-S5 666 along fifth stick and open and close jaws 647, 648, in the same manner as that of the first boom 12 and its shuttle. Shuttle-S5 666 can grasp a brick presented by shuttle-S4 646 located through a void located at the near end 657 of the bottom plate 660. Shuttle-S5 666 then moves the brick along the inside of fifth stick 20 to the second distal end 658 of fifth stick 20, where it will be unclamped.

The panels or plates making up each of the first stick 15, second stick 17, third stick 18, fourth stick 19 and fifth stick 20 may be provided with removable panel portions (not shown) to provide access for servicing of internal componentry within each stick.

Boom Cable Chains

Cable chains are used to route power and signals to and from the servo motors. The arrangement of the cable chains provides a compact over all cross section of the folding boom.

Figure 43:
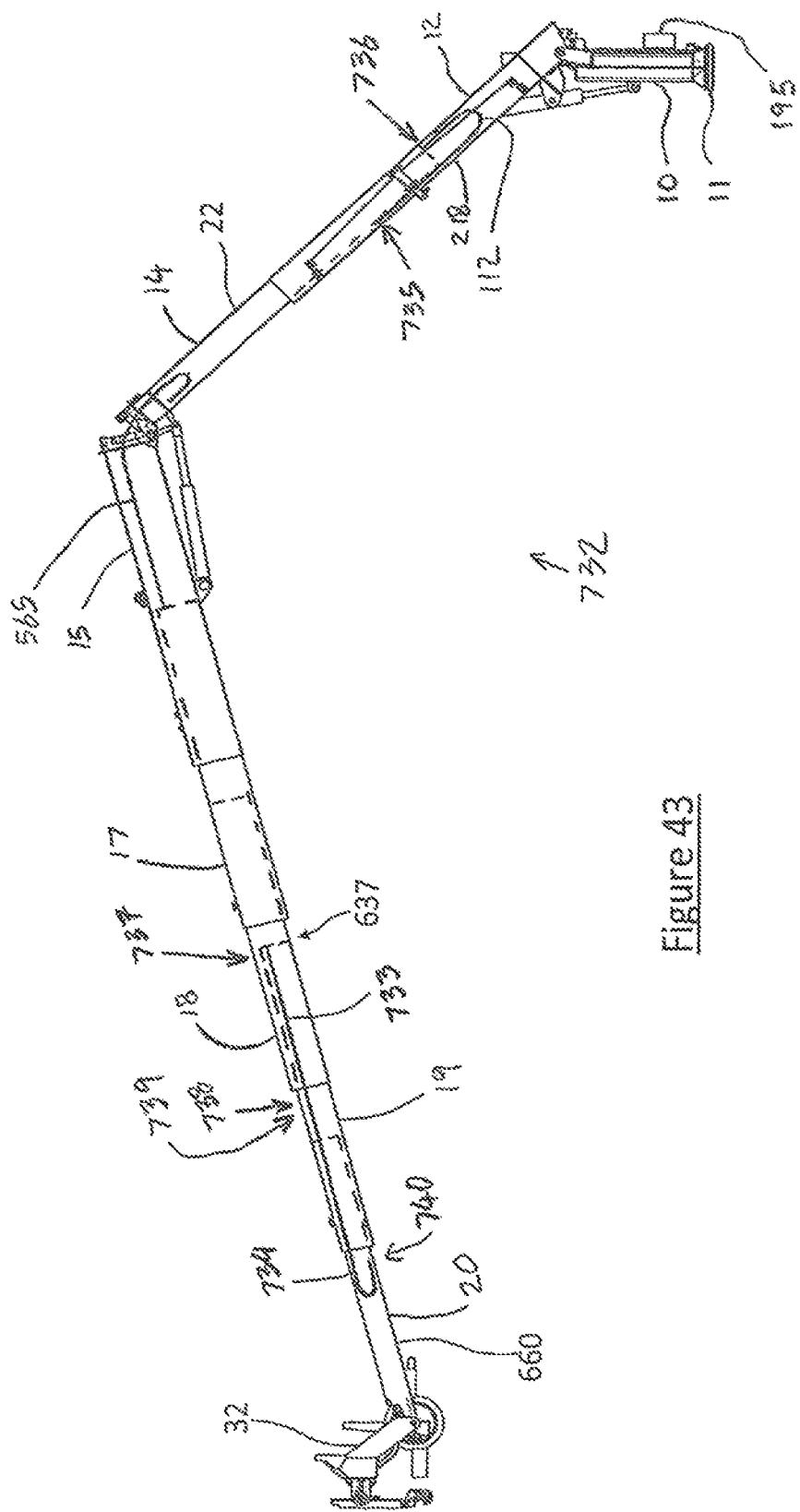
FIG. 43 shows a side view of the boom assembly 732 showing internal cable chains.

Referring to FIG. 43, bottom plate 218 of first boom 12, supports a first end 735 of cable chain 112. Cable chain 112 is also visible in FIGS. 11, 18, 19. The top plate 22 of second boom 14, supports a second end 736 of cable chain 112.

First near end 637 of fourth stick 19 supports a first end 737 of cable duct 733. Second end 738 of cable duct 733 supports a first end 739 of cable chain 734. The bottom plate 660 of fifth stick 20, supports the second end 740 of cable chain 734. Cable chain 734 and cable duct 733 are also visible in FIG. 34.

Figure 44:
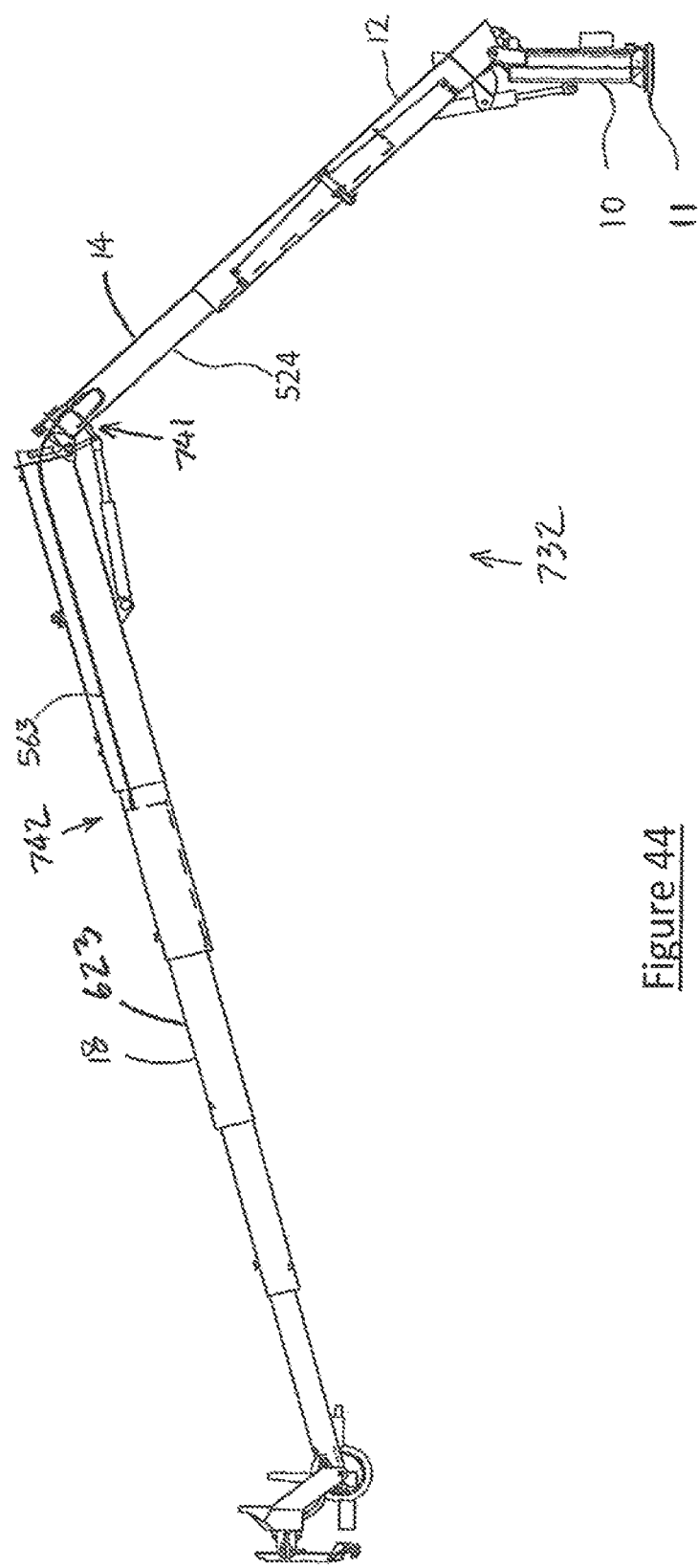
FIG. 44 shows a side view of the boom assembly boom 732 showing internal cable chains.

Referring to FIG. 44, the bottom plate 524 of second boom 14, supports a first end 741 of cable chain 563. The top plate 623 of third stick 18 supports a second end 742 of cable chain 563. Cable chain 563 is also visible in FIGS. 17, 18, 19, 20.

Figure 45:
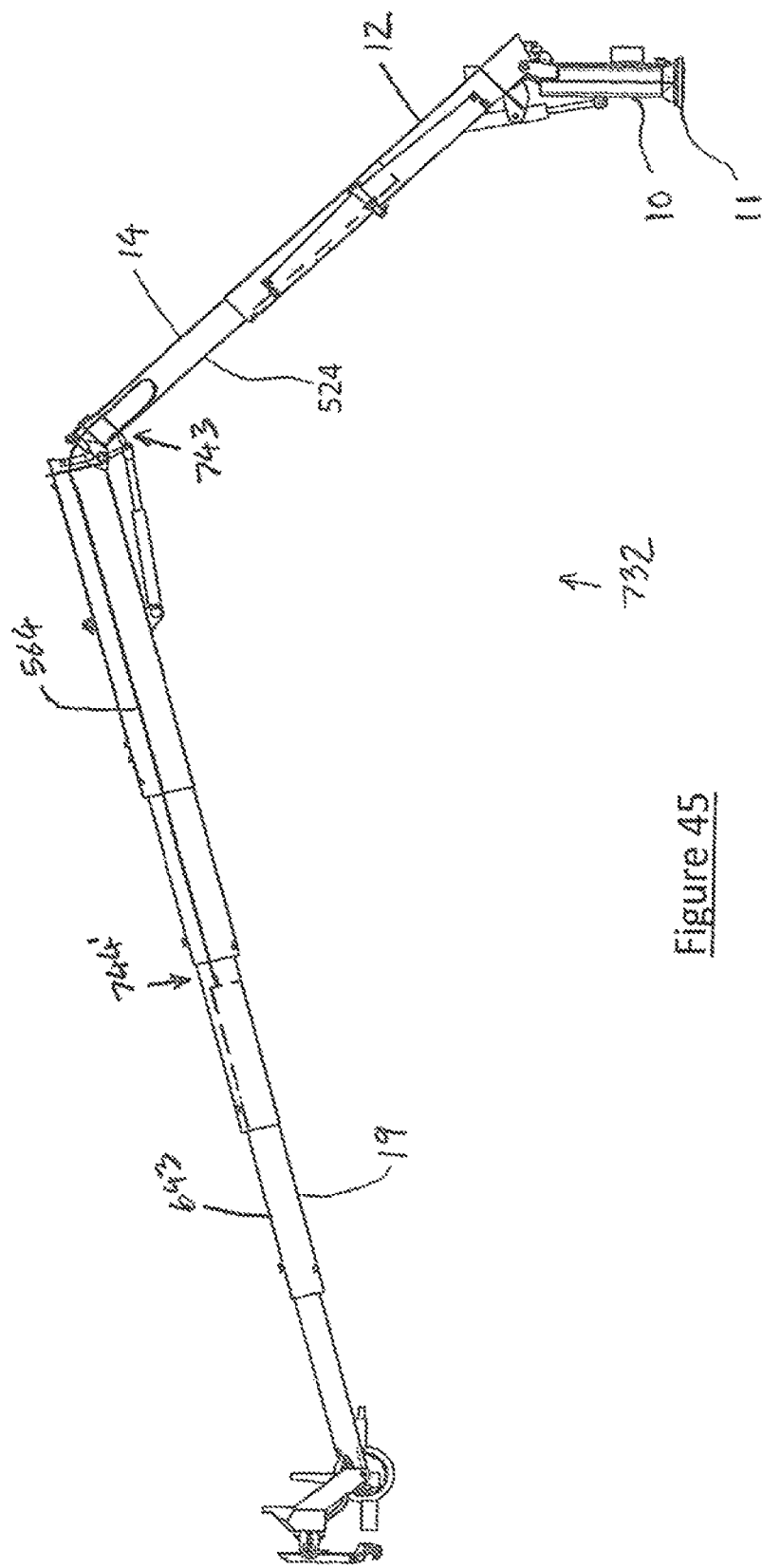
FIG. 45 shows a side view of the boom assembly 732 showing internal cable chains.

Referring to FIG. 45, the bottom plate 524 of second boom 14 supports a first end 743 of cable chain 564. The top plate 643 of fourth stick 19 supports a second end 744' of cable chain 564. Cable chain 564 is also visible in FIGS. 17, 18, 19, 20.

Referring to FIG. 1, cables (not shown) are routed from an electrical cabinet through the frame 3, through the centre of slew ring 11, up through the inside of tower 10 and into first boom 12, then into cable chain 112 (shown in FIG. 43), then into second boom 14. Referring to FIG. 43, cables (not shown) are routed from second boom 14, to first stick 15, and to cable chain 565 and then into second stick 17, and as shown in FIG. 44 also into cable chain 563 and then into third stick 18, and as shown in FIG. 45 also into cable chain 564 and then into fourth stick 19.

Referring to FIG. 43, (cables not shown) are routed from fourth stick 19, through cable duct 733 into cable chain 734 then into fifth stick 20. From fifth stick 20, cables not shown are routed to the brick laying and adhesive applying head 32.

Flipper

Figure 37:
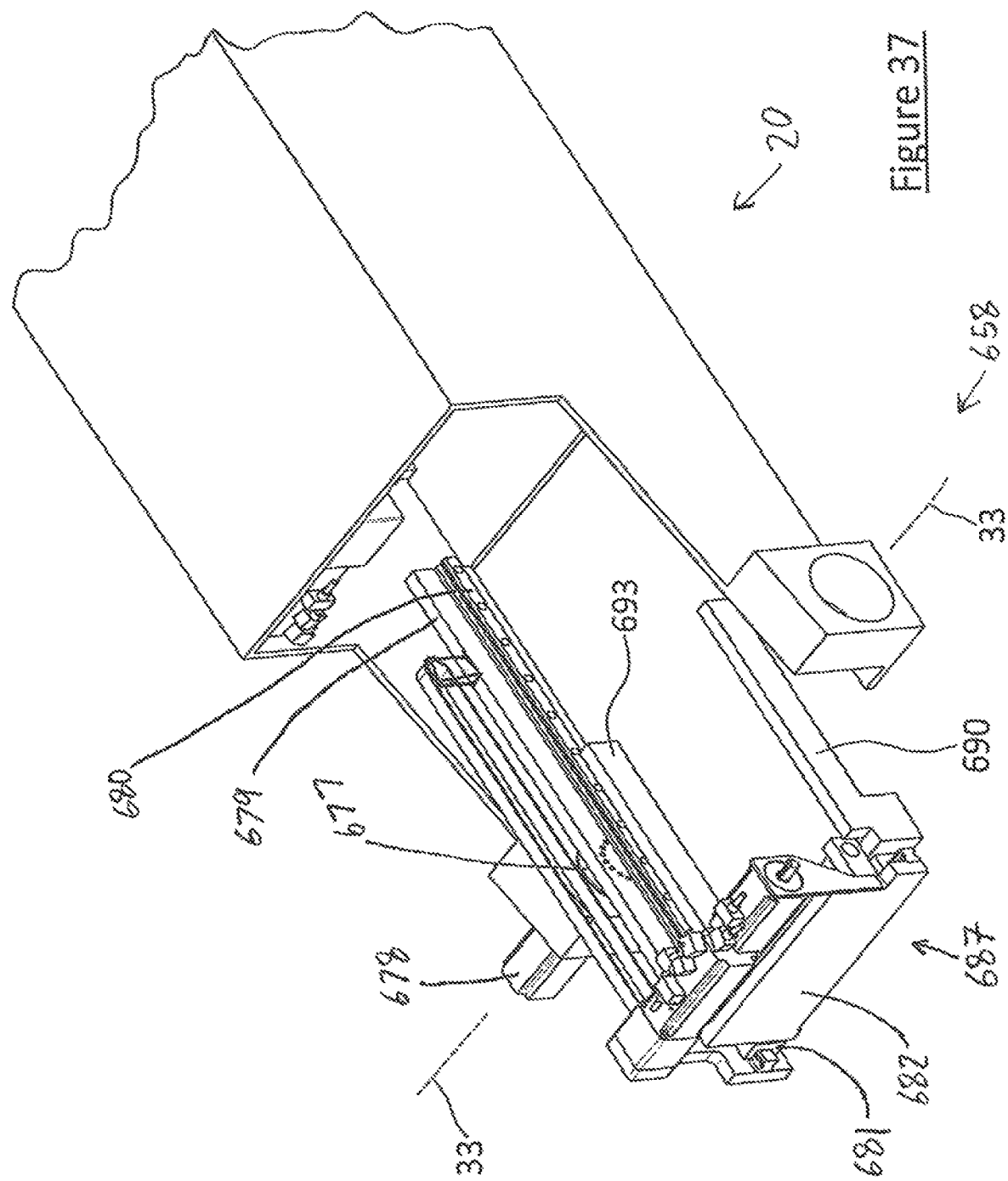
FIG. 37 shows a view of the second end 658 of the fifth stick 20.
Figure 38:
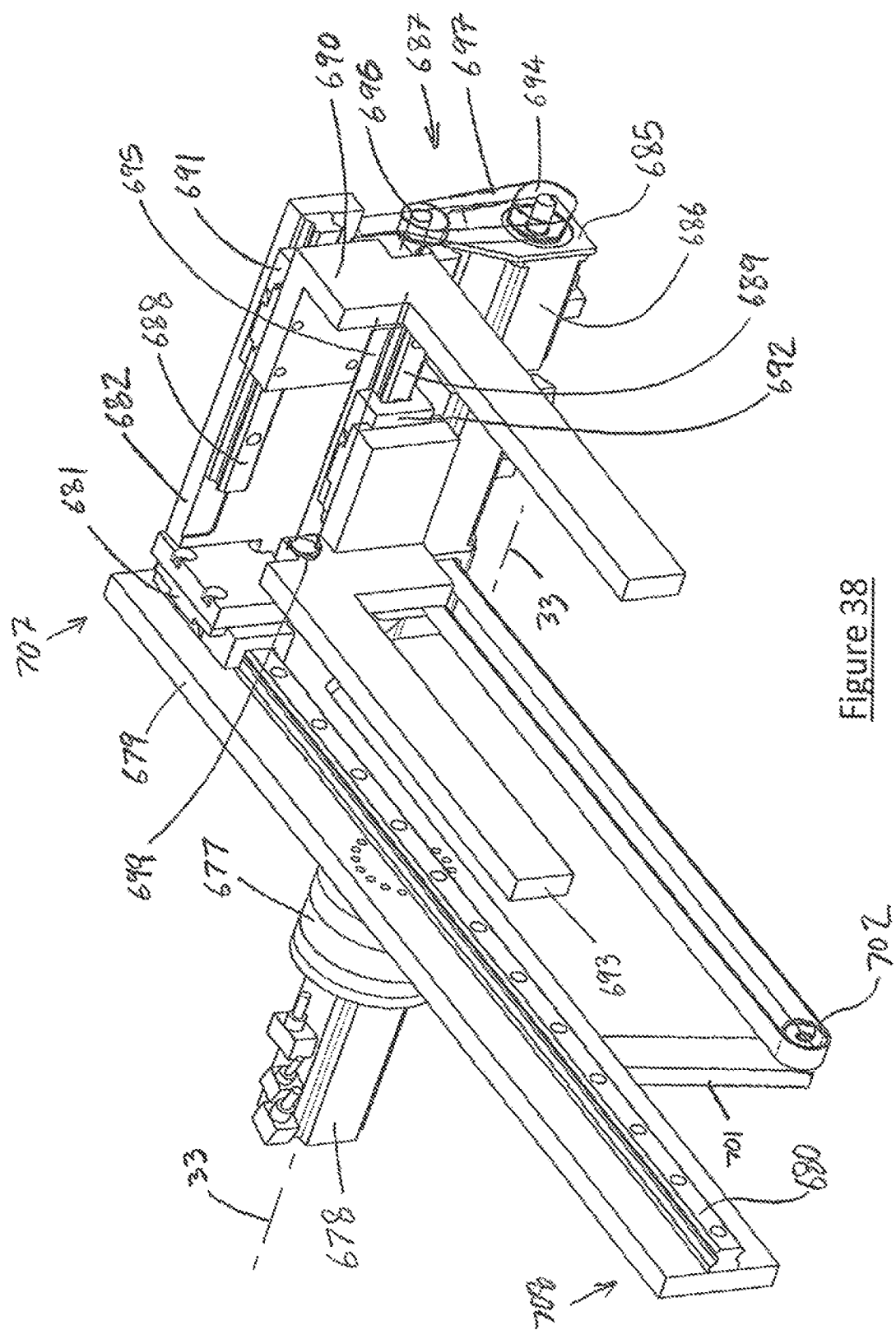
FIG. 38 shows a view of the flipper assembly 687.
Figure 39:
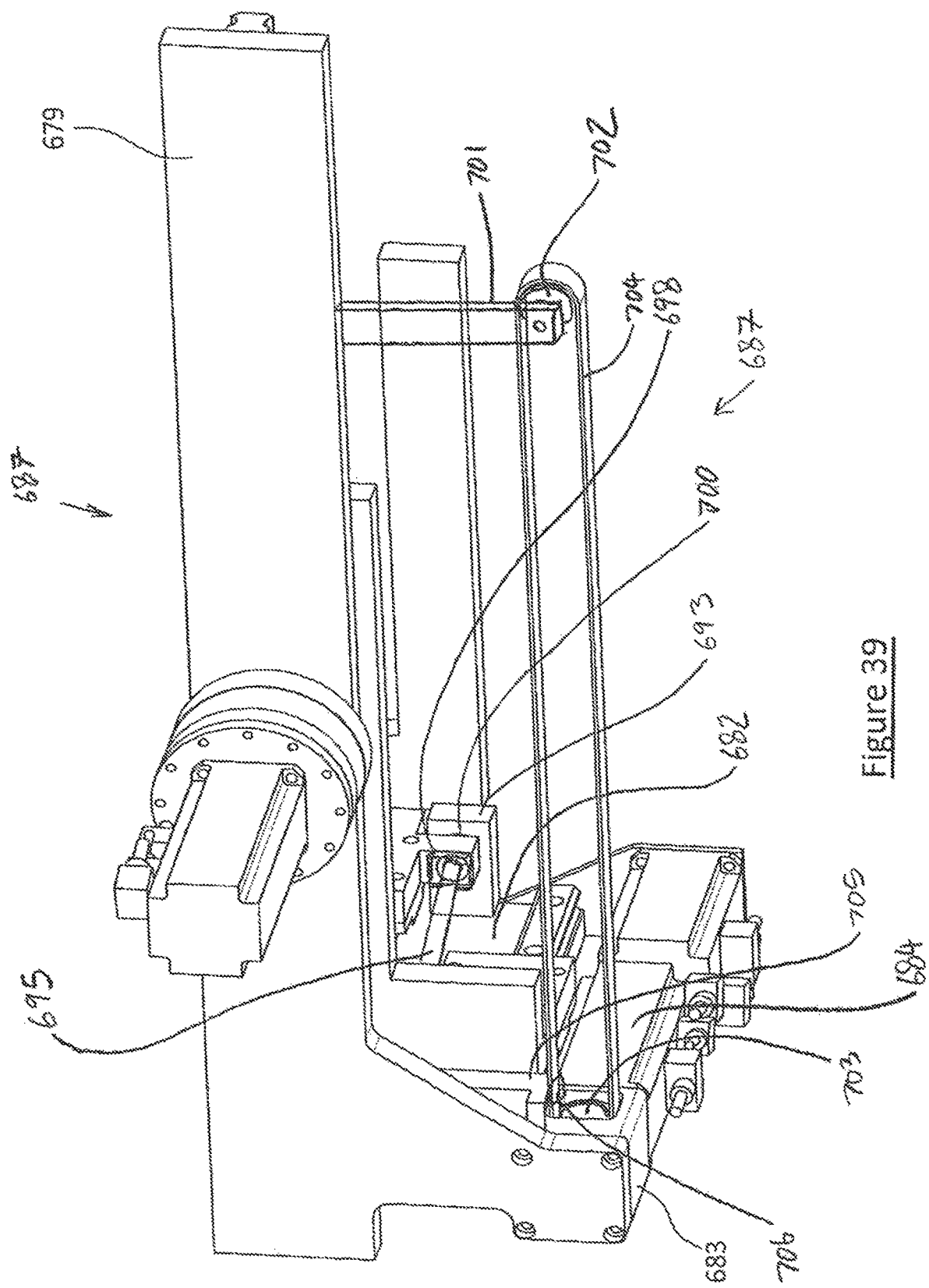
FIG. 39 shows a view of the flipper assembly 687.

Refer to FIGS. 37, 38, 39. Referring to FIG. 37, a pivotable clamp in the form of a flipper assembly 687 has jaws 690 and 693 to grip a brick and can then translate and rotate the brick to move it past an adhesive application nozzle 121, 122, 123, 124 and 125 and then present the brick for transfer to the laying arm. The flipper assembly 687 is located at the distal end 658 of the fifth stick 20.

FIGS. 58A to 58H, 58J to 58N, 58P, and 58Q show a sequence for a brick as it passes from the fifth stick to its laid position.

Figure 58A:
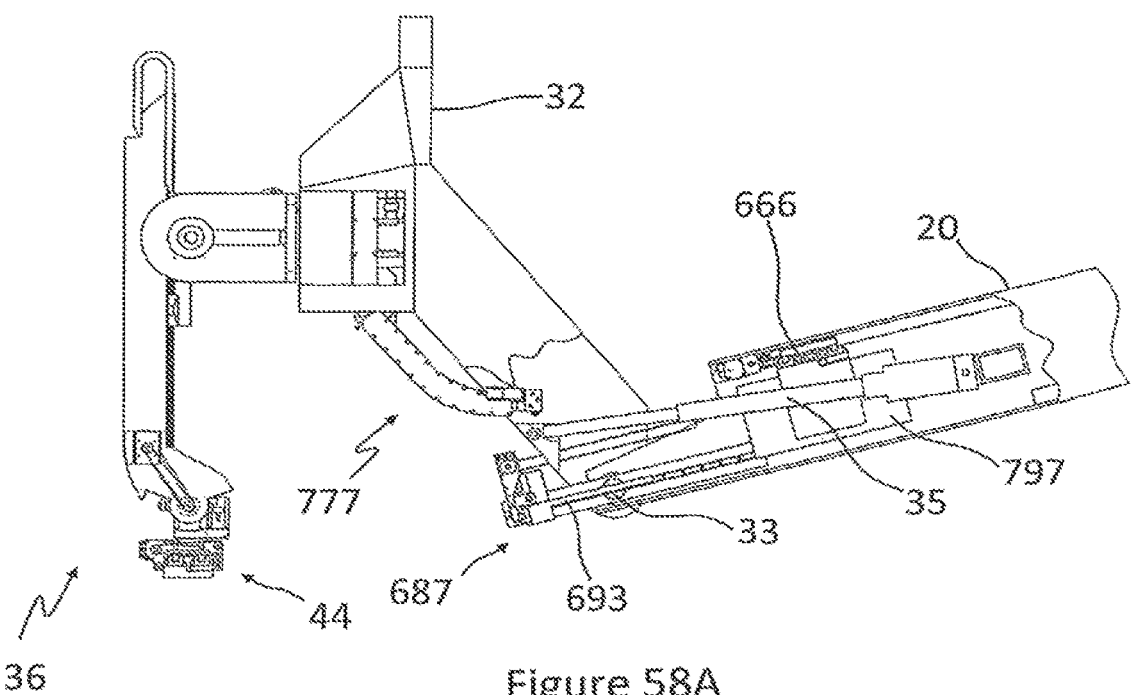
FIGS. 58A-58H, 58J-58N, 58P, and 58Q show a sequence of a brick being transferred from the fifth stick 20, to the S5-H flipper 687, having adhesive applied to the brick, then the brick being transferred to the laying gripper 44 and being laid.
Figure 58B:
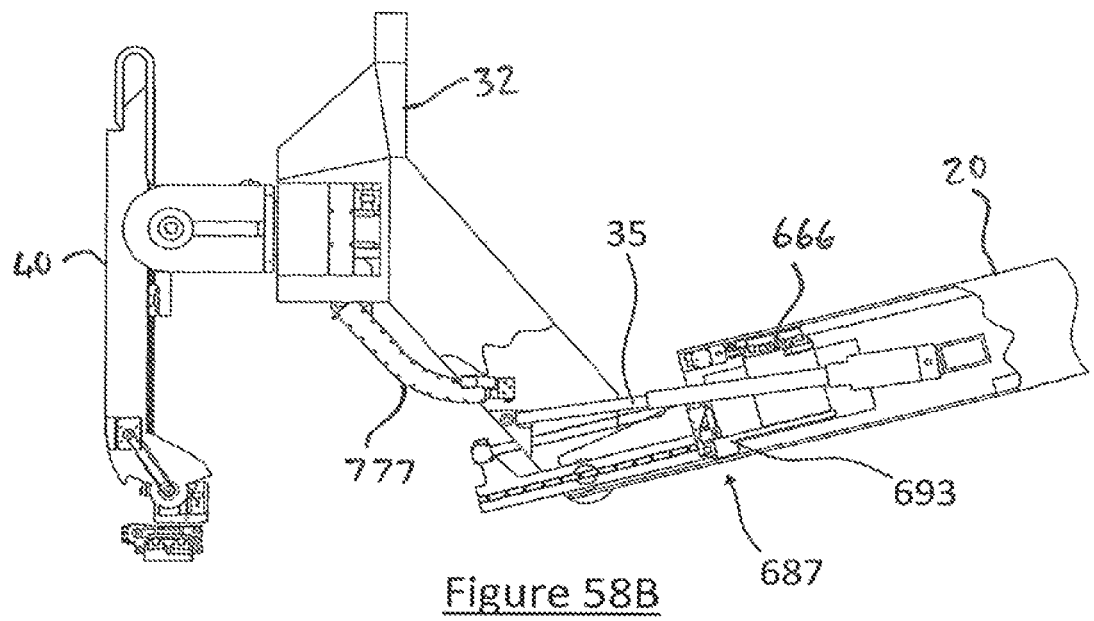
Figure 58C:
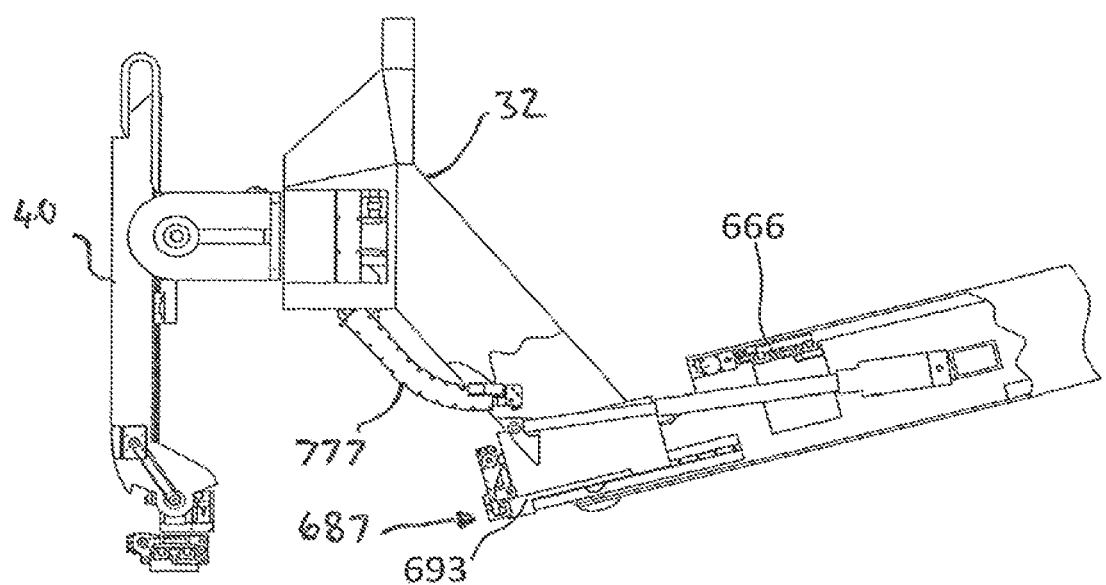
Figure 58D:
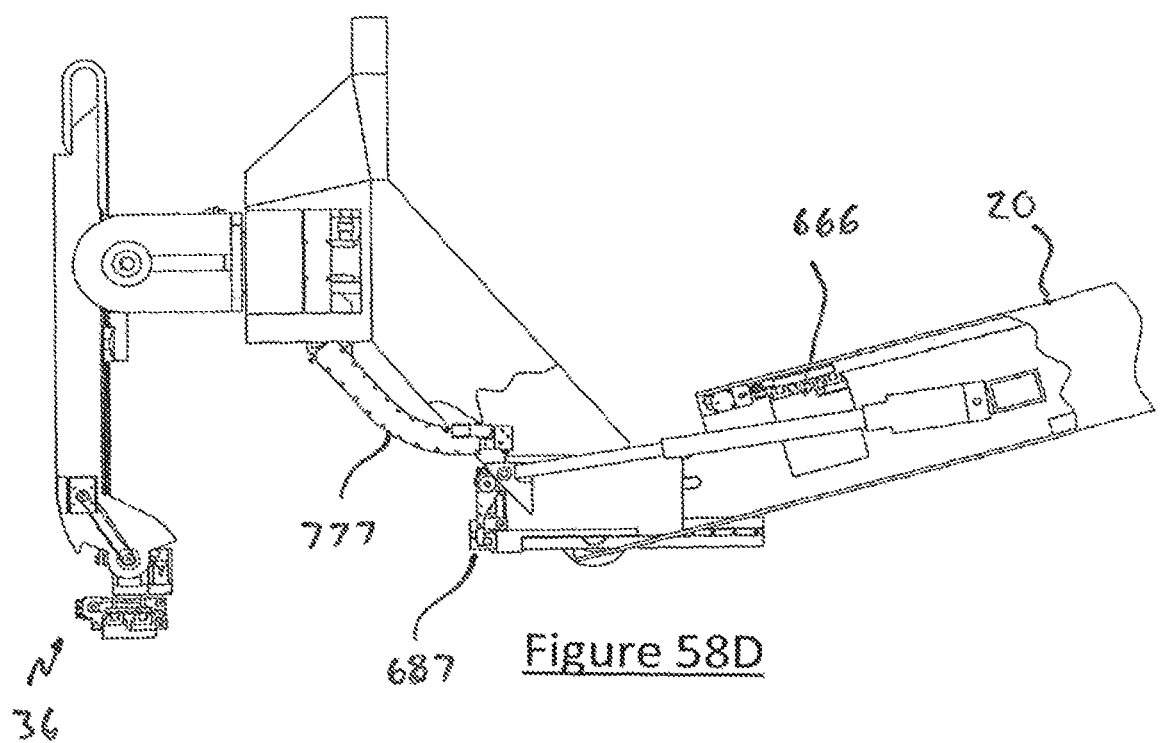
Figure 58E:
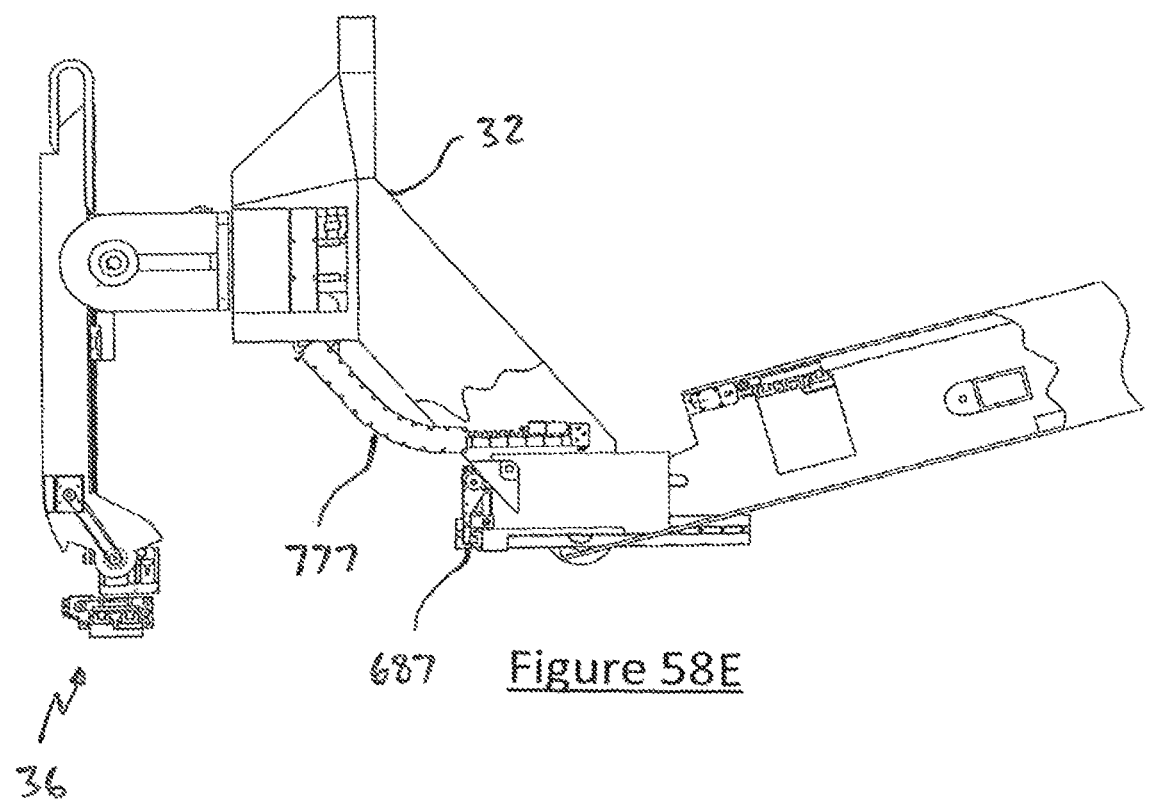
Figure 58F:
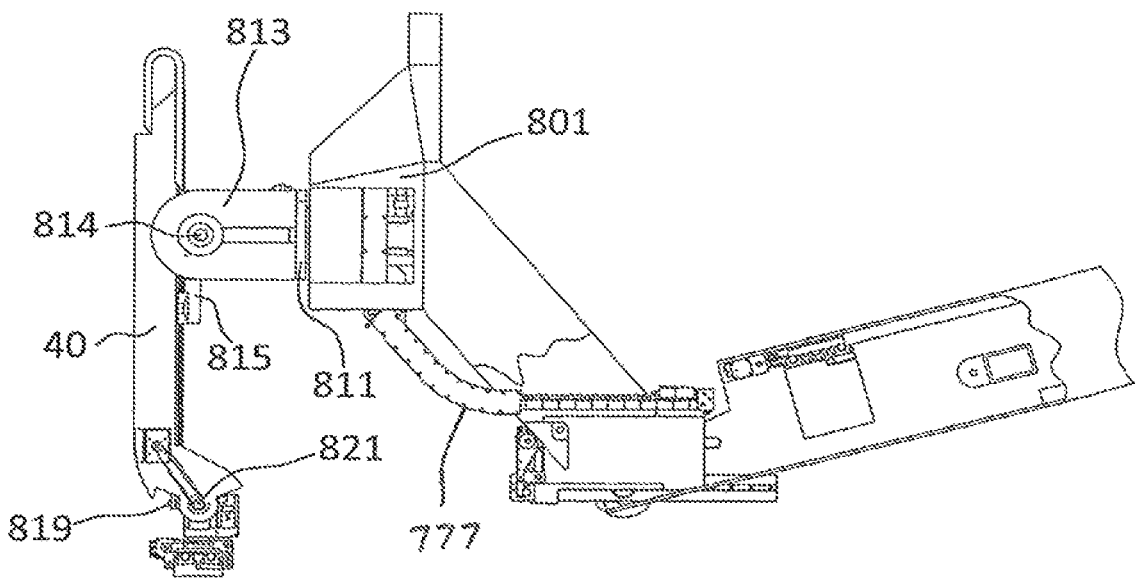
Figure 58G:
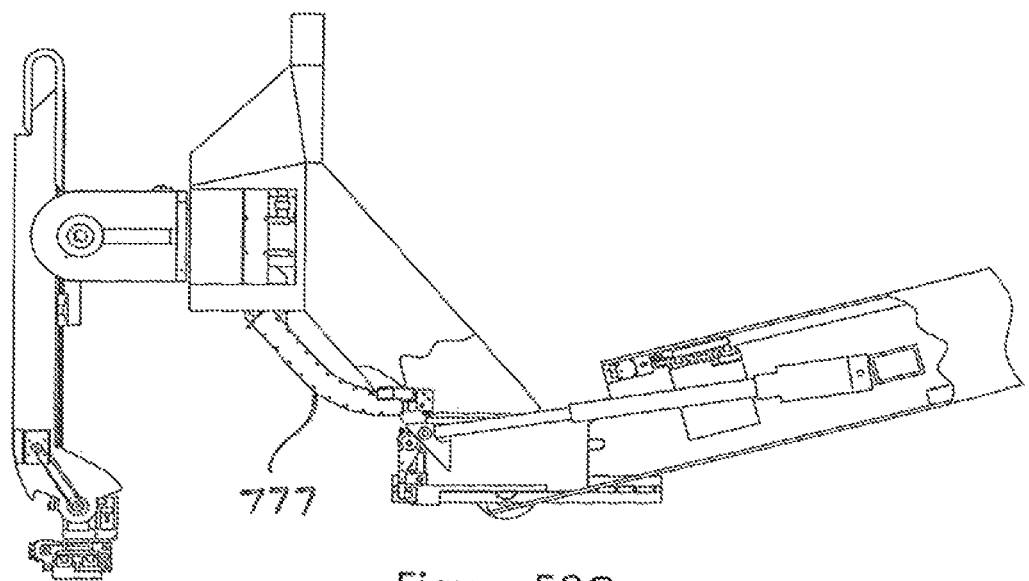

During the laying of bricks, the brick laying and adhesive applying head 32 is held at a constant tilt relative to the ground. The pose of the foldable boom is varied to position the brick laying and adhesive applying head 32 appropriately for the brick laying and adhesive applying head 32 to lay bricks in the required position. The angle of the stick assembly, varies according to the required pose of the foldable boom. The flipper assembly 687 is used to receive a brick from the stick assembly (FIG. 58A) and move the brick to a position suitable for an adhesive applicator 777 in the brick laying and adhesive applying head 32 to apply glue to said brick (FIGS. 58D-58G), and then for the brick laying gripper 44 to lay the brick (FIG. 58Q). Referring to FIG. 38, the flipper assembly 687 rotates about axis 33. The flipper assembly 687 has a gripper with jaws 690 and 693 that can slide toward or away from the axis of rotation 33 (which is the same horizontal axis of the mount of the brick laying and adhesive applying head 32 to the end of fifth stick 20). The gripper can extend into the fifth stick 20 to grasp a brick (FIG. 58B). The gripper then retracts to a position near the axis of rotation 33 (FIG. 58C) so that the brick is clear of the fifth stick 20. The brick is then rotated for the application of adhesive (FIG. 58D). The adhesive application nozzles are extended out over the brick (FIGS. 58E, 58F). The adhesive nozzles direct adhesive downwards so that gravity assists in applying the adhesive to the brick. The adhesive application nozzles are retracted whilst directing adhesive onto the brick (FIG. 58G). The flipper 687 then rotates (FIG. 58H) to orient the brick vertically (FIG. 58J), so that adhesive application nozzles can apply adhesive to the end of the brick. The flipper then rotates (FIG. 58K) to invert the brick (FIG. 58L) so that the adhesive is on the bottom of the brick. The flipper 687 then extends the gripper out (FIG. 58M), to present the brick in a position where the brick laying gripper 44 can then grasp the brick (FIG. 58N). The flipper gripper then releases the brick and the flipper gripper then translates in a reverse direction whilst the flipper rotates in a reverse rotation (FIG. 58P, 58Q) so that the gripper is returned to its starting position (FIG. 58A).

A detailed description of the flipper assembly follows.

Refer to FIG. 37. Fifth stick 20 supports the flipper assembly 687 about the same horizontal axis 33 as the brick laying and adhesive applying head 32 is attached to the distal end of the fifth stick 20 (see FIG. 58A).

Refer to FIGS. 36, 37, 38 and 39. Referring to FIG. 37 the fifth stick 20 supports a bearing reducer 677 and a servo motor 678. Bearing reducer 677 supports an arm 679 of the flipper assembly 687 on its output, and a servo motor 678 rotates the input of bearing reducer 677. This rotates arm 679 and hence the flipper assembly 687 about axis 33. Referring to FIG. 38, the arm 679 supports a linear guide 680 which slideably supports a bearing car 681 for movement between a first end 707 and a second end 708 of the arm 679. A base plate 682 mounts to the bearing car 681, perpendicularly to the travel extent thereof. Referring to FIG. 39, a servo motor 684 for movement of the base plate 682 is mounted via a spacer 683 to the arm 679. Referring to FIG. 38, a servo motor 686 for movement of jaws 690 and 693 is mounted on motor mount plate 685 which is supported on base plate 682. Base plate 682 supports linear guides 688, 689 which slideably support bearing cars 691 and 692 respectively. Bearing car 691 supports jaw 690, and bearing car 692 supports jaw 693. Servo motor 686 drives pulley 694 which drives pulley 696 connected to leadscrew 695 via endless toothed belt 697. Referring to FIG. 39, base plate 682 supports a bearing 700 which rotateably supports the leadscrew 695. Referring to FIG. 38, jaw 690 supports a nut 698, and jaw 693 supports a nut 699, which nuts 698 and 699 are engaged with the leadscrew 695. Thus servo motor 685 drives the jaws 690 and 693 to clamp and unclamp a brick.

Referring to FIG. 38, the arm 679 supports a bracket 701 with an idler pulley 702 near end 708. Servo motor 684 (shown in FIG. 39) drives a pulley 703, which drives pulley 702 via endless belt 704. The base plate 682 has a clamp plate 705 (shown in FIG. 39) which clamps belt 704. Thus the servo motor 684 linearly moves base plate 682 along linear guide 680.

Refer to FIG. 37. Servo motor 678 can rotate arm 679 so that linear guide 680 is aligned parallel with the channels 664, 665 in fifth stick 20.

Jaws 690 and 693 can be moved by servo motor 684 towards the second distal end 658 of fifth stick 20 to pick up a brick (see FIG. 58B) that is being held by jaws 667, 668 of shuttle-S5 666. Servo motor 686 can then close jaws 690 and 693 to grasp the brick. Servo motor 684 can then move jaws 690, 693, holding the brick towards first end 707 of arm 679 (see FIG. 58C). Servo motor 678 can then rotate arm 679 so that the top surface of said brick is presented flat, ready for adhesive application by the adhesive application system 150 (see FIGS. 58D to G).

Figure 3:
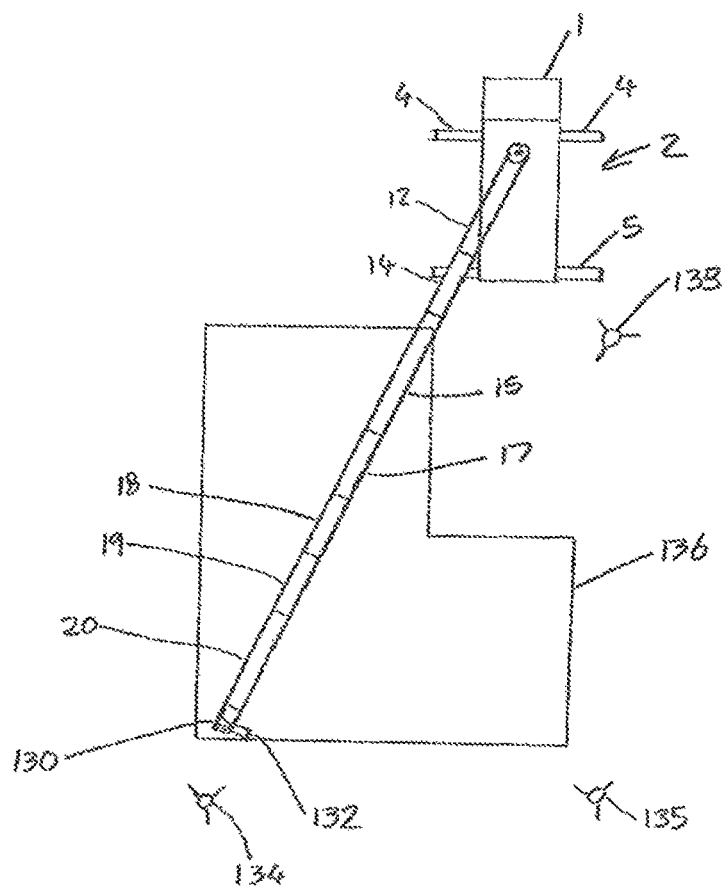
FIG. 3 shows a site plan of the automated brick laying machine 2 set up near a concrete slab 136 on which the automated brick laying machine 2 will build a structure not shown.
Figure 58H:
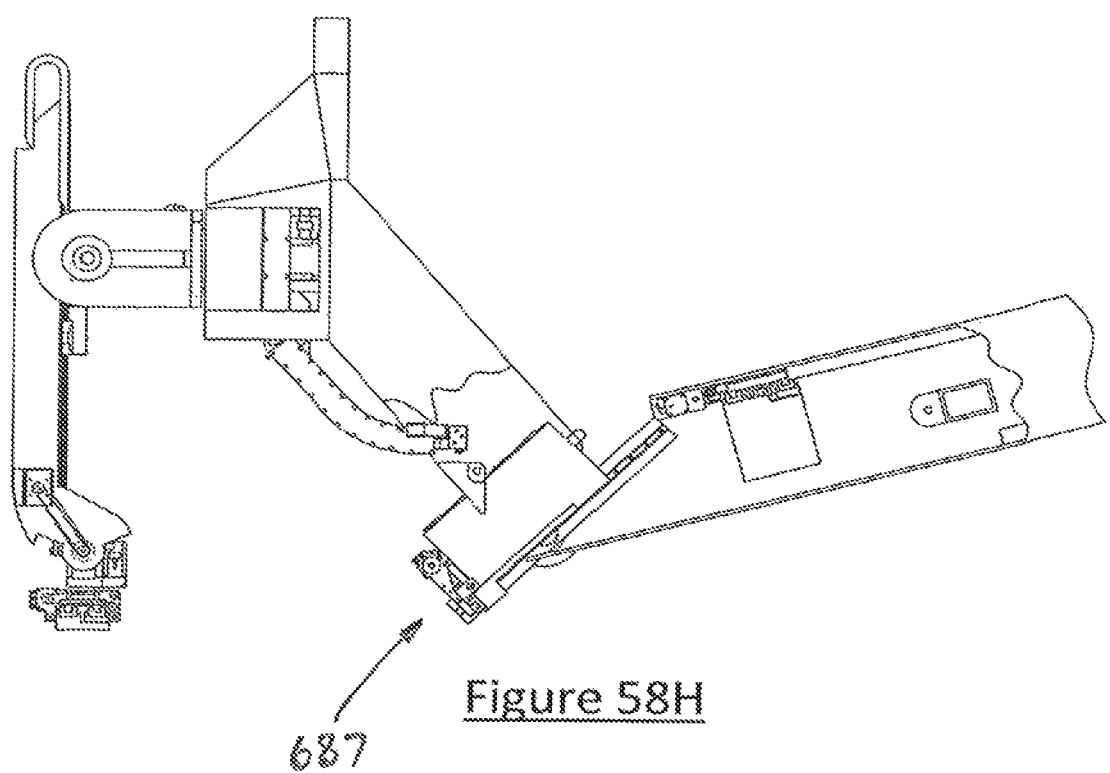
Figure 58J:
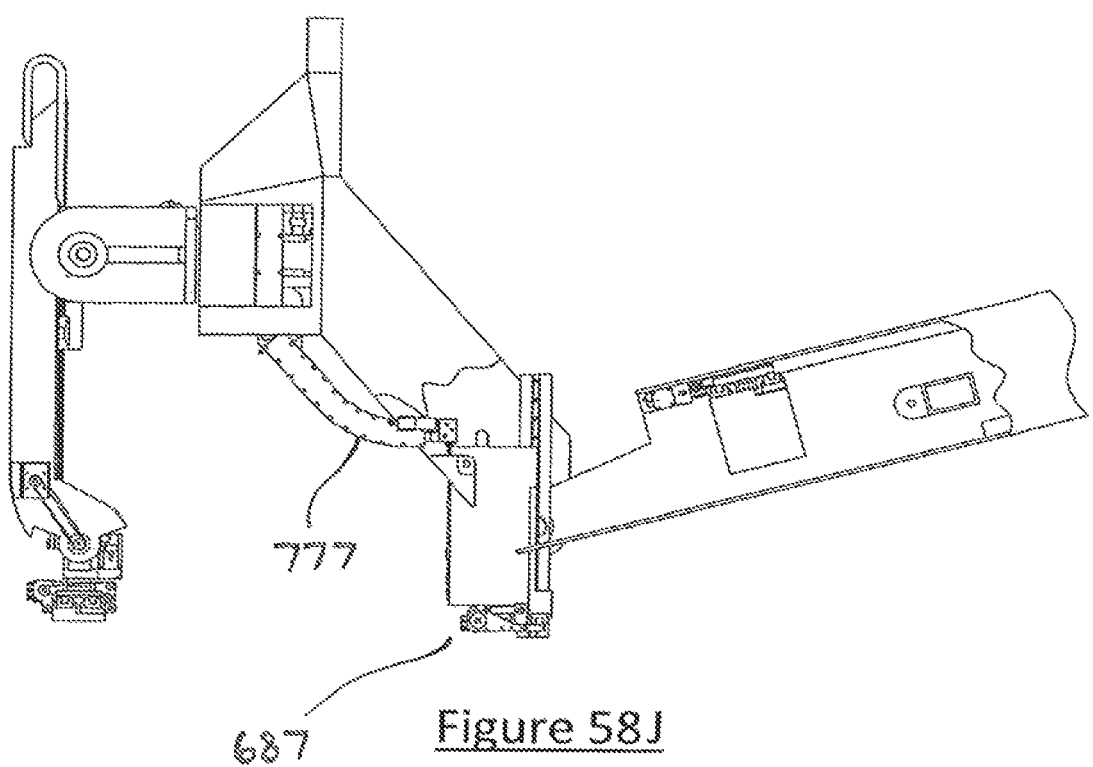
Figure 58K:
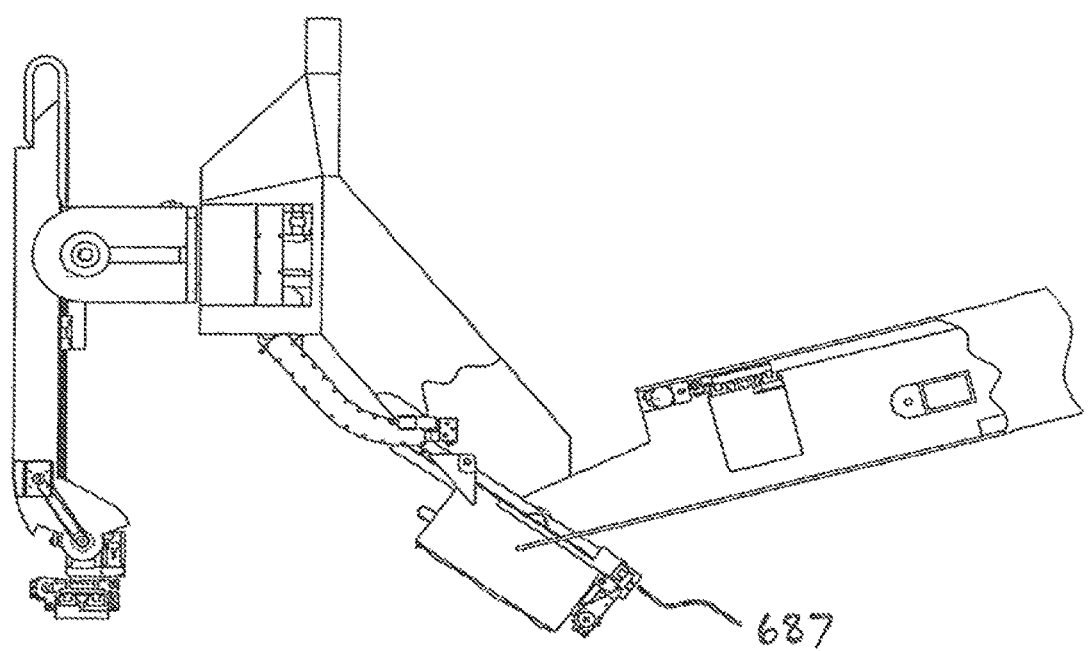
Figure 58L:
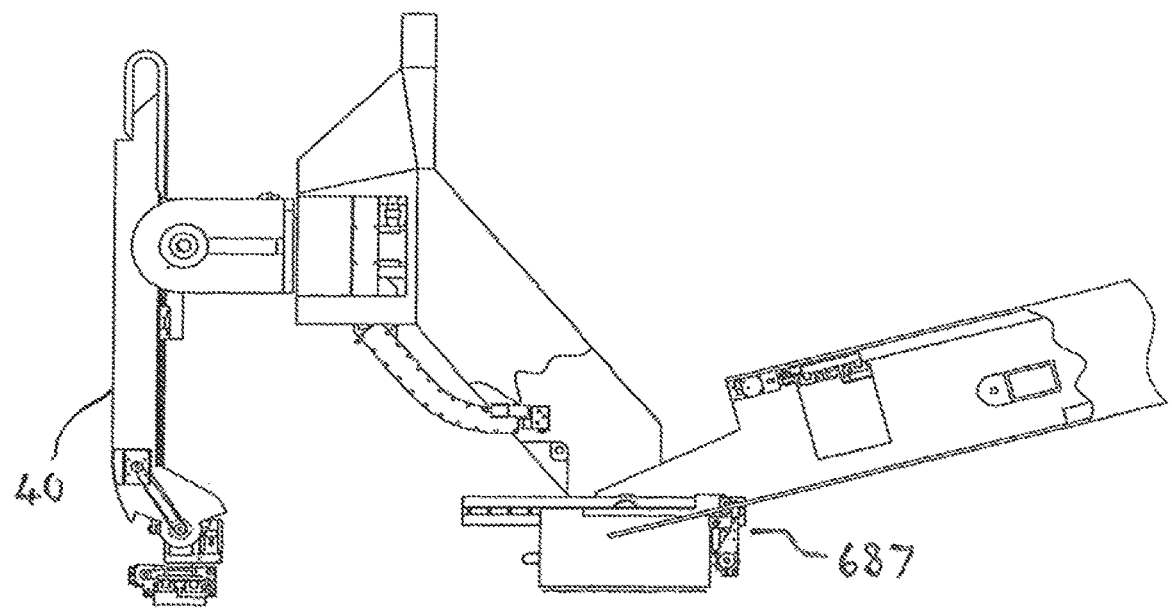
Figure 58M:
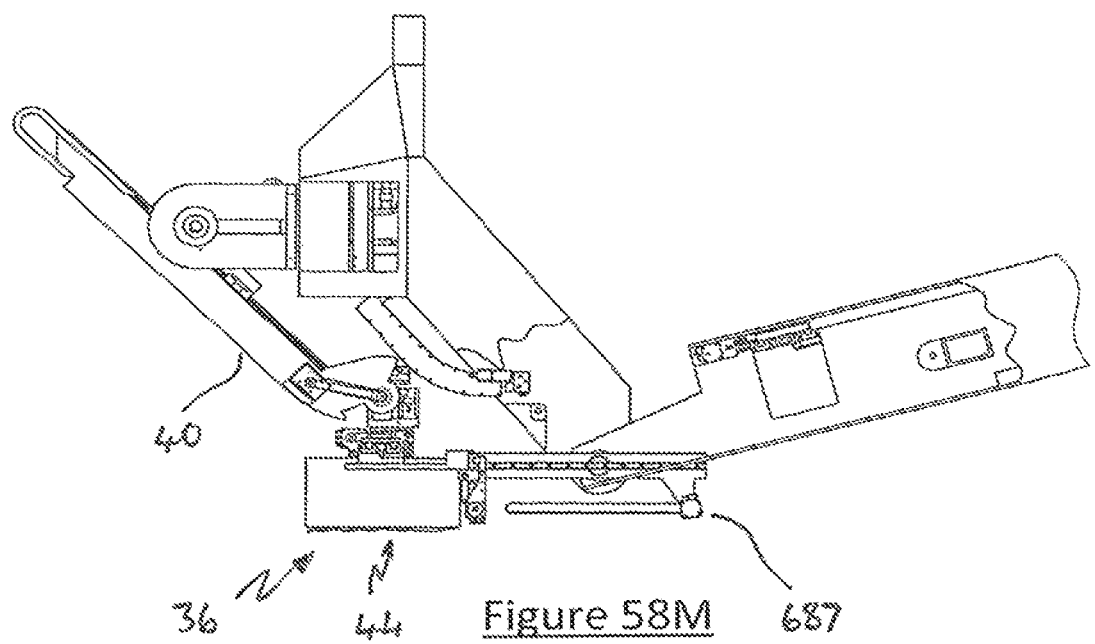
Figure 58N:
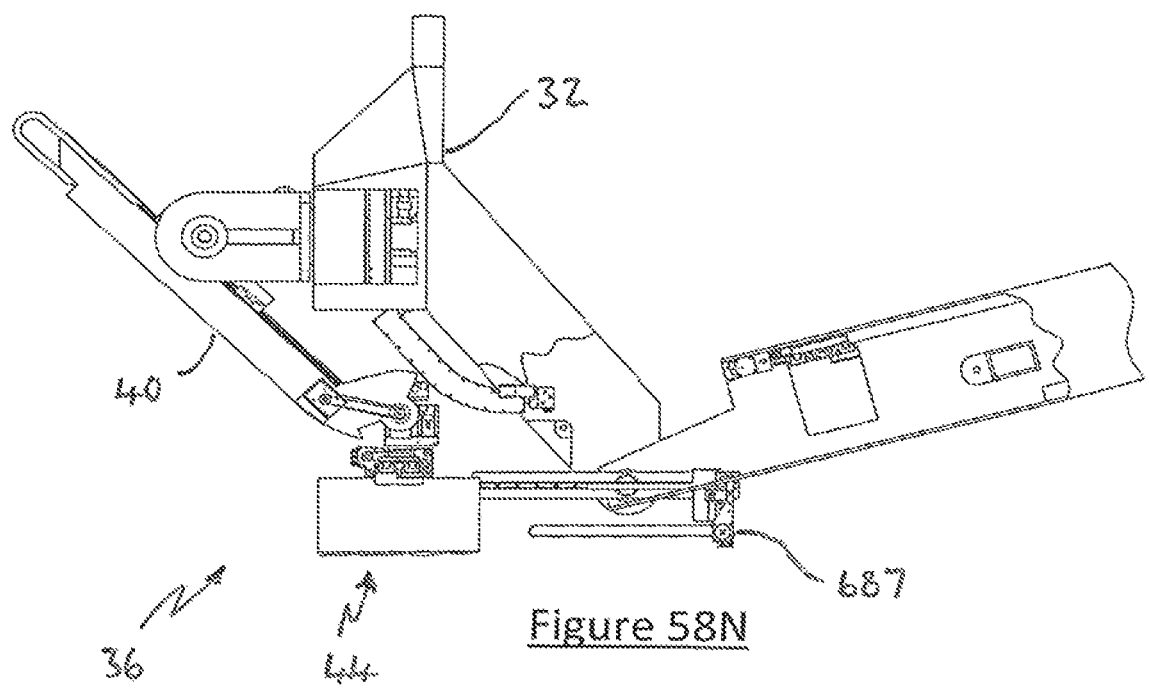
Figure 58P:
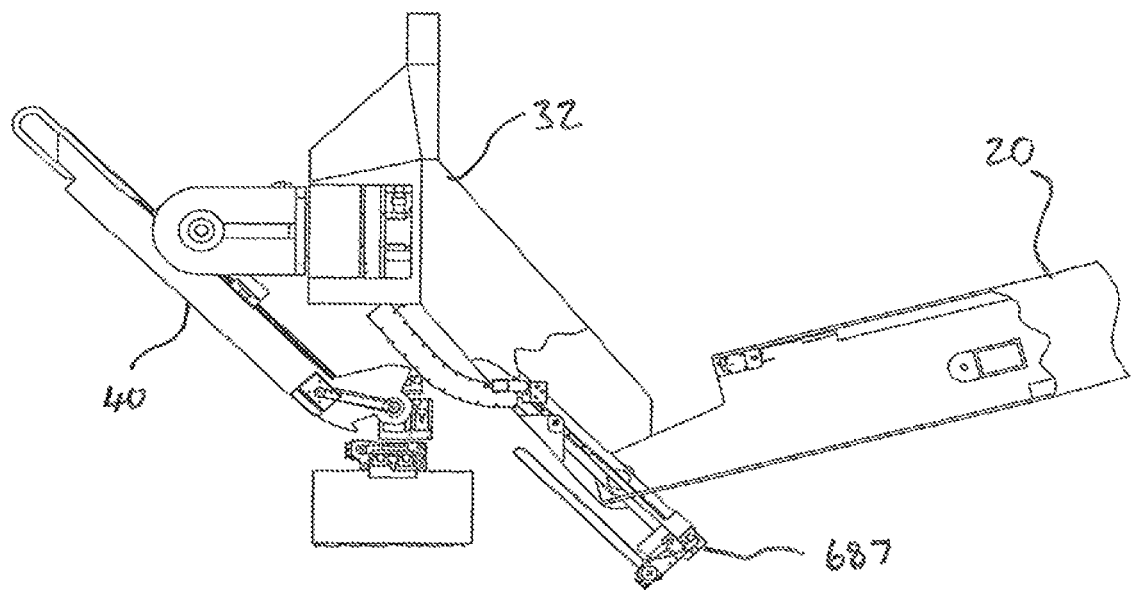
Figure 58Q:
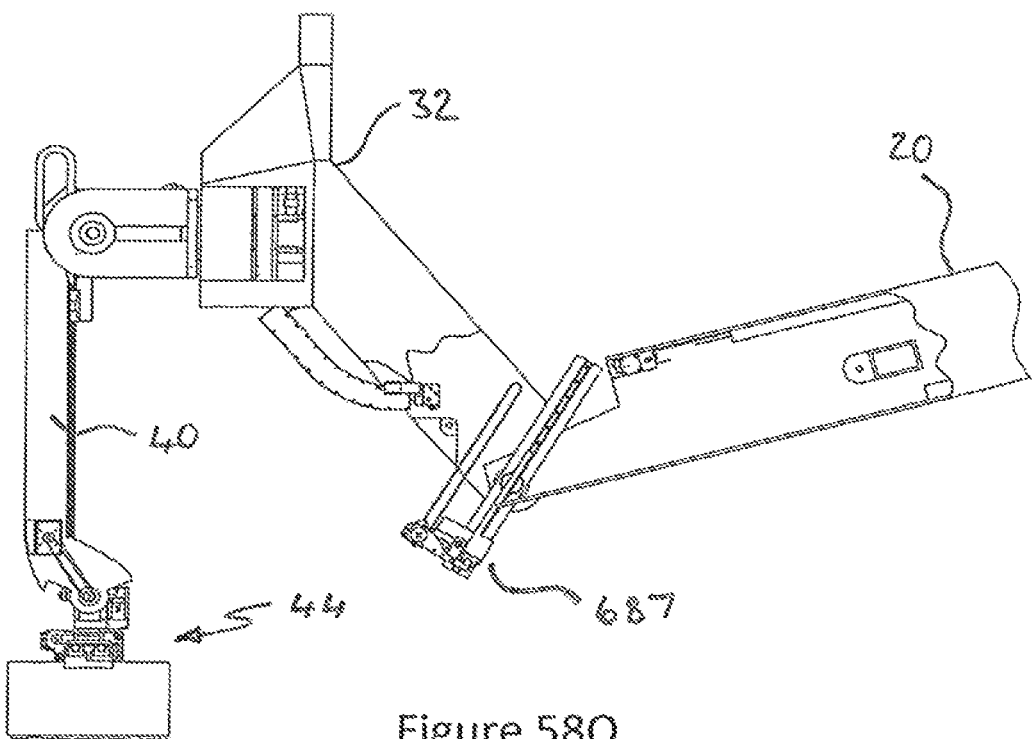

Optionally, servo motor 684 can then rotate arm 679 through 90 degrees so that the end of said brick is presented flat, ready for adhesive application by the adhesive application system 150 (see FIGS. 58H and 3). It should be noted that in some structures, such as for walls that will be rendered, it is not necessary to apply adhesive to the vertical (or "perp") joints of the bricks. Optionally, servo motor 684 can then rotate arm 679 through 180 degrees so that the opposite end of said brick is presented flat, ready for adhesive application by the adhesive application system 150, thereby applying adhesive to the bottom and both ends of said brick.

Servo motor 684 can then rotate arm 679 through 180 degrees (or 90 or 270 degrees, depending on which faces of the brick had adhesive applied to them), so that said brick is inverted, ready to be picked up by the laying arm gripper 44 (see FIGS. 58K to Q). In this way the glue is applied to the bottom of said brick that will be laid by the laying arm 40.

FIG. 53 shows a side view of the brick laying and adhesive applying head 32 and fifth stick 20. FIG. 53 shows the sequence of the brick 797 from a first position 791, to a second position 792, to a third position 793 to a fourth position 794 to a fifth position 795 to a sixth position 796. In first position 791, brick 797 is gripped by shuttle-S5 666 (not shown in FIG. 53). The flipper jaws 690 and 693 are moved to grasp the brick 797 and then shuttle-S5 666 releases the brick 797. The brick 797 is then translated to second position 792, then rotated to third position 793. Adhesive is then applied to the brick 797. Brick 797 is then optionally rotated to vertical position 794. Brick 797 is then rotated to a fifth position 795 and then translated to a sixth position 796.

Adhesive

Referring to FIG. 1, the frame 3 supports an adhesive container and an adhesive pump. The adhesive pump supplies pressurised adhesive to fluid conveying apparatus in the form of a hose which runs out along the boom and through the flexible energy chains 112 (shown in FIG. 43), 564 (shown in FIG. 45) and 740 (shown in FIG. 43) provided in the telescopic boom and telescopic sticks, to the brick laying and adhesive applying head 32. Adhesives can be one pack or two pack, and should have some flexibility when set in order to avoid fracturing due to uneven expansion and contraction in the built structure. Suitable adhesives are single pack moisture curing polyurethane such as Sika "Techgrip", Hunstman "Suprasec 7373" or Fortis AD5105S, single pack foaming polyurethane such as Soudal "Souda Bond Foam" or Weinerberger "Dryfix", two part polyurethane such as that made by Huntsman, MS Polymer (Modified Silane Polymer) such as HB Fuller "Toolbox", two part epoxy such as Latipoxy310 and methacrylate adhesive such as "Plexus". It would be possible but less desirable (due to strength, flexibility and "pot life" and clean up reasons) to utilise water based adhesives such as latex, acrylic or cement based adhesives similar to various commercially available tile glue or Austral Bricks "Thin Bed Mortar".

Figure 5:
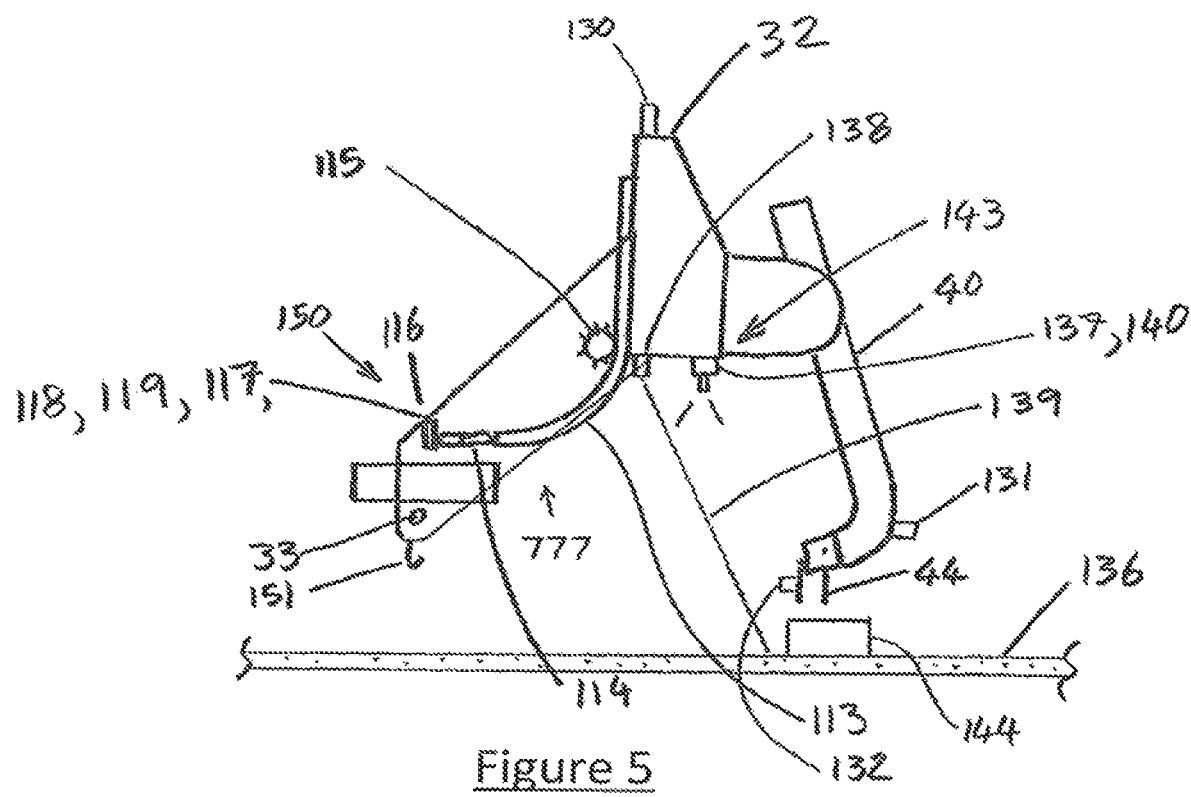
FIG. 5 shows a side view of the brick laying and adhesive applying head 32.

Refer to FIGS. 5 and 6. The adhesive applicator 777 has an adhesive head fitted with nozzles 121, 122, 123, 124 and 125, shown schematically in FIG. 6. The adhesive flow is controlled by electrically operable valves 118 and 119, located in a manifold head 117, close to the nozzles 121, 122, 123, 124 and 125, which are also supported on the manifold head 117. Space within the laying head is very restricted. The nozzles provided in two groups comprising a central group of nozzles 121, 122 and 123 supplied by valve 118, and a peripheral group of two outer nozzles 124 and 125 supplied by valve 119. The manifold head 117 is supported on a mechanism that can project the nozzles out to reach the length of a brick, and retract the nozzles to provide clearance so that the brick can be rotated and also by retracting the nozzles clearance is provided so that the laying head can be folded against a retracted stick assembly for compact transport. To achieve the extension and retraction, the nozzles are supported on a chain that can only bend one way and the chain is extended or retracted by a sprocket driven by a servo motor. A detailed description follows.

Figure 40:
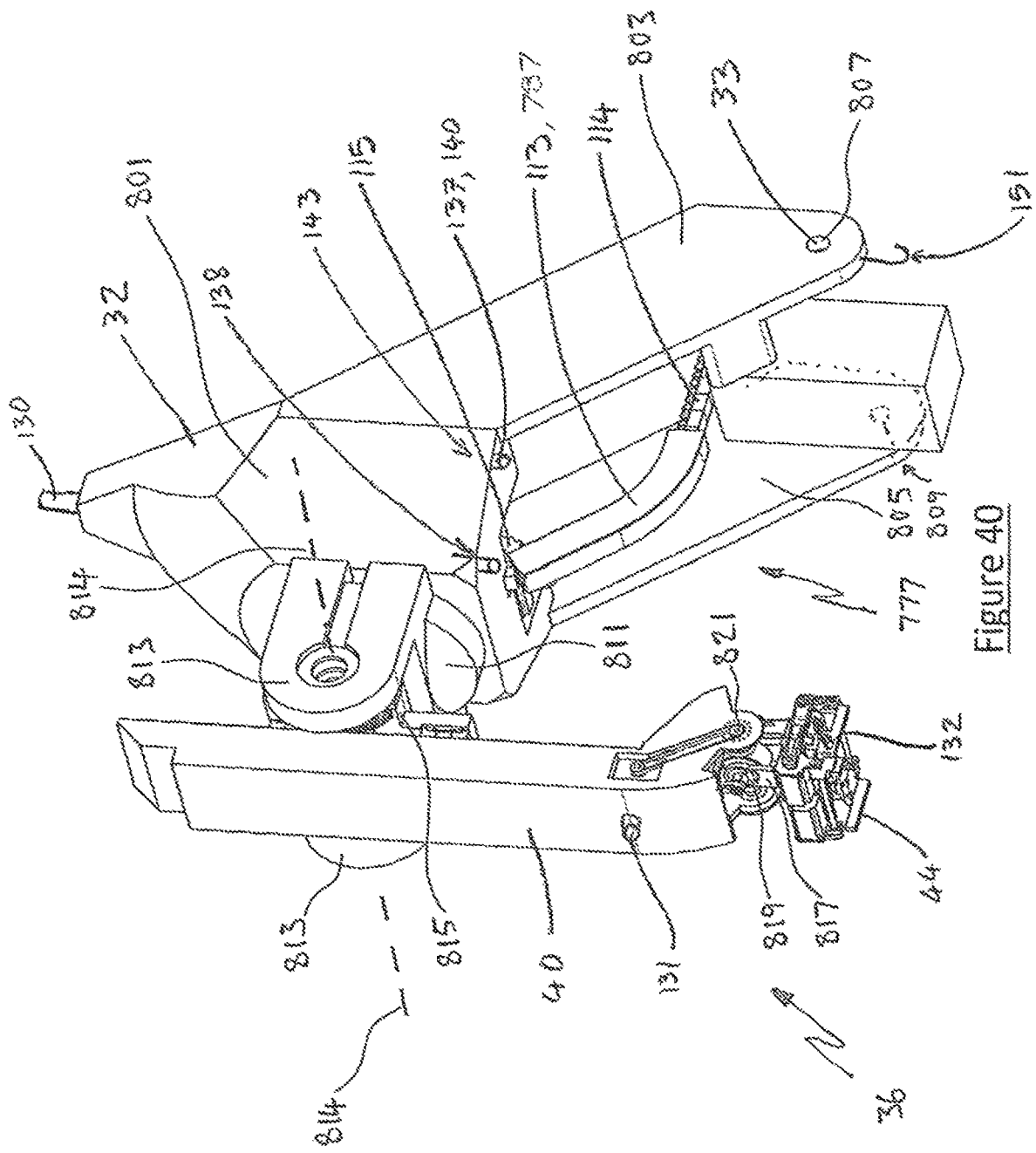
FIG. 40 shows a view of the brick laying and adhesive applying head 32.

Refer to FIGS. 5, 6, 40 and 49. Referring to FIG. 40, the brick laying and adhesive applying head 32 supports an adhesive applicator assembly 777. Referring to FIG. 49, the adhesive applicator assembly 777 has a curved guide 113 attached to the brick laying and adhesive applying head 32. The curved guide 113 supports a tongue member in the form of a sliding chain 114 that can only bend one way. The sliding chain 114 is moved by a servo powered sprocket 115. The brick laying and adhesive applying head 32 supports a straight guide 784 into which the sliding chain 114 may be retracted. The distal end 116 of the sliding chain 114 supports a manifold 117 that supports two valves 118, 119. Each valve 118, 119 is connected to the pressurised adhesive supply 120 provided by the adhesive pump 111 mounted to the frame 3 (shown in FIG. 5). The first valve 118 is connected to three central glue nozzles 121, 122, 123, and the second valve 119 is connected to two outer glue nozzles 124, 125 (shown schematically in FIG. 13). The inner nozzles 121, 122, 123 are provided to allow glue to be applied to the top face of a narrow or internal brick, while the outer nozzles 124, 125 allow glue to be applied to the outer edges of the top face of a wide or external brick 126. The valves 118, 119 may be operated individually or together to supply glue to the inner nozzles 121, 122, 123, the outer nozzles 124, 125 or all nozzles 121, 122, 123, 124 and 125.

Figure 51:
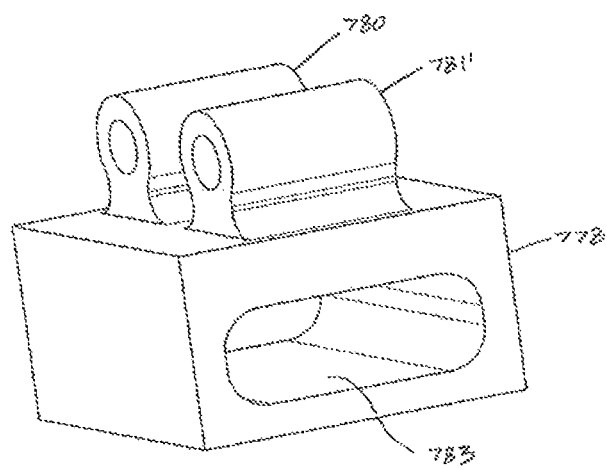
FIG. 51 shows a view of a hollow chain link 778.
Figure 50:
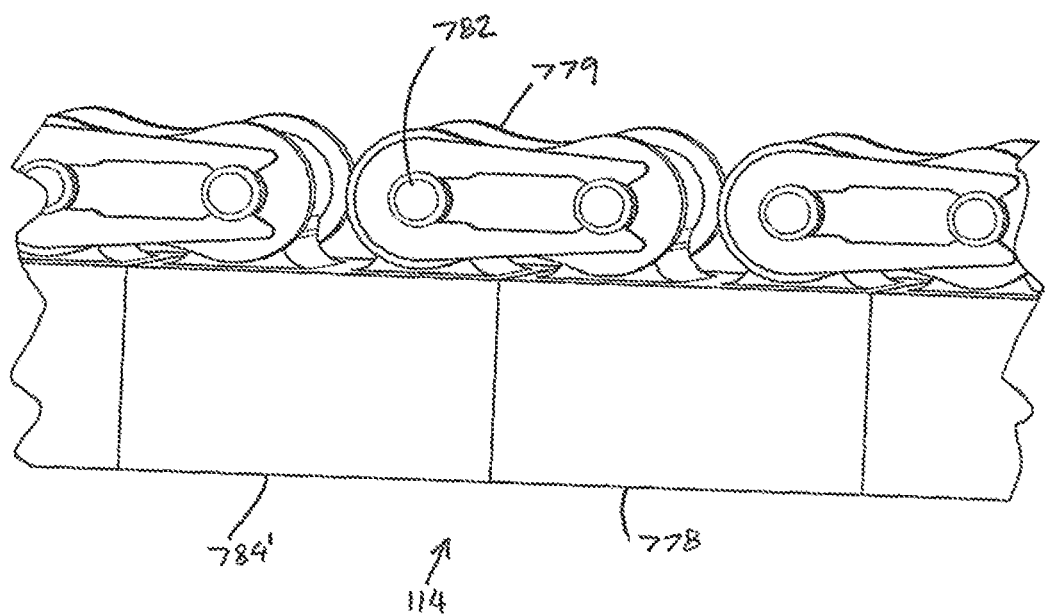
FIG. 50 shows a view of the sliding chain 114.

Refer to FIGS. 50 and 51. Referring to FIG. 50, the sliding chain 114 has a plurality of body portions in the form of hollow links 778 and a plurality of chain links in the form of joiner links 779. Joiner links 779 are standard items used to join power transmission chain, such as BS roller chain 16-B1 or ANSI roller chain 80-1. Referring to FIG. 51, hollow link 778 is provided with lugs 780, 781 to engage the pins 782 of joiner links 779 shown in FIG. 50. Hollow link 778 is provided with a longitudinally extending hole 783 for the passage of cables (not shown) and the pressurised adhesive 120 (see FIG. 13). The hollow links have ends that contact each other to prevent over extension of the sliding chain, allowing the sliding chain to be extended outward from the tip of the curved guide and retain a straight configuration, being bendable upward only, about the axes provided by the connection of the hollow links with the joiner links.

Figure 52:
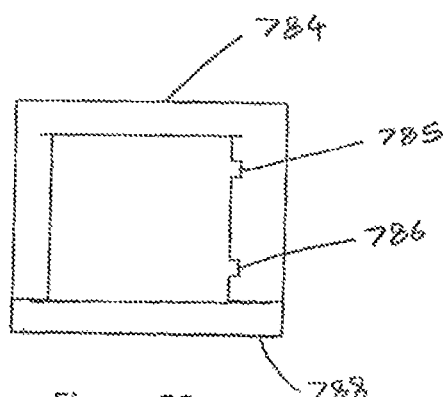
FIG. 52 shows a top view of straight guide 784.

Referring to FIG. 52, the straight guide 784 is fitted with a lid 788. In FIG. 49 curved guide 113 is shown with the lid 787 removed for clarity. Straight guide 784 is shown without the lid 788 for clarity.

Referring to FIG. 50, consider the example of first hollow link 778, joiner link 779 and second hollow link 784'. It can be seen that second hollow link 784' can pivot upwards relative to first hollow link 778, but second hollow link 784' cannot pivot downwards relative to first hollow link 778. By extension of the logic to the plurality of hollow links 778 and joiner links 779, the sliding chain 114 can only curve upwards and not curve downwards.

Preferably the hollow links 778 are manufactured from a material with a low coefficient of friction such as acetal copolymer or UHMWPE (Ultra High Molecular Weight Polyethylene) plastic. The curved guide 113 and straight guide 784 may be manufactured from a material with a low coefficient of friction such as acetal plastic.

FIG. 52 shows a top view of straight guide 784. The straight guide 784 is provided with grooves 785, 786 so that joiner links 779 do not touch straight guide 784. Straight guide 784 may then be constructed from a material such as aluminium alloy which is more robust than acetal plastic.

Referring to FIG. 49, the curved guide 113 is also provided with grooves 789, 790 so that joiner links 779 do not touch curved guide 113. Curved guide 113 may then also be constructed from a material such as aluminium alloy which is more robust than acetal plastic.

Brick Laying and Adhesive Applying Head

Refer to FIG. 40. The brick laying and adhesive applying head 32 supports a brick laying head in the form of a spherical geometry robot 36 and the adhesive applicator assembly 777 along with a vision system and tracking system. After application of adhesive as described above, the brick laying and adhesive applying head 32 takes a brick from the jaws 690 and 693 of the flipper assembly 687 and moves it to a position where it is laid. The laying head also compensates for movement and deflection of the boom, so that the brick is laid in the correct position.

Refer to FIGS. 1, 5 and 40. Referring to FIG. 40, the articulated brick laying and adhesive applying head 32 has a body 801 with arms 803 and 805 forming a clevis which extends obliquely downward from the body 801. The arms 803 and 805 have apertures 807 and 809 to receive pins to pivotally mount the head 32 and the flipper assembly 687 about second horizontal axis 33 at the distal end 658 of the fifth telescopic stick 20 (see FIG. 1). Referring to FIG. 1, the brick laying and adhesive applying head 32 articulates about horizontal axis 33 substantially parallel to the articulation axis 16 of the first stick 15 and the articulation axis 13 of the first boom 12. The pose of the brick laying and adhesive applying head 32 is controlled by movement of a ram 35.

Referring to FIG. 40, the articulated brick laying and adhesive applying head 32 supports a brick laying head comprising a spherical geometry robot 36. The spherical geometry robot 36 has a linearly extendable arm 40 with a brick laying clamp in the form of a gripper 44 fitted at the lower end thereof. Referring to FIG. 1, the spherical geometry robot 36 has the following arrangement of joints: arm mount-roll angle 37, arm mount-pitch angle 38, arm sliding (arm length or linear extension) 39, wrist pitch angle 41, wrist roll angle 42, gripper yaw angle 43 and with gripper 44 fitted to rotate about yaw axis 45. This configuration provides pole free motion within the working envelope.

Figure 61:
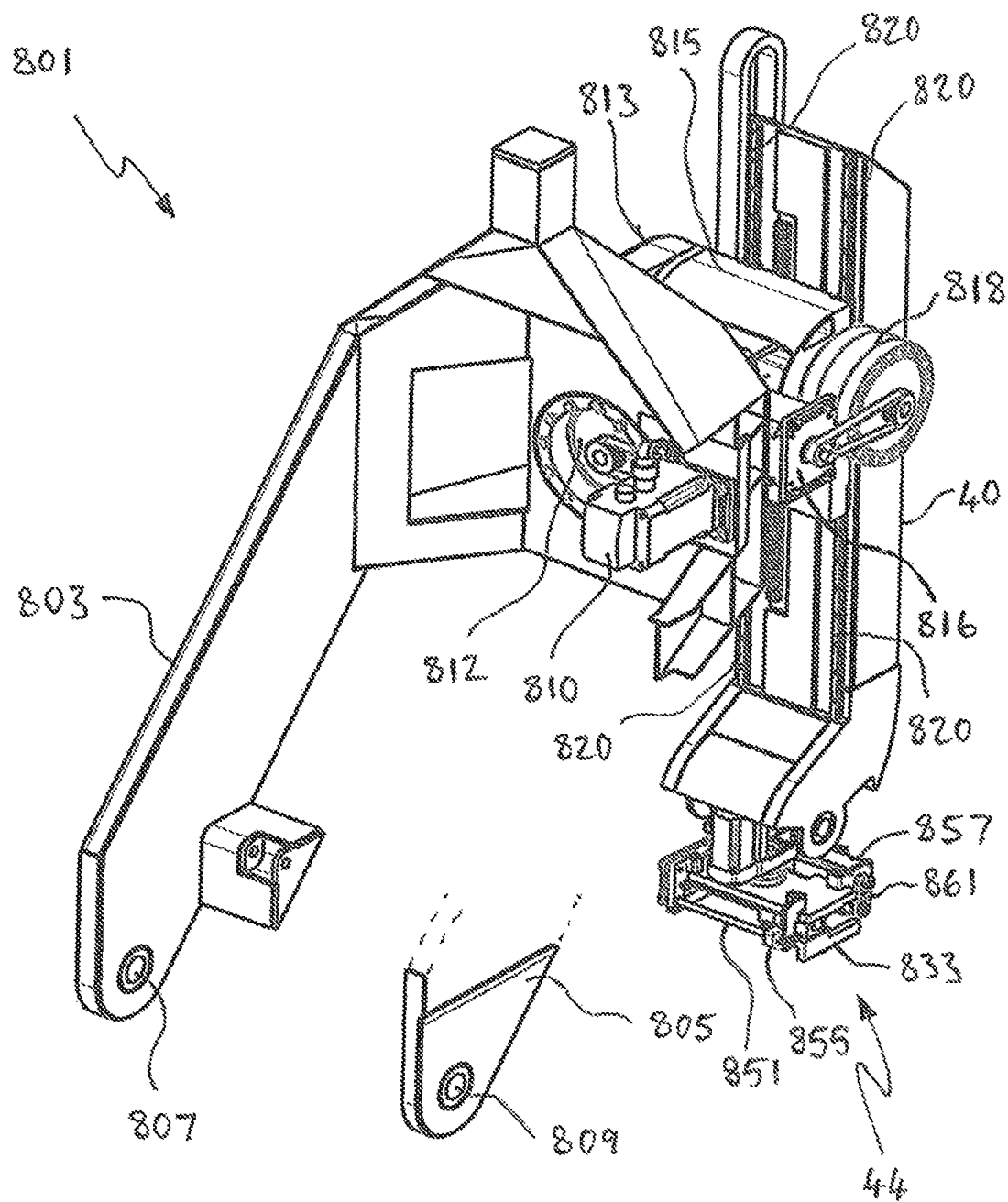
FIG. 61 shows a cut away view of part of the brick laying and adhesive applying head and showing the mounting of the brick laying head.

Referring to FIGS. 40 and 61, to achieve the arm mount-roll angle 37 adjustment, the body 801 supports a servo motor 810 with a belt driving a bearing reducer 812 connected to the base 811 of a clevis 813, the base being rotatable relative to the body 801 about a horizontal axis which runs normal to the clevis 813 axis. To achieve the arm mount-pitch angle 38 adjustment, the clevis 813 supports about its axis 814 a servo motor 816 attached to the body 801 driving via a belt a bearing reducer 818 connected to a base 815 for the arm 40.

Figure 62:
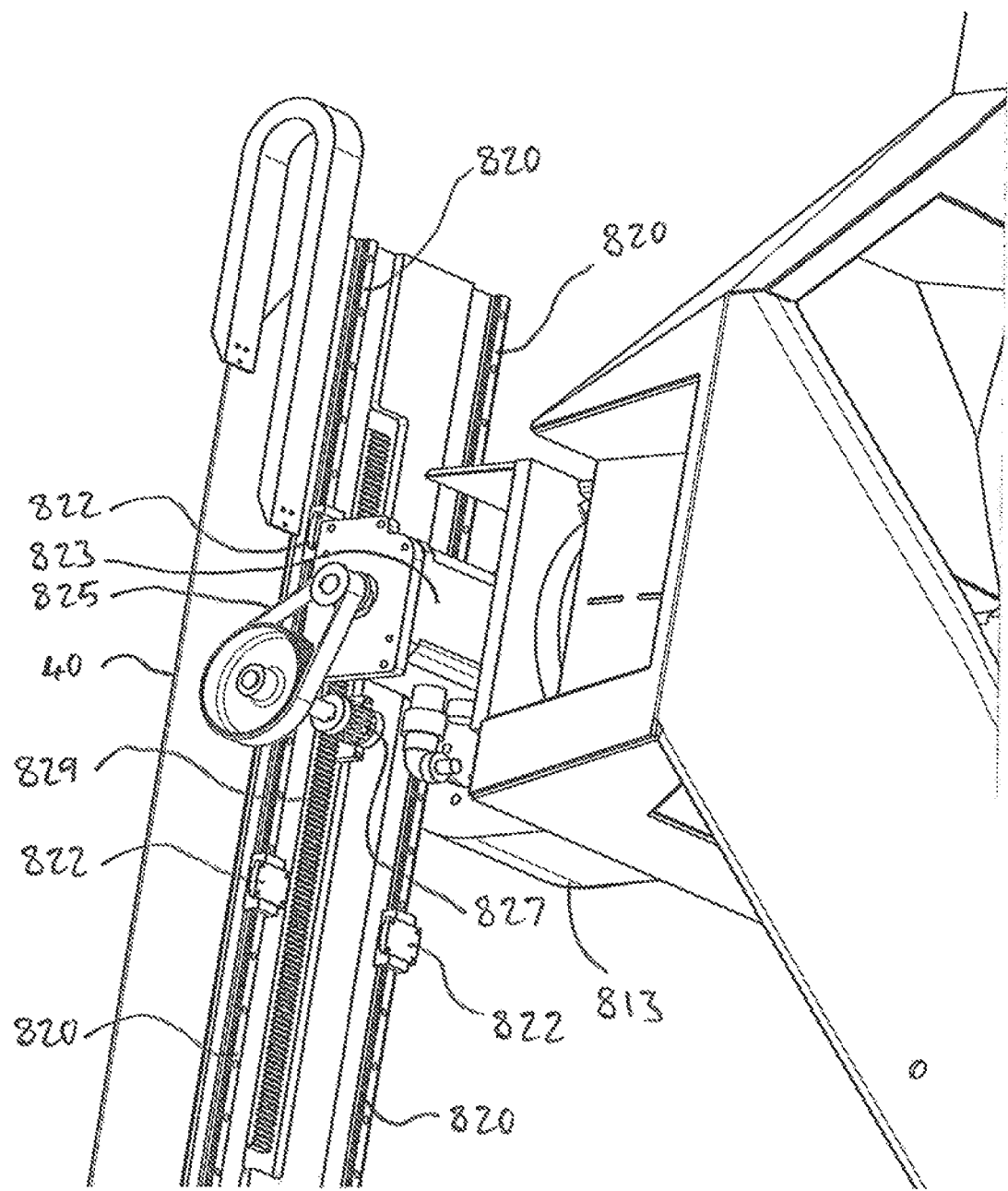
FIG. 62 shows a further view of part of the brick laying and adhesive applying head and showing the mounting of the brick laying head.
Figure 63:
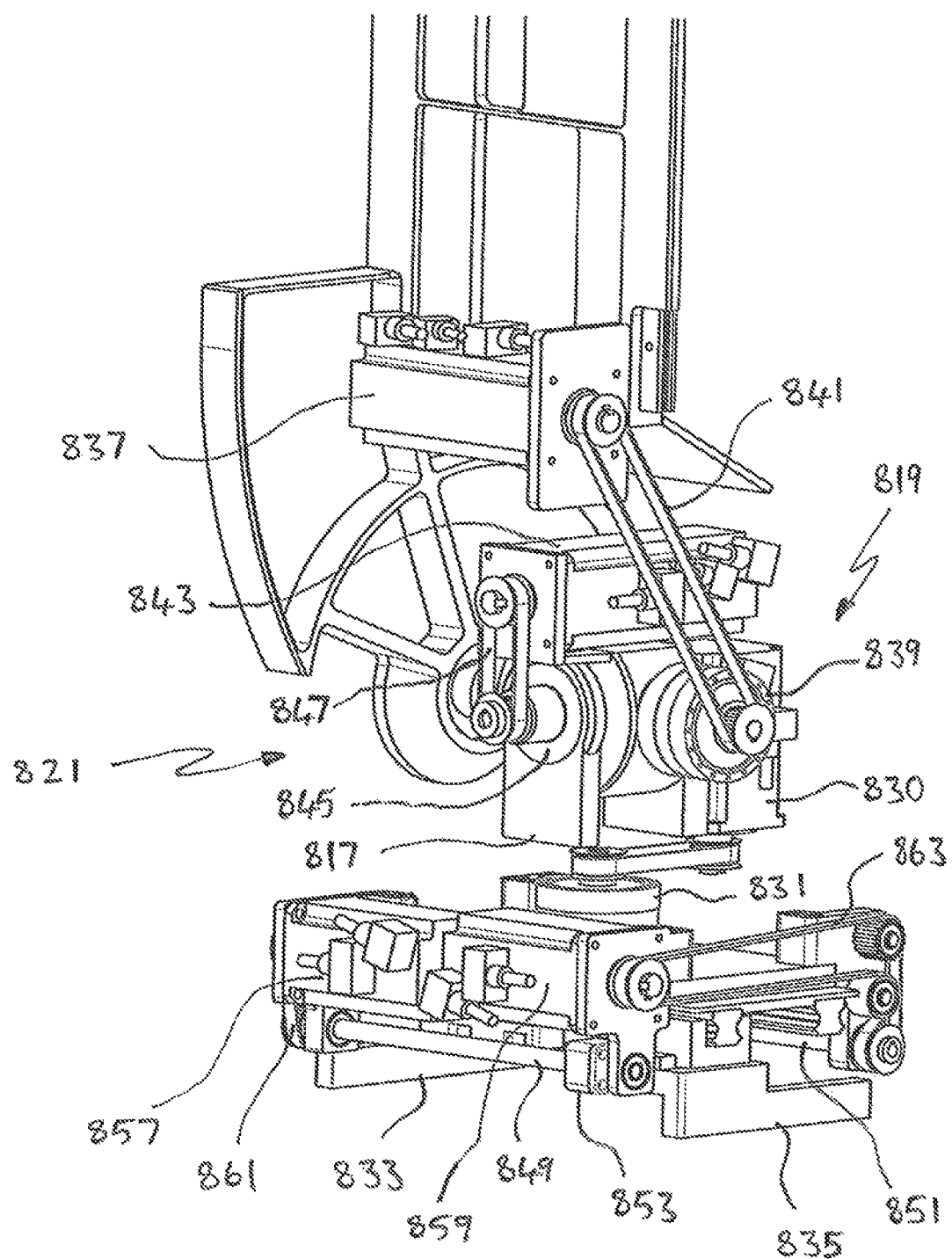
FIG. 63 shows a cut away view of part of the brick laying head.

The arm 40 has linear guides 820 which co-operate with bearing cars 822 (see FIG. 62) on the base 815 to guide linear extension of the arm relative to the mount, to allow the arm 40 to move in a direction (typically straight up and down, but this depends on the pose) normal to the axis 814 of the clevis 813 to provide sliding movement of the arm 40. This linear extension of the arm is controlled by a servo motor 823 attached to the base 815 with reduction drive pulleys connected by a toothed belt 825 driving a pinion 827 engaging a rack 829 located extending along the arm 40.

The brick laying clamp/gripper 44 mounts for controlled rotation by a servo motor 830 driving a bearing reducer 831 about an axis normal and perpendicular to the plane of its jaws 833, 835 and bearing reducer on a clevis 817 to provide the gripper yaw angle 43 adjustment; a universal joint formed by mechanism 819 comprising servo motor 837 and bearing reducer 839 connected by toothed belt 841 and pulleys provides wrist pitch angle 41 adjustment; and mechanism 821 comprising servo motor 843 and bearing reducer 845 driven by toothed belt 847 and pulleys provides wrist roll angle 42 adjustment (shown in FIG. 1). Details of these servo motors and drives can be seen in FIG. 85.

The brick laying and adhesive applying head 32 supports a hook 151 that can be used to lift items such as windows, doors, lintels and other items not shown.

Refer to FIG. 5 and FIG. 6. The brick laying and adhesive applying head 32 supports machine vision cameras 127, 128 mounted to view both sides of the brick 126 shown schematically in FIG. 13.

The jaws 835, 833 of the laying head gripper 44 are independently movable by independent lead screws 849, 851, engaged with nuts 853, 855 connected with the jaws 835, 833, and moveable by servo motors 857, 859, via drive belts 861, 863 respectively. This allows the offset gripping of a brick. The arrangements for moving the jaws 835, 833 use lead screws 849, 851 and co-operating nuts 853, 855, driven by separate servo motors 857, 859, respectively, similar to that as described for other grippers utilised elsewhere in the embodiment, apart from the drives for the jaws being separate in order to allow independent movement of the jaws.

As can be seen in FIG. 40, when considered with FIG. 49, the straight guide 784 of the adhesive applicator assembly 777, into which the sliding chain 114 may be retracted, is mounted in the body 801 of the brick laying and adhesive applying head 32, behind the servo motor with bearing reducer that connects to clevis 813. The curved guide 113 of the adhesive applicator assembly 777 descends/depends downwardly obliquely, substantially following the extent of the arms 803 and 805 for a short distance, before curving toward horizontal so that the sliding chain is presented extending substantially level, subject to the alignment of the brick laying and adhesive applying head 32 as controlled by the ram 35, and presented above where the flipper assembly 687 holds the brick. With this arrangement, the adhesive applicator assembly 777 is kept clear of positions through which arm 40 and gripper 44 of the spherical geometry robot 36 could be required to move.

Tracker and Slab Scan

Referring to FIGS. 1, 5, 40, the top of the brick laying and adhesive applying head 32 supports a tracker component 130. The tracker component 130 may be a Leica T-Mac or an API STS (Smart Track Sensor). Alternately tracker component 130 may be a single SMR (Spherical Mount Reflector) or corner cube reflector, or two or three SMRs or corner cube reflectors or a Nikon iGPS or any other suitable tracking device. Preferably the tracker component 130 provides real time 6 degrees of freedom position and orientation data at a rate of preferably greater than 10 kHz, or preferably 1000 Hz to 10 kHz, or preferably at a rate of 500 Hz to 1000 Hz or preferably a rate of 300 Hz to 500 Hz or 100 Hz to 300 Hz or 50 Hz to 100 Hz or 10 Hz to 50 Hz. The laying arm 40 and or the gripper 44 of the laying arm 40 may support a second or third tracker component 131, 132 of the same or different type to the first tracker component 130.

Referring to FIG. 3, a tracker component 133 or components, 133, 134, 135 are set up on the ground adjacent to the concrete slab 136 or on a nearby structure. The tracker component 130 on the laying head references its position relative to the tracker component 133 or components 133, 134, 135 set up on the ground or structure.

Referring to FIG. 5, the brick laying and adhesive applying head 32 supports a camera 137 that views the ground, slab 136 or structure or objects below it. The brick laying and adhesive applying head 32 is provided with laser or light projectors 138 that project dots or lines 139 onto the ground, footings, slab 136 or objects below it. Machine vision is used to determine the 3D shape of the ground, footings, slab 136 or objects below the laying head. Alternatively, the brick laying and adhesive applying head 32 is fitted with a laser scanner 140. After positioning the truck and unfolding the boom, the brick laying and adhesive applying head 32 is moved around by moving the boom and stick assembly 141 so that the brick laying and adhesive applying head 32 is optionally moved around the edge of the slab 136 and optionally above all positions that will be built upon. The machine vision system 143 or scanner 140 scans the slab 136 and the areas to be built on to firstly align the slab 136, machine 2 and working coordinate systems to their correct locations and secondly to quality check the slab 136 and check its flatness and level. If the slab 136 is not flat or level within tolerance the first course of bricks or selected bricks not shown can be individually machined, prior to being transported to the tower 10 and boom and stick assembly 141, to correct the out-of-level, flatness or height. Optionally a brick may have a groove or notch or pocket machined in it to avoid a bump or defect or object (such as a pipe projecting through the slab) on the slab 136.

As the brick laying and adhesive applying head 32 lays a brick 144, the machine vision 143 or laser scanner 140 is used to measure the laid brick 144 so that the height of the laid brick 144 is stored and later used to adjust the laying height of the dependant bricks that are laid on top of it on the next course. If the height is over tolerance, the dependant bricks above it can be machined to a reduced thickness by the router 47.

The concrete slab 136 may alternatively be a slab of earth, rock, wood, plastic or other material or a steel deck or footings. The slab 136 may be on the ground or suspended.

Harsh Environment

In an adaptation of the telescoping boom, foldable boom or articulated telescoping boom, with radiation protection, the booms could be used for erecting containment structures in nuclear disaster zones.

In a further adaptation of the booms, they may be adapted to work in a low pressure atmosphere or in a vacuum and in the presence of ionising radiation. In this format with an integral automated brick or block making unit, the booms could be used for building structures on the moon or Mars or in other extra-terrestrial locations.

Advantages of the Invention

In the embodiment with the boom incorporated in a vehicle, the invention provides an improved automated brick laying machine that is compact and mobile and able to drive on public roads. The arrangement and configuration of the boom allows the machine to have a very large working envelope whilst also being compact for road travel. An alternative embodiment is envisaged where the boom, with or without tower and slewing ring, could be assembled atop a tower, and in particular a jack-up tower, with one or more telescoping booms located inside the jack-up tower, and an articulated telescoping boom located atop the jack-up tower. Such an arrangement could be used to construct a multi-storey building, which would be beyond the reach of the vehicle mounted articulated telescoping boom.

To build common house size structures, the articulated telescoping boom needs to reach out $30m$. To manoeuvre on suburban roads a short truck is advantageous. To fit on small building sites a compact machine is advantageous. Bricks being conveyed along the boom according to the embodiment, are restrained, so that they can't fall and damage structures or injure personnel. By conveying the bricks along the inside of the boom, the cross section of the boom can be made smaller than the total cross section of a boom with external guarding to contain externally conveyed bricks. The smaller boom cross section enables a smaller and more compact machine to be built. The present invention has cable chains routed inside the boom. By conveying the bricks internally, and routing the services internally, the structural cross section of the boom is maximised for a given over all cross section, thereby increasing the stiffness of the boom which reduces the dynamic displacement of the boom. A light weight boom is also possible due to the large cross section.

The present invention utilises a series of shuttles that transfer a brick from one shuttle to the next. This system has the advantage that the movement of bricks along the boom is completely independent of the brick preparation or laying processes. In this way, the laying rate can be kept as high as possible. Both the brick preparation, the brick transport and the laying process can proceed at the individual maximum rates, limited only by the availability of the bricks into each process, and the availability of a consumer process for the output of the bricks.

The invention is intended to build all of the external and internal walls of a structure. Whilst it would be possible for the invention to build only some of the brick walls in a structure, with the remaining walls being manually constructed later with manually laid bricks or manually placed stud walls or precast panels, it should be understood that the invention allows the rapid and accurate placement of bricks and construction of brick walls faster and at a cost equal to or lower than the cost of manually built walls using bricks or stud framing or pre cast concrete.

It should be appreciated that the scope of the invention is not limited to the particular embodiment described herein, and the skilled addressee will understand that changes can be made without departing from the spirit and scope of the invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A foldable boom for conveying an item, said foldable boom being foldable about at least one folding axis, said foldable boom being locatable in a folded stowed position, and moveable to unfolded extended positions; said foldable boom having a near end arranged for pivotal movement about a first horizontal axis located on a turret, said turret being rotatable about a vertical axis; said foldable boom having first conveying apparatus to convey an item therealong, internally within said foldable boom, to a remote end of the foldable boom; wherein said foldable boom is foldable about a first folding axis, and a pivoting shuttle equipped with a clamp to releasably hold an item is provided at said first folding axis to transfer said item between said first conveying apparatus in boom elements connected about said first folding axis.

2. A foldable boom as claimed in claim 1 wherein at least one of:
   a. said turret has a carousel extending at least partially around said turret near the base thereof, said turret having second conveying apparatus to convey an item vertically from said carousel to said first conveying apparatus, said carousel being rotatable about a vertical axis to present an item for access by said second conveying apparatus; and,
   b. said first conveying apparatus comprises at least one shuttle equipped with a clamp to releasably hold an item, said shuttle running along a track extending along said foldable boom.

3. A foldable boom as claimed in claim 2 wherein said foldable boom comprises a first boom element and a second boom element pivotable about said first folding axis spaced from said first horizontal axis, and parallel therewith and wherein at least one of:
   a. each of said first boom element and said second boom element has a track and at least one said shuttle; and,
   b. at least one of said first boom element and said second boom element, has further elements arranged in telescoping interconnection.

4. A foldable boom as claimed in claim 1 wherein said foldable boom comprises a first boom element and a second boom element pivotable about said first folding axis spaced from said first horizontal axis, and parallel therewith and wherein at least one of:
   a. each of said first boom element and said second boom element has a track and at least one said shuttle; and,
   b. at least one of said first boom element and said second boom element, has further elements arranged in telescoping interconnection.

5. A boom for conveying an item, said boom having a near end arranged for pivotal movement about a first horizontal axis located from a top of a turret, said turret being rotatable about a vertical axis and said boom rotating therewith; said boom having first conveying apparatus to convey an item therealong, to a remote end of the boom; said turret having a carousel on which said item may be placed, said carousel extending at least partially around said turret near the base thereof, said turret having second conveying apparatus to convey said item vertically from said carousel to said first conveying apparatus, said carousel being rotatable about a vertical axis to present said item for access by said second conveying apparatus, wherein said first conveying apparatus is configured to convey said item internally within said boom.

6. A boom as claimed in claim 5 wherein said first conveying apparatus comprises at least one shuttle equipped with a clamp to releasably hold said item, said shuttle running along a track extending along said boom.

7. A boom as claimed in claim 6 wherein said boom comprises a foldable boom, said foldable boom at least one of:
   a. being foldable about at least one folding axis, said foldable boom being locatable in a folded stowed position, and moveable to unfolded extended positions; and,
   b. having a first boom element and a second boom element pivotable about the folding axis spaced from said first horizontal axis, and parallel therewith.

8. A boom as claimed in claim 7 wherein at least one of:
   a. each of the first boom element and the second boom element has a track and at least one said shuttle, and each said shuttle is confined for movement along said track within its boom element; and,
   b. at least one of said first boom element and said second boom element, comprises a plurality of elements arranged in telescoping interconnection.

9. A boom as claimed in claim 8 wherein said first conveying apparatus is configured to convey said item internally within said boom.

10. A boom as claimed in claim 7 wherein said first conveying apparatus is configured to convey said item internally within said boom.

11. A boom as claimed in claim 6 wherein said first conveying apparatus is configured to convey said item internally within said boom.

12. A boom as claimed in claim 5 wherein said boom comprises a foldable boom, said foldable boom at least one of:
   a. being foldable about at least one folding axis, said foldable boom being locatable in a folded stowed position, and moveable to unfolded extended positions; and,
   b. having a first boom element and a second boom element pivotable about the folding axis spaced from said first horizontal axis, and parallel therewith.

13. A boom as claimed in claim 12 wherein at least one of:
   a. each of the first boom element and the second boom element has a track and at least one said shuttle, and each said shuttle is confined for movement along said track within its boom element; and,
   b. at least one of said first boom element and said second boom element, comprises a plurality of elements arranged in telescoping interconnection.

14. A boom as claimed in claim 13 wherein said first conveying apparatus is configured to convey said item internally within said boom.

15. A boom as claimed in claim 12 wherein said first conveying apparatus is configured to convey said item internally within said boom.

* * * * *

UNITED STATES PATENT AND TRADEMARK OFFICE
CERTIFICATE OF CORRECTION

PATENT NO. : 10,876,308 B2  
APPLICATION NO. : 16/685712  
DATED : December 29, 2020  
INVENTOR(S) : Mark Pivac Page 1 of 1

It is certified that error appears in the above-identified patent and that said Letters Patent is hereby corrected as shown below:

On the Title Page

In item (56), in Column 2, under "Other Publications", Line 2, delete "Applicaiton" and insert -- Application --, therefor.

In the Specification

In Column 8, Line 44, delete "boom assembly" and insert -- foldable boom --, therefor.

In Column 8, Line 46, delete "boom assembly" and insert -- foldable --, therefor.

In Column 8, Line 48, delete "boom assembly" and insert -- foldable boom --, therefor.

In Column 19, Line 5, delete "rotator-S2-S1" and insert -- rotator-B2-S1 --, therefor.

In Column 22, Line 16, delete "583)," and insert -- 58J), --, therefor.

In Column 23, Line 14, delete "3)." and insert -- J). --, therefor.

In Column 23, Line 57, delete "Hunstman" and insert -- Huntsman --, therefor.

In Column 23, Line 59, delete "Weinerberger" and insert -- Wienerberger --, therefor.

In Column 23, Line 62, delete "Latipoxy310" and insert -- Latapoxy 310 --, therefor.

In Column 27, Line 9, delete "and or" and insert -- and/or --, therefor.

In Column 28, Line 67, delete "that that" and insert -- that --, therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*